(12) United States Patent
Chandler et al.

(10) Patent No.: US 11,055,521 B2
(45) Date of Patent: Jul. 6, 2021

(54) REAL-TIME GESTURE RECOGNITION METHOD AND APPARATUS

(71) Applicant: AVODAH, INC., Wilmington, DE (US)

(72) Inventors: Trevor Chandler, Thornton, CO (US); Dallas Nash, Frisco, TX (US); Michael Menefee, Richardson, TX (US)

(73) Assignee: AVODAH, INC., Wilmington, DE (US)

( * ) Notice: Subject to any disclaimer, the term of this patent is extended or adjusted under 35 U.S.C. 154(b) by 0 days.

(21) Appl. No.: 16/730,587

(22) Filed: Dec. 30, 2019

(65) Prior Publication Data
US 2020/0387697 A1    Dec. 10, 2020

Related U.S. Application Data

(63) Continuation of application No. 16/270,532, filed on Feb. 7, 2019, now Pat. No. 10,521,928, which is a (Continued)

(51) Int. Cl.
*G06K 9/00* (2006.01)
*G06N 3/08* (2006.01)
(Continued)

(52) U.S. Cl.
CPC ......... *G06K 9/00355* (2013.01); *G06F 3/013* (2013.01); *G06F 3/017* (2013.01);
(Continued)

(58) Field of Classification Search
CPC ........ G06N 20/00; G06N 3/0454; G06N 3/08; G06T 2207/20084; G06T 7/73;
(Continued)

(56) References Cited

U.S. PATENT DOCUMENTS 5,481,454 A    1/1996    Inoue
5,544,050 A    8/1996    Abe
(Continued)

OTHER PUBLICATIONS

Molchanov et al., "Online Detection and Classification of Dynamic Hand Gestures with Recurrent 3D Convolutional Neural Networks" (Year: 2016).*

(Continued)

*Primary Examiner* — Kenny A Cese
(74) *Attorney, Agent, or Firm* — Perkins Coie LLP

(57) ABSTRACT

Disclosed are methods, apparatus and systems for real-time gesture recognition. One exemplary method for the real-time identification of a gesture communicated by a subject includes receiving, by a first thread of the one or more multi-threaded processors, a first set of image frames associated with the gesture, the first set of image frames captured during a first time interval, performing, by the first thread, pose estimation on each frame of the first set of image frames including eliminating background information from each frame to obtain one or more areas of interest, storing information representative of the one or more areas of interest in a shared memory accessible to the one or more multi-threaded processors, and performing, by a second thread of the one or more multi-threaded processors, a gesture recognition operation on a second set of image frames associated with the gesture.

20 Claims, 68 Drawing Sheets

Related U.S. Application Data continuation-in-part of application No. 16/258,524, filed on Jan. 25, 2019, now Pat. No. 10,346,198, and a continuation-in-part of application No. 16/258,514, filed on Jan. 25, 2019, now Pat. No. 10,304,208, and a continuation-in-part of application No. 16/258,509, filed on Jan. 25, 2019, now Pat. No. 10,489,639, and a continuation-in-part of application No. 16/258,531, filed on Jan. 25, 2019, now Pat. No. 10,289,903.

(60) Provisional application No. 62/693,841, filed on Jul. 3, 2018, provisional application No. 62/660,739, filed on Apr. 20, 2018, provisional application No. 62/629,398, filed on Feb. 12, 2018, provisional application No. 62/693,821, filed on Jul. 3, 2018, provisional application No. 62/664,883, filed on Apr. 30, 2018, provisional application No. 62/654,174, filed on Apr. 6, 2018.

(51) Int. Cl.

| | | |
|---|---|---|
| *G06N 20/00* | (2019.01) | |
| *G06F 3/01* | (2006.01) | |
| *G09B 21/00* | (2006.01) | |
| *G06F 40/40* | (2020.01) | |
| *G06F 40/58* | (2020.01) | |
| *G10L 15/26* | (2006.01) | |
| *G06F 3/16* | (2006.01) | |
| *G10L 15/22* | (2006.01) | |
| *G10L 15/24* | (2013.01) | |
| *H04N 5/247* | (2006.01) | |
| *G06T 7/73* | (2017.01) | |
| *G06N 3/04* | (2006.01) | |
| *G06T 7/20* | (2017.01) | |
| *G10L 13/00* | (2006.01) | |
| *G06T 3/40* | (2006.01) | |
| *G06T 17/00* | (2006.01) | |

(52) U.S. Cl.
CPC .............. *G06F 3/167* (2013.01); *G06F 40/40* (2020.01); *G06F 40/58* (2020.01); *G06K 9/00248* (2013.01); *G06K 9/00315* (2013.01); *G06N 3/0454* (2013.01); *G06N 3/08* (2013.01); *G06T 7/20* (2013.01); *G06T 7/73* (2017.01); *G09B 21/00* (2013.01); *G09B 21/009* (2013.01); *G10L 15/22* (2013.01); *G10L 15/24* (2013.01); *G10L 15/26* (2013.01); *H04N 5/247* (2013.01); *G06K 9/00335* (2013.01); *G06N 20/00* (2019.01); *G06T 3/4046* (2013.01); *G06T 17/00* (2013.01); *G06T 2207/20084* (2013.01); *G10L 13/00* (2013.01)

(58) Field of Classification Search
CPC .. G06T 7/20; G06K 9/00355; G06K 9/00248; G06K 9/00315; G06F 40/40; G06F 40/58; G06F 3/013; G06F 3/017; G06F 3/167
See application file for complete search history.

(56) References Cited

U.S. PATENT DOCUMENTS

| | | |
|---|---|---|
| 5,659,764 A | 8/1997 | Sakiyama |
| 5,704,012 A | 12/1997 | Bigus |
| 5,887,069 A | 3/1999 | Sakou |
| 6,477,239 B1 | 11/2002 | Ohki |
| 7,027,054 B1 | 4/2006 | Cheiky |
| 8,488,023 B2 | 7/2013 | Bacivarov et al. |
| 8,553,037 B2 | 10/2013 | Smith |
| 9,418,458 B2 | 8/2016 | Chertok |
| 10,037,458 B1 | 7/2018 | Mahmoud |
| 2003/0191779 A1 | 10/2003 | Sagawa |
| 2006/0134585 A1 | 6/2006 | Adaamo-Villani |
| 2008/0013793 A1 | 1/2008 | Hillis |
| 2008/0013826 A1 | 1/2008 | Hillis |
| 2008/0201144 A1 | 8/2008 | Song |
| 2010/0044121 A1 | 2/2010 | Simon |
| 2010/0194679 A1 | 8/2010 | Wu et al. |
| 2010/0296706 A1 | 11/2010 | Kaneda et al. |
| 2010/0310157 A1 | 12/2010 | Kim |
| 2015/0317304 A1 | 11/2015 | An |
| 2016/0196672 A1 | 7/2016 | Chertok |
| 2016/0320852 A1 | 11/2016 | Poupyrev |
| 2016/0379082 A1 | 12/2016 | Rodriguez et al. |
| 2017/0153711 A1 | 6/2017 | Dai |
| 2017/0206405 A1 | 7/2017 | Molchanov et al. |
| 2017/0351910 A1 | 12/2017 | Elwazer |
| 2018/0018529 A1 | 1/2018 | Hiramatsu |
| 2018/0047208 A1 | 2/2018 | Marin |
| 2018/0101520 A1 | 4/2018 | Fuchizaki |
| 2018/0137644 A1 | 5/2018 | Rad et al. |
| 2018/0181809 A1 | 6/2018 | Ranjan |
| 2018/0189974 A1 | 7/2018 | Clark |
| 2018/0268601 A1 | 9/2018 | Rad |
| 2018/0373985 A1 | 12/2018 | Yang |
| 2018/0374236 A1 | 12/2018 | Ogata |
| 2019/0026956 A1 | 1/2019 | Gausebeck |
| 2019/0043472 A1 | 2/2019 | Garcia |
| 2019/0064851 A1 | 2/2019 | Tran |
| 2019/0066733 A1 | 2/2019 | Somanath |

OTHER PUBLICATIONS

McLaughlin et al., "Recurrent Convolutional Network for Video-based Person Re-Identification" (Year: 2016).*

Asadi et al., "Asurveyon deep learning based approaches for action and gesture recognition in image sequences" (Year: 2017).*

Chandler, T. et al. U.S. Appl. No. 16/258,514 Notice of Allowance dated Mar. 27, 2019, (pp. 1-8).

Chandler, T. et al. U.S. Appl. No. 16/258,524 Notice of Allowance dated Apr. 23, 2019, (pp. 1-16).

Chanler, T. et al. U.S. Appl. No. 16/258,531 Notice of Allowance dated Mar. 25, 2019, (pp. 1-8).

\* cited by examiner

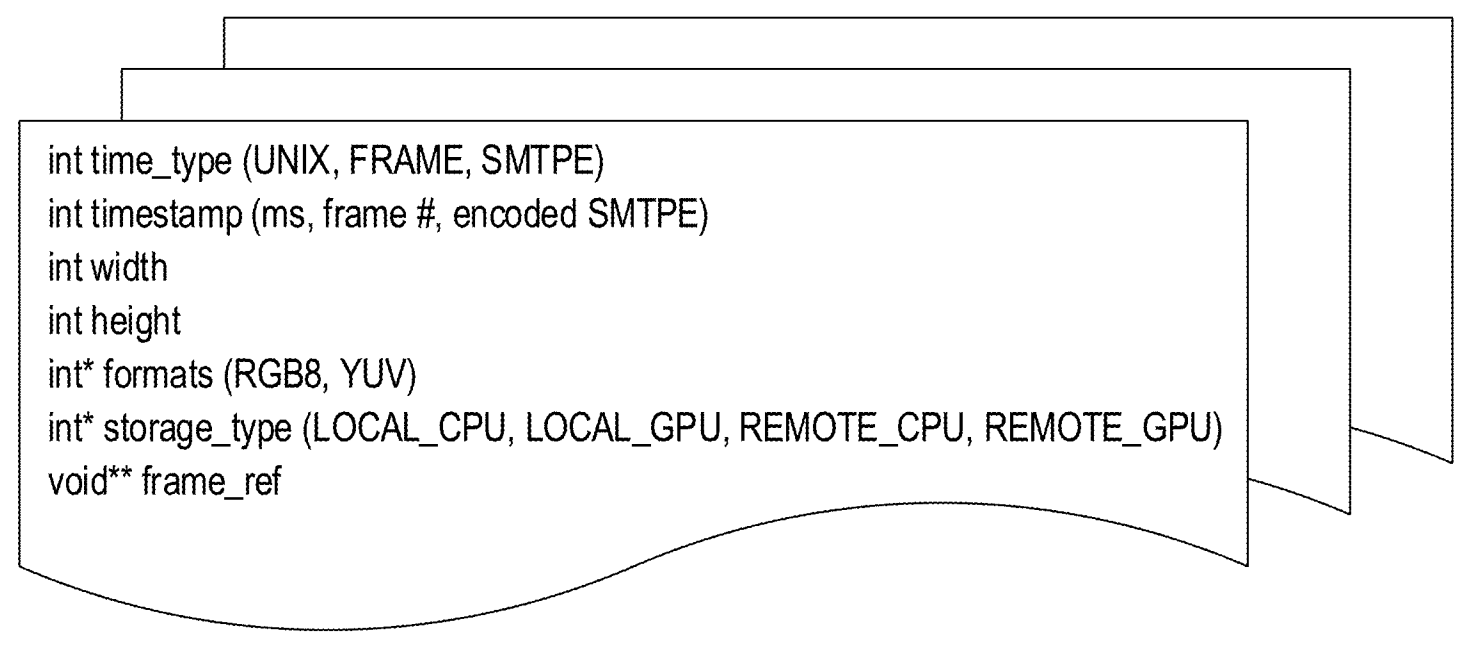

```
int time_type (UNIX, FRAME, SMTPE)
int timestamp (ms, frame #, encoded SMTPE)
int width
int height
int* formats (RGB8, YUV)
int* storage_type (LOCAL_CPU, LOCAL_GPU, REMOTE_CPU, REMOTE_GPU)
void** frame_ref
```

FIG. 33C

REAL-TIME GESTURE RECOGNITION METHOD AND APPARATUS

CROSS-REFERENCE TO RELATED APPLICATIONS

This patent document is a continuation of and claims priority to U.S. patent application Ser. No. 16/270,532 entitled, "REAL-TIME GESTURE RECOGNITION METHOD AND APPARATUS", and filed Feb. 7, 2019, which is a Continuation-in-Part of U.S. Ser. No. 16/258,524 entitled, "DATA PROCESSING ARCHITECTURE FOR IMPROVED DATA FLOW", and filed Jan. 25, 2019, which claims priority to and the benefits of U.S. Provisional Application No. 62/693,841 and filed Jul. 3, 2018, and U.S. Provisional Application No. 62/660,739 and filed Apr. 20, 2018, and U.S. Provisional Application No. 62/629,398 and filed Feb. 12, 2018; and is Continuation-in-Part of U.S. application Ser. No. 16/258,514, entitled "AUTOMATED GESTURE IDENTIFICATION USING NEURAL NETWORKS", and filed Jan. 25, 2019 and which claims priority to and benefits of U.S. Provisional Application No. 62/693,821 filed Jul. 3, 2018, and U.S. Provisional Application No. 62/629,398 filed Feb. 12, 2018; and is a Continuation-in-Part of Ser. No. 16/258,509 entitled "AUTOMATED SIGN LANGUAGE TRANSLATION AND COMMUNICATION USING MULTIPLE INPUT AND OUTPUT MODALITIES" and filed Jan. 25, 2019 and which claims priority to and benefits of U.S. Provisional Applications No. 62/664,883 filed Apr. 30, 2018 and U.S. Provisional Application No. 62/629,398 filed Feb. 12, 2018; and is a Continuation-in-Part of U.S. application Ser. No. 16/258,531 entitled, "VISUAL SIGN LANGUAGE TRANSLATION TRAINING DEVICE AND METHOD", filed Jan. 25, 2019 and which claims priority to and benefits of U.S. Provisional Application No. 62/654,174 filed Apr. 6, 2018 and U.S. Provisional Application No. 62/629,398 filed Feb. 12, 2018. The entire contents of the before-mentioned patent applications are incorporated by reference as part of the disclosure of this patent document.

TECHNICAL FIELD

This document generally relates to gesture recognition, and more particularly to real-time gesture recognition.

BACKGROUND

Computer vision is an interdisciplinary field that deals with how computers can gain high-level understanding from digital images or videos. Computer vision tasks include methods for acquiring, processing, analyzing and understanding digital images, and extraction of high-dimensional data from the real world in order to produce numerical or symbolic information. From the perspective of engineering, computer vision techniques seek to automate tasks that the human visual system can do, such as pattern recognition for recognizing patterns and regularities in data, and gesture recognition for interpreting human gestures via mathematical algorithms. A variety of information, such as video, audio, still images, etc., is captured as input for pattern and/or gesture recognition applications. One specification application of automated pattern and gesture recognition is sign language translation.

Sign language (also known as signed language) is a language that uses manual communication to convey meaning, ideas and thoughts. This can include simultaneously employing hand gestures, movement, orientation of the fingers, arms or body, and facial expressions to convey a speaker's ideas.

SUMMARY OF SOME EMBODIMENTS

Disclosed are devices, systems and methods for real-time interactive and automated gesture recognition in various applications, including automated sign language translation and communication. In an example, the Bible may be translated from any language to a particular sign language, or from one sign language representation to another, based on the embodiments disclosed in this document. In general, any textual, audible or sign language content may be translated in real-time to corresponding content in another audible, textual or sign language. This may be achieved, in-part, by capturing a communication in a sign language using a variety of different sensors, processing the captured data using a neural network architecture that uses pose estimation and precise optical flow, and then providing a translation in one or more alternative sign languages that are different from the input sign language.

In one aspect, the disclosed technology provides method for real-time recognition, using one or more multi-threaded processors, of a gesture communicated by a subject. This method includes receiving, by a first thread of the one or more multi-threaded processors, a first set of image frames associated with the gesture, the first set of image frames captured during a first time interval, performing, by the first thread, pose estimation on each frame of the first set of image frames including eliminating background information from each frame to obtain one or more areas of interest, storing information representative of the one or more areas of interest in a shared memory accessible to the one or more multi-threaded processors, and performing, by a second thread of the one or more multi-threaded processors, a gesture recognition operation on a second set of image frames associated with the gesture, the second set of image frames captured during a second time interval that is different from the first time interval, wherein performing the gesture recognition operation comprises using a first processor of the one or more multi-threaded processors that implements a first three-dimensional convolutional neural network (3D CNN) to perform an optical flow operation on the information representative of the one or more areas of interest that is accessed from the shared memory, wherein the optical flow operation is enabled to recognize a motion associated with the gesture, using a second processor of the one or more multi-threaded processors that implements a second 3D CNN to perform spatial and color processing operations on the information representative of the one or more areas of interest that is accessed from the shared memory, fusing results of the optical flow operation and results of the spatial and color processing operations to produce an identification of the gesture, and using a recurrent neural network (RNN) to determine that the identification corresponds to a singular gesture across at least the first and second sets of image frames.

In yet another aspect, an apparatus comprising a memory and a processor implements the above-described methods is disclosed.

In yet another aspect, the method may be embodied as processor-executable code and may be stored on a non-transitory computer-readable program medium.

The above and other aspects and features of the disclosed technology are described in greater detail in the drawings, the description and the claims.

BRIEF DESCRIPTION OF THE DRAWINGS

FIG. 33C illustrates an example customized template description for managing data access in accordance with an example embodiment of the disclosed technology.

DETAILED DESCRIPTION

Figure 1:
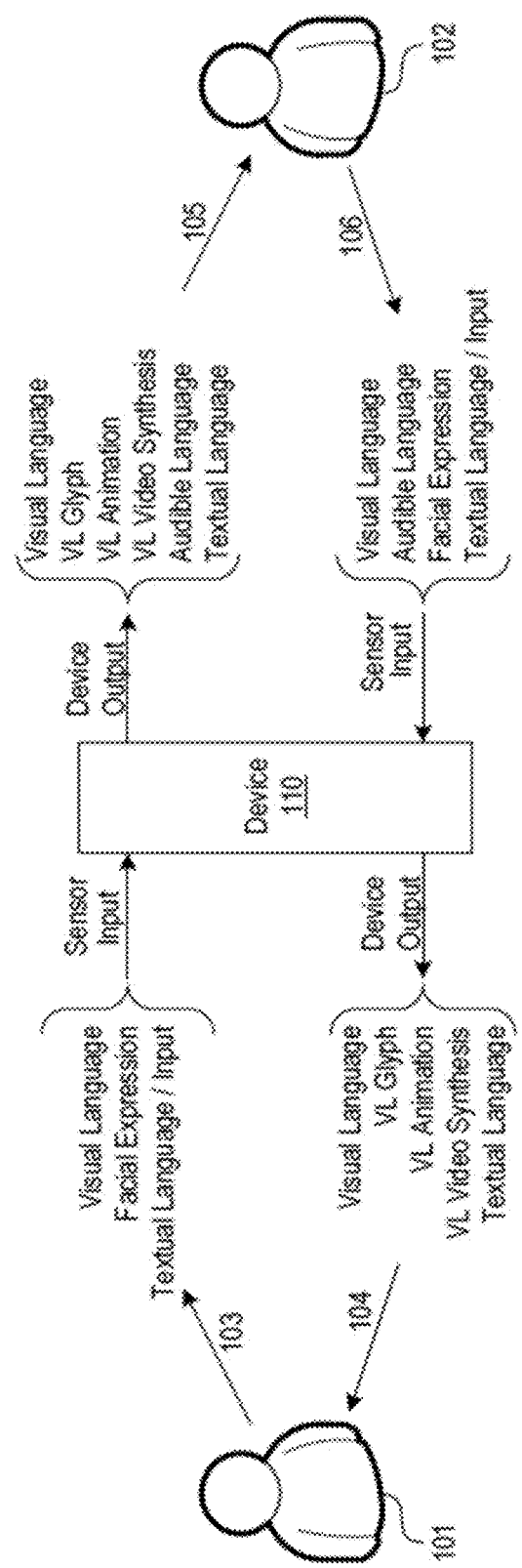
FIG. 1 illustrates a two-way translation system used by two parties in accordance with an example embodiment of the disclosed technology.

In this patent document, the word "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems. For example, in sign language translation systems, gestures are captured as input images. The images are then processed (e.g., removing background pixels, performing image segmentation, and/or matching the segments with signs stored in a database) to recognize what the gestures indicate.

Sign languages are extremely complex, and generally do not have a linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

While the embodiments of the disclosed technology find applications in different technologies, one example application of the disclosed embodiments relates to a versatile sign language translation system that is flexible and adaptable in that an input sign language, which can be any one of a several sign languages, is converted to an internal representation, allowing the input sign language into one or more of a variety of output sign languages. Furthermore, the embodiments described in this document employ a multiplicity of different sensors and processing mechanisms to be able to capture and process information that may not be obtainable when a single sensor or process is utilized. The disclosed embodiments further facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language. In doing so, the disclosed implementations utilize artificial intelligence (AI) systems that utilize different types of neural networks in multiple configurations.

Advancements in AI have started increasing in speed and capability at rates never experienced heretofore. This is expected as a pattern of technology historically, and with this reality, new problems that must be solved to continue this acceleration of capabilities, and the gains from using them, have surfaced. Action recognition is one of the most challenging aspects of pixel-based recognition through the use of AI components. The disclosed embodiments utilize include three-dimensional convolutional neural networks (3D CNNs), recurrent neural networks (RNNs), RNNs enhanced with long short-term memory (LSTM), dual bit-stream architecture with spatial/RGB and optical flow in their own 3D CNNs, fused at their 3rd (or output) layer to each other, and inflated convolutional neural networks (I3D) in various configurations to facilitate real-time gesture recognition.

Although the performance of at least some of the above described neural networks for performing action recognition has been implemented—and exceeds previous historical attempts—their performance and accuracy still fall below what is needed for widescale adoption, and to support enough use cases to make them useful, usable and practical.

The rapid advancement of new technologies in AI complicates the problem and creates a constantly changing technological eco-system where decisions are being made to complete the originally planned architecture of a system, perform a redesign based on new findings or attempt to maintain multiple systems, none of which are ideal. The lack of ideality is based on the time taken to switch from one system of artificial intelligence to another, even when they are partially, or mostly, similar. This is because there are no methods, tools, utilities or solutions, that make it simple to try new combinations of artificially intelligent components, such as neural networks, neural capsules, etc. To further complicate the problem, the training of AI components takes a very long time, where time is the resource that is being limited in general, creating a compound problem.

Embodiments of the disclosed technology, and its aspects described in this patent document, address these drawbacks, thereby achieving high accuracy in recognition of activities using artificial intelligence.

FIGS. 1-10 are illustrations offered to provide one example for the specific application of a sign language translation system that can benefit from the neural network configurations and processing that are described in later sections of this document. FIG. 1 illustrates a two-way translation system used by two parties in accordance with an example embodiment of the disclosed technology. As illustrated in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g. another sign language) that may include glyphs, animations or video synthesis (e.g. avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
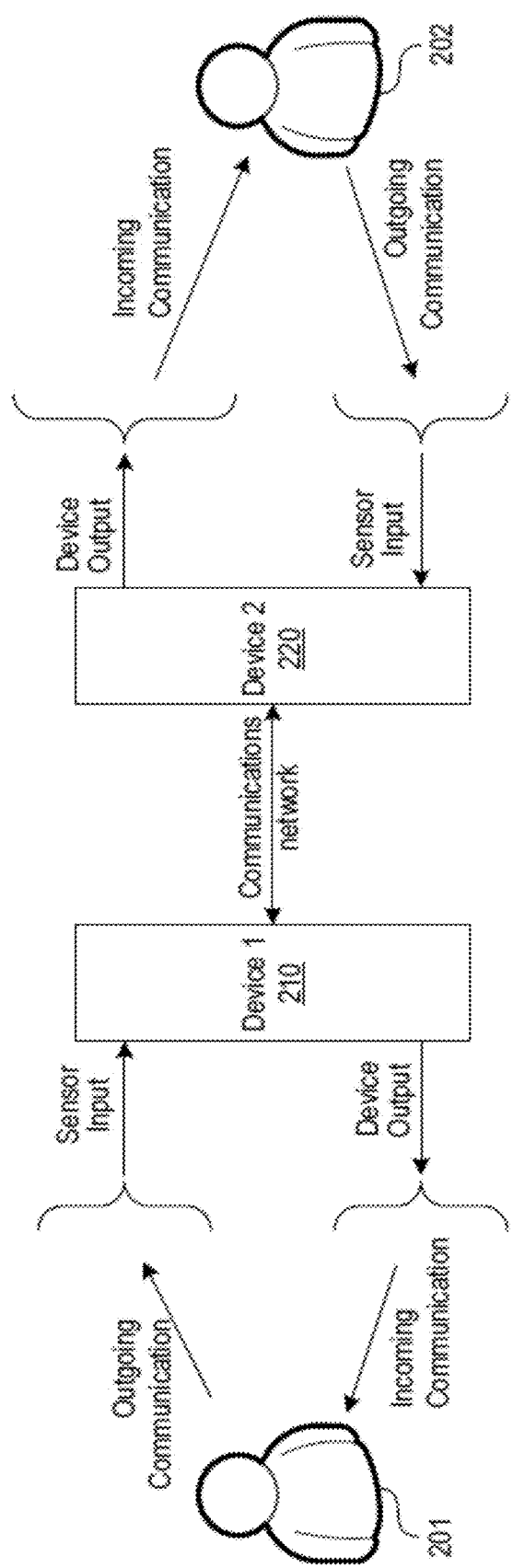
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As illustrated in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
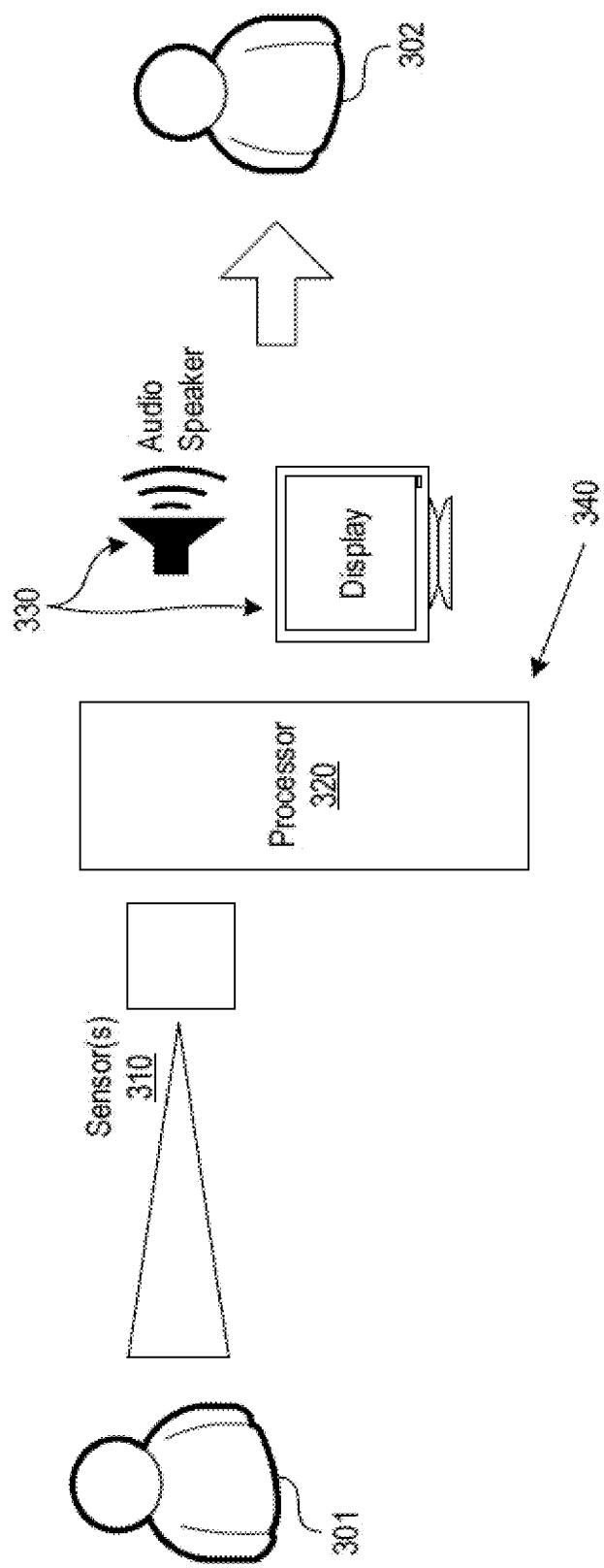
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those illustrated in FIGS. 1-2, and described above, and their description is not repeated. As illustrated in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include one or more gestures, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
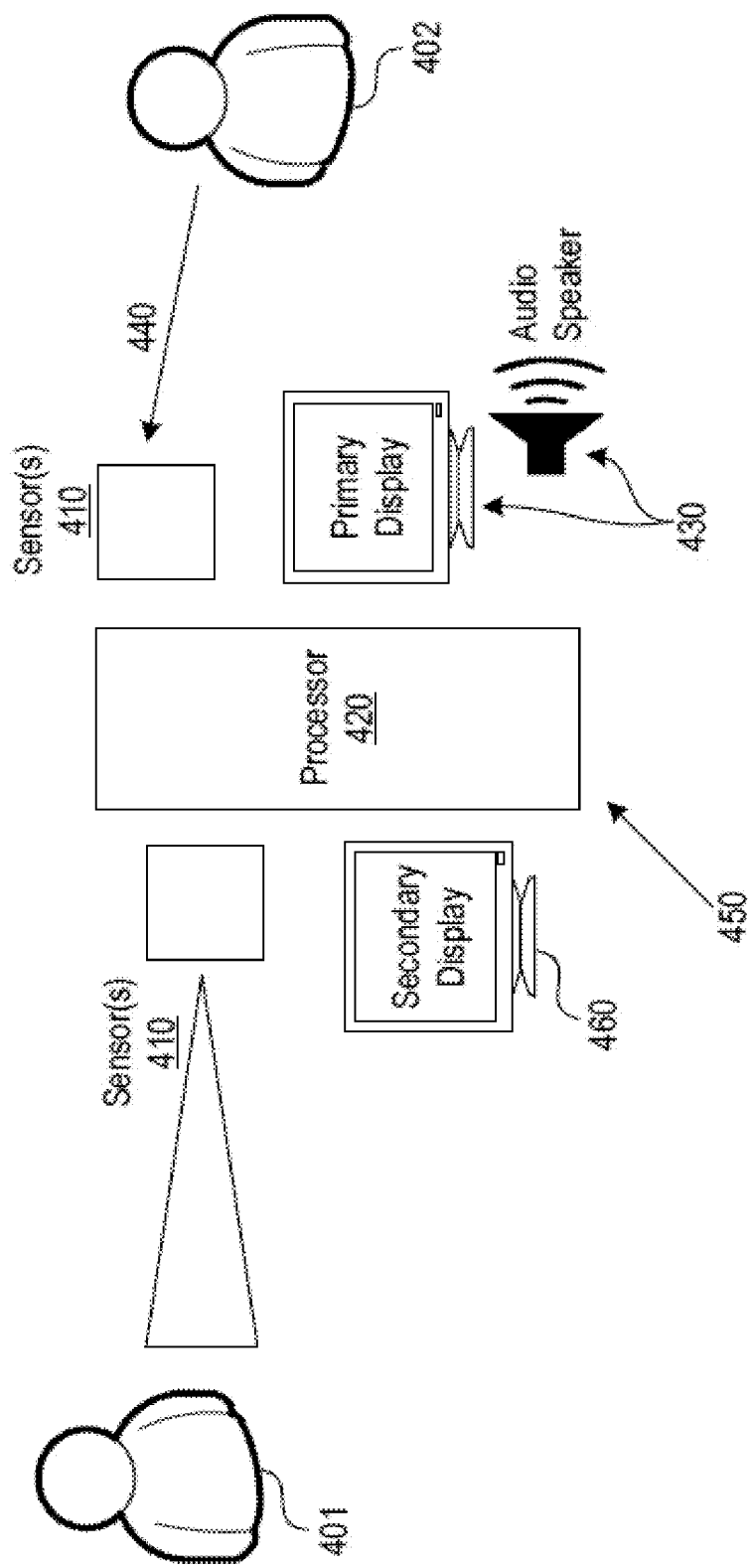
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As illustrated in FIG. 4, the translation system includes one or more sensors 410, one or more processors 420, and various output devices that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input interfaces, such as a keyboard or a touchscreen, to receive physical input from the second party 402.

The audible or textual input from the second part is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
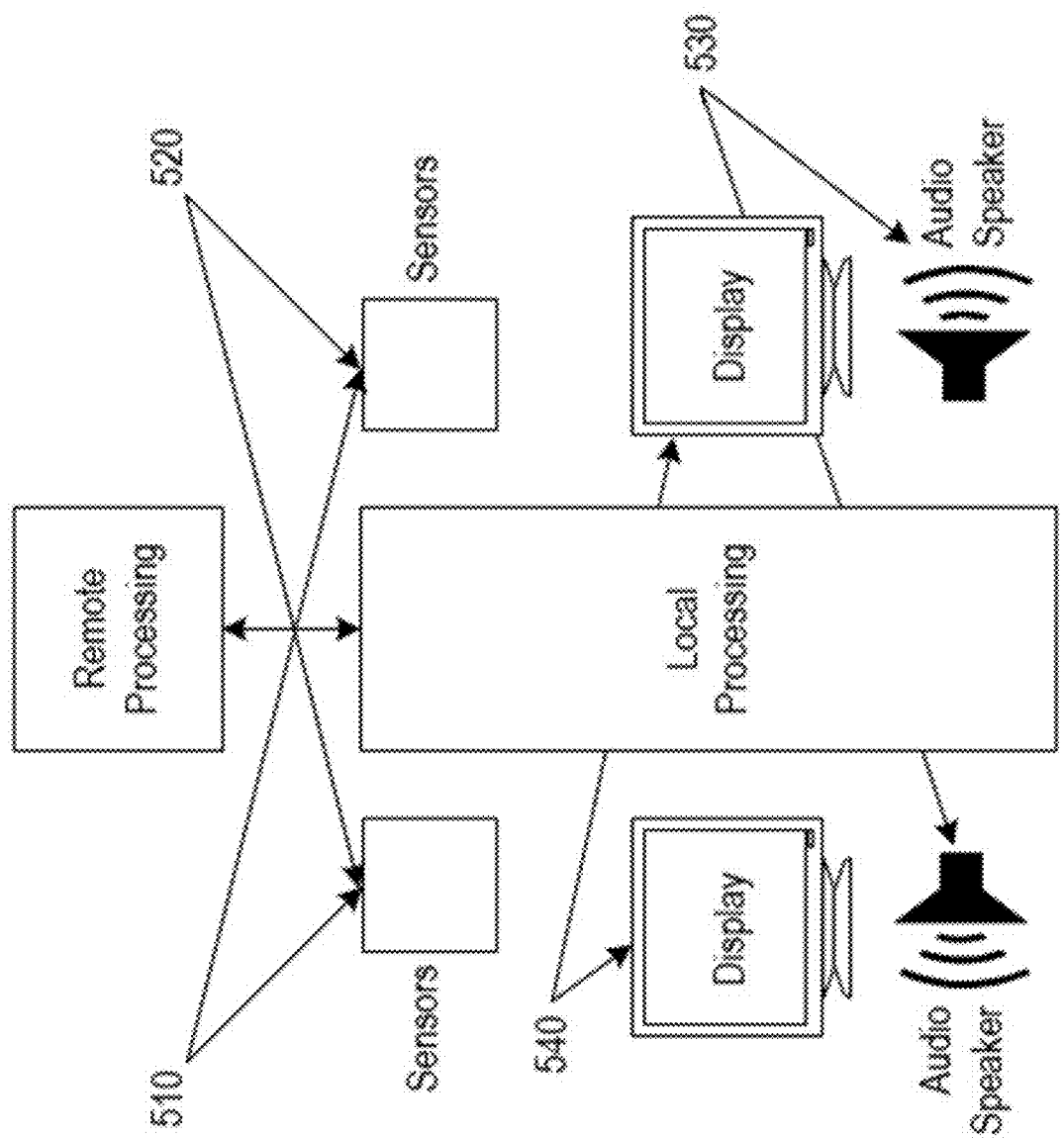
FIG. 5 illustrates a configurable automated translation system in accordance with an example embodiment of the disclosed technology.

FIG. 5 illustrates a configurable automated translation system in accordance with an example embodiment of the disclosed technology. As illustrated in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 520, e.g. a microphone, a microphone array or 3D microphone, a touchscreen keyboard, or a physical keyboard.

In addition to the input sensors described above, the device includes a host of output capabilities. For example, standard language rendering may be performed using a textual display 540 or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textual display 540 or speaker 530.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
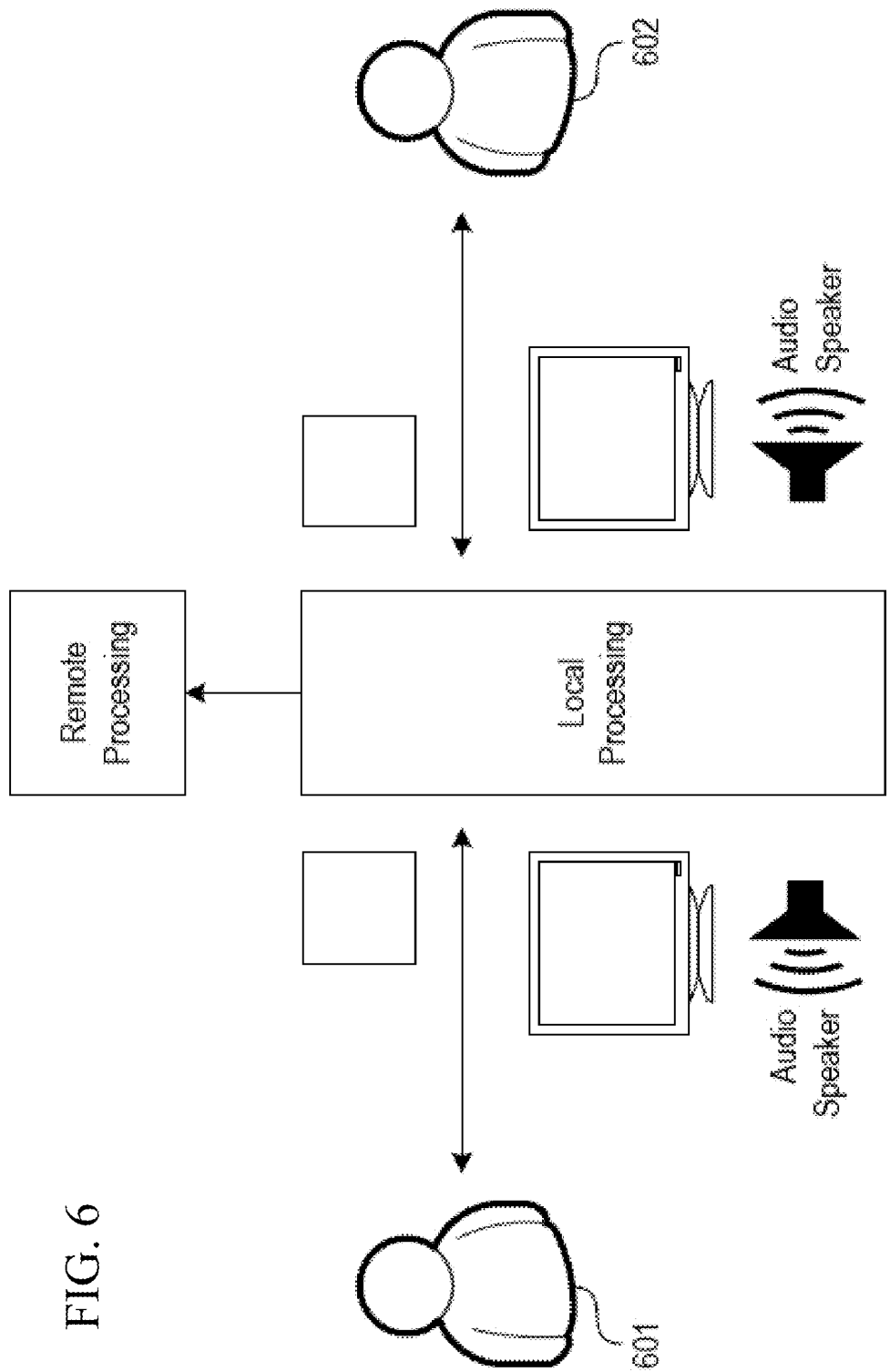
FIG. 6 illustrates another configurable automated translation system in accordance with an example embodiment of the disclosed technology.

FIG. 6 illustrates another configurable automated translation system in accordance with an example embodiment of the disclosed technology. As illustrated in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
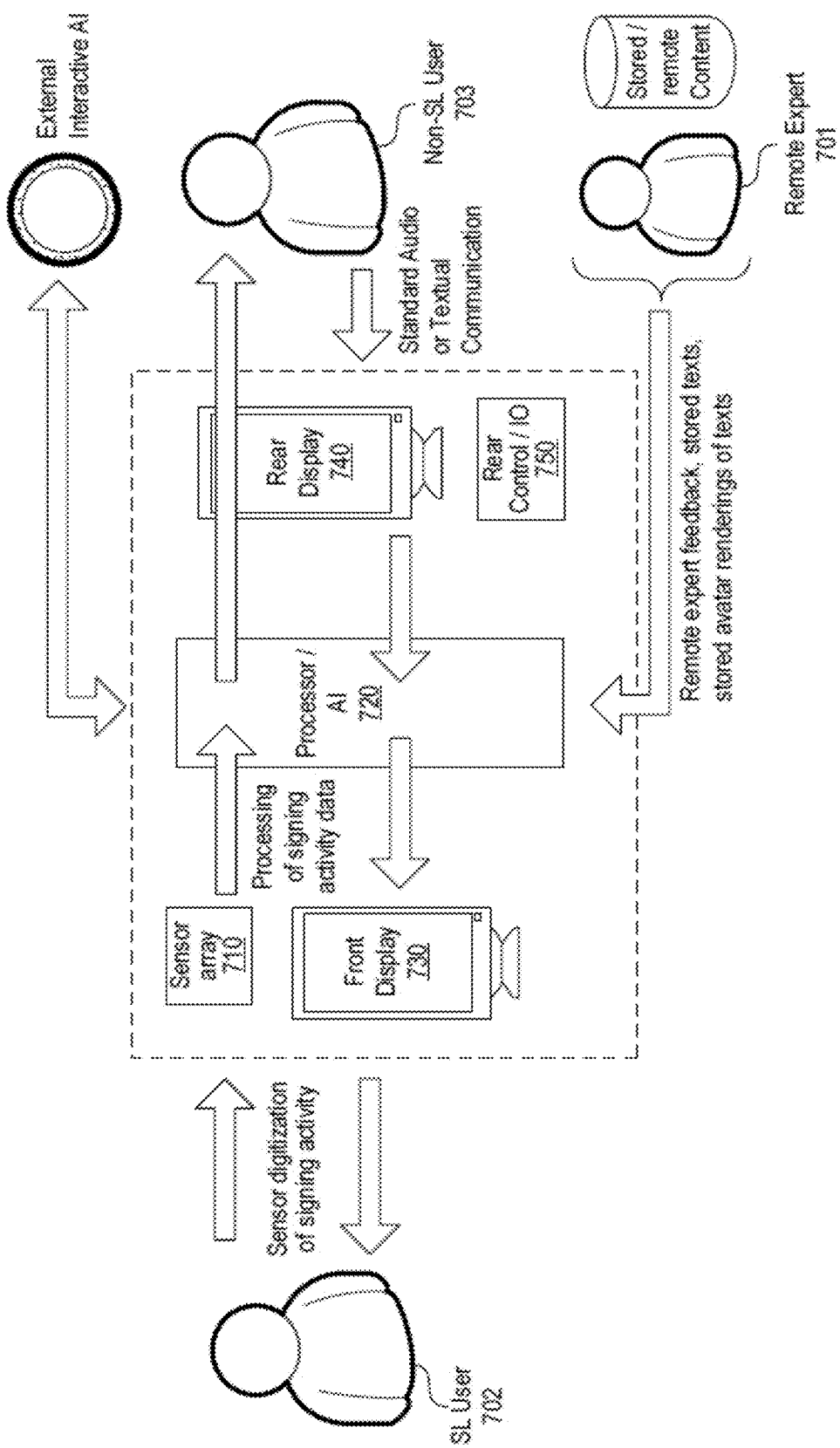
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language(s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8B:
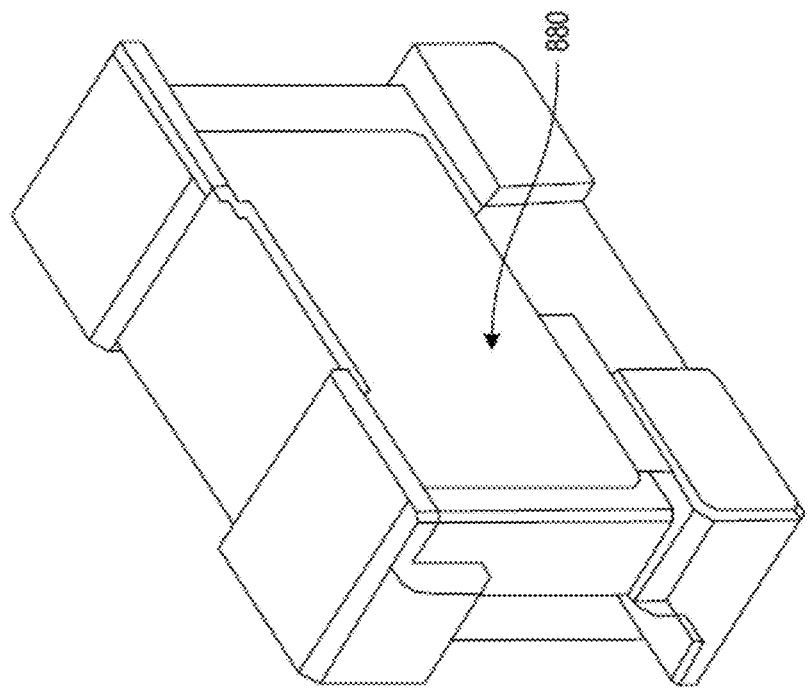
FIG. 8B illustrates another view of an image capture and processing device that can be used for automated sign language translation in accordance with an example embodiment of the disclosed technology.
Figure 8A:
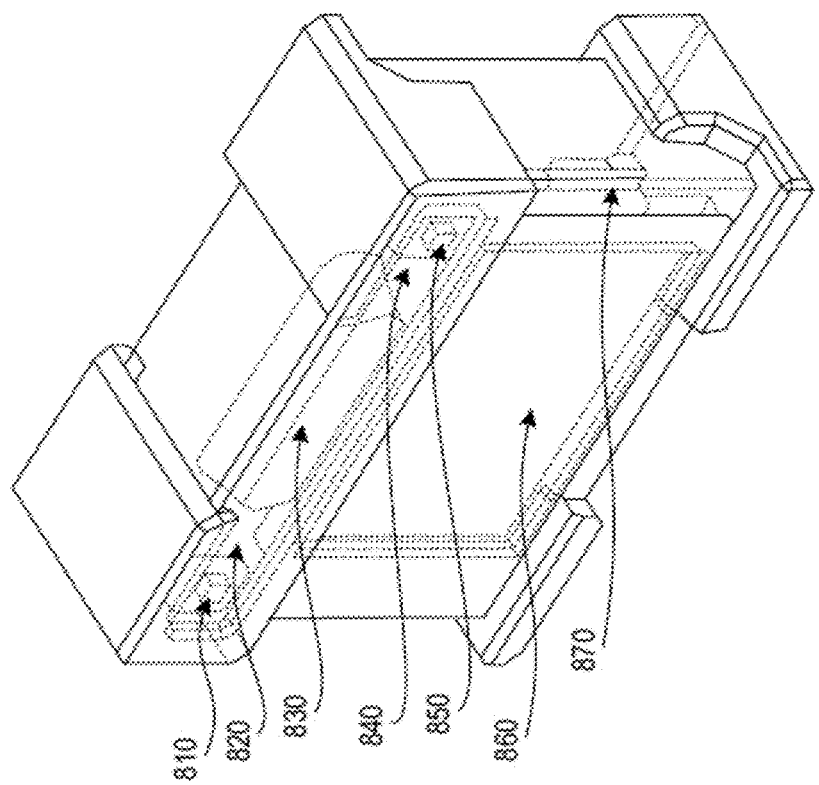
FIG. 8A illustrates one view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As illustrated in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 830, and one or more processors 870. In some embodiments, the one or more processors include an ARM Cortext-M3 processor and at least one graphics processing unit (GPU). In other embodiments, and as illustrated in FIG. 8B, the device may further comprise a rear display 880, which may be a touchscreen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
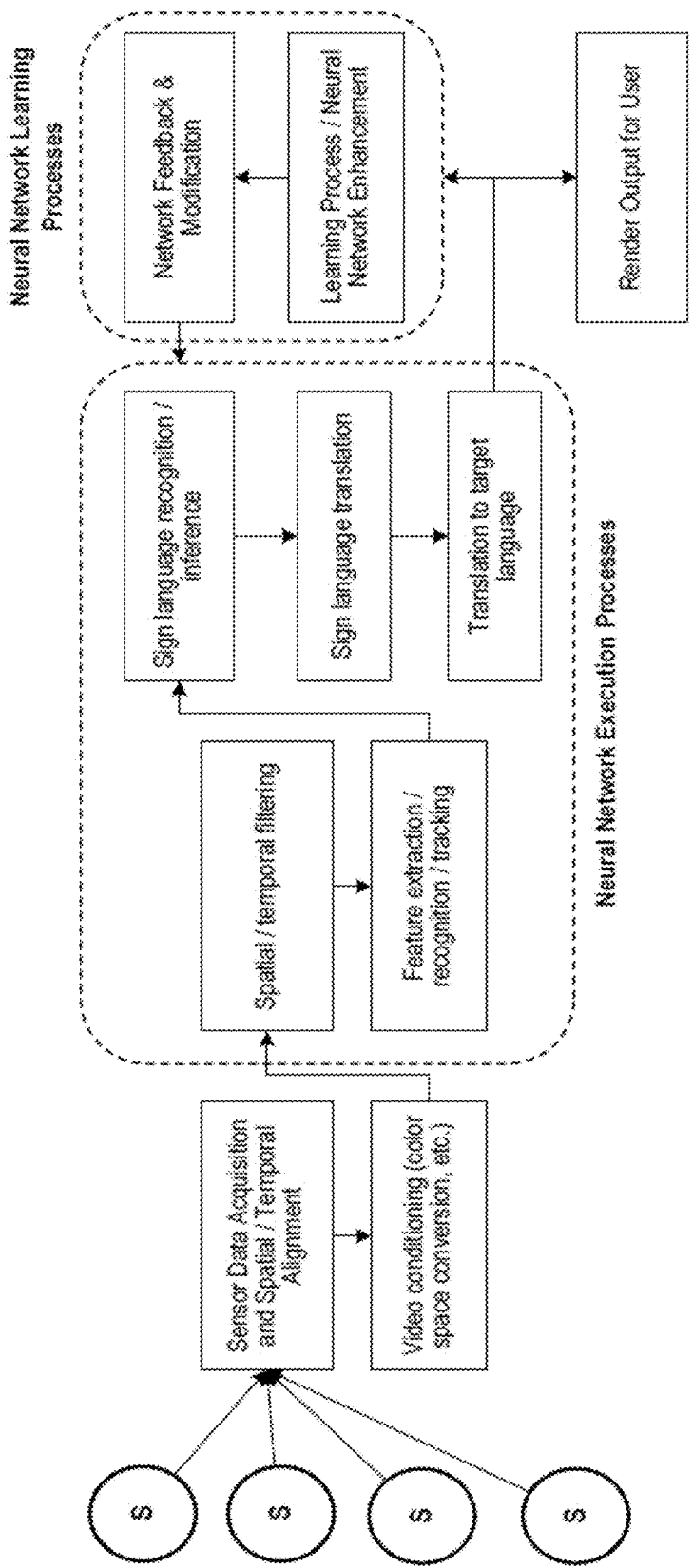
FIG. 9 illustrates a flow diagram of operations that can be carried out by various component to implement automated sign language translation in accordance with an example embodiment of the disclosed technology.

FIG. 9 illustrates an example flow diagram of operations that can be carried out by various components to implement automated sign language translation in accordance with one or more embodiments of the disclosed technology. This example includes some features and components that are similar to those described above, and their description is not repeated.

As illustrated in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations can be performed. For example, the input data collected from the multiple sensors is first aligned, both spatially and temporally. For example, based on the video quality and the external lighting and other conditions, video conditioning procedures (e.g. color space conversion) may be implemented. This operation may be followed by spatial and temporal filtering to, for example, reduce the data to a particular resolution, retain data for only a particular spatial zone of interest or a temporal period of interest. The processing may further include the application of image and/or video processing methods, e.g. edge detection, which conditions the data for additional processing.

The conditioned data of the communication from the sign language user can then be processed in order to extract features of gestures, facial cues and body cues, amongst other features that enable the identification of the sign language. The input sign language is translated to an internal representation, and subsequently translated to the target language. The output is then rendered to the user.

In some embodiments, the feature extraction, identification and translation may be part of a neural network execution process. Before the neural network starts the execution process, the neural network is trained by the neural network learning process. The techniques discussed in later sections of this document can be implemented in the neural network learning process to allow the trained neural network to recognize a large number of characteristics in the input data more efficiently and more accurately. To perform the neural network learning process, a set of training data can be used to carry out training algorithms such as supervised training of the neural network. In some embodiments, as part of feedback for the learning process, the translated sign language is used to further train and modify the neural network to improve its identification and translation capabilities. In yet other embodiments, reinforcement training of neural networks may be employed to improve performance and increase the flexibility and adaptability of embodiments of the disclosed technology.

Figure 10:
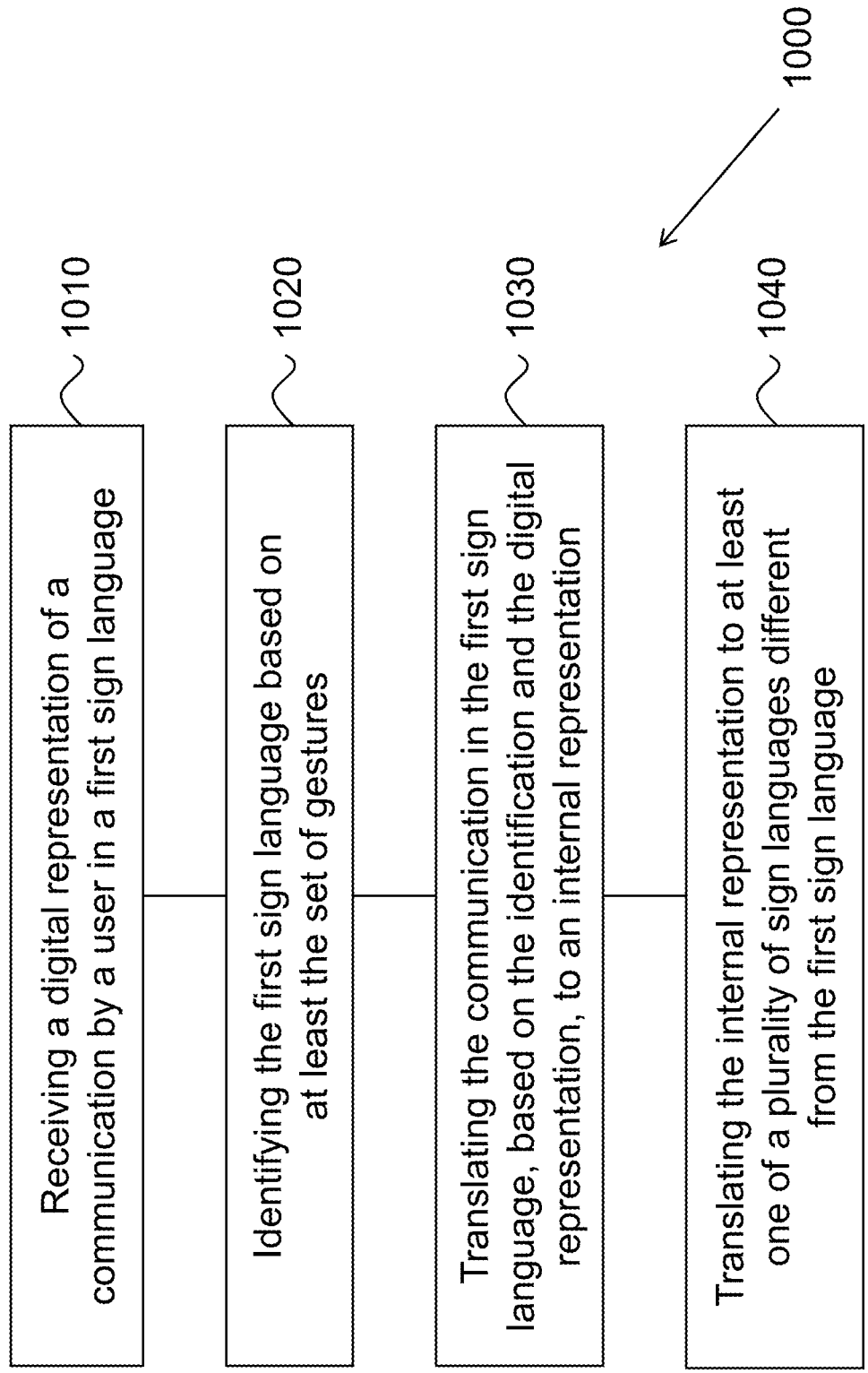
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1010, receiving a digital representation of a communication by a user in a first sign language. In some embodiments, the digital representation includes a plurality of images. In other embodiments, the digital representation includes a video recording.

The method 1000 includes, at operation 1020, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1030, translating the communication in the first sign language, based on the identification and the digital representation, to an internal representation. The method 1000 includes, at operation 1040, translating the internal representation to at least one of a plurality of sign languages different from the first sign language. In some embodiments, the translation may be based on sign language content curated by an expert. For example, and when translating known subject matter (e.g. the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained that must undergo further processing and analysis to extract the information of interest. Generation and analysis of large amounts of data are hallmarks of other systems and applications, such as autonomous vehicles and medical applications that involve analysis of medical images (e.g., MRI, X-ray, CT scan, video content, etc.). Additional applications for the teachings herein include, but are not limited to, interactive video games, airport security and surveillance applications, analysis and training for various sports, interactive home devices, and others.

Section headings are used in the present document to improve readability of the description and do not in any way limit the discussion or the embodiments (and/or implementations) to the respective sections only. Furthermore, various aspects of the disclosed technology have been described separately for clarity and ease of understanding, but are advantageously combined to provide real-time gesture identification.

1. Overview of Real-Time Gesture Recognition

In some embodiments, real-time gesture recognition is enabled by using improved pose estimation overlay and precise optical flow implemented in a multi-threaded and parallel processing manner, which advantageously leads to optimized performance and reduced hardware requirements. In some embodiments, these and other features and benefits are obtained by using a combination of (a) multiple apertures to capture the gesture using multiple modalities, (b) improved pose estimation processes, which use the pixels themselves for relevant part of the body (e.g., face, arms, legs, right hand, left hand, etc.), and (c) precise optical flow, which modifies optical flow pixels through a variety of sharpening, and line, edge, corner and shape enhancements. In some embodiments, accurate and real-time recognition is enabled, in part, by using a neural network architecture that includes multiple three-dimensional convolutional neural networks (3D CNNs), whose outputs are fused together, and then processed by a recurrent neural network (RNN), which persists the gesture recognition capability across multiple frames of the gesture. The optimized performance and hardware requirements are based, in part, on (a) having deliberately variated training media, (b) using parallel processing with multiple GPUs, and (c) using multi-threading between the capture and recognition processes.

Existing action and gesture recognition methods can be improved, as in their current states, they do not support recognition, with usable accuracy in real-time, where fine detail in the object(s) of interest are required. The disclosed embodiments describe configurations and methodologies that, among other features and benefits, provide improvements to:

Optical flow,
Pose estimation,
3D CNNs and their training libraries, and
Real-time frame capture of pixels to be recognized.

In this patent document, the improvements to these areas are sometimes referred to as precise optical flow, pose estimation overlay and improved pose estimation overlay. These and other features of the disclosed embodiments are briefly highlighted below including references to FIGS. 11-13.

In some embodiments, precise optical flow modifies pixels of a typical optical flow through a variety of sharpening, and line, edge, corner and/or shape enhancements. This generates a finely detailed version of optical flow, where motions of smaller objects, such as the fingers, hands, and other specific areas of the body, are recognized and can be used as part of a dual bit stream architecture, using two convolutional neural networks (see, e.g., Section 5), one with precise optical flow and the other with typical RGB and spatial data.

In some embodiments, pose estimation overlay uses pose estimation with body, fingers and face points as a transparent overlay on the pixels of the training library, and then again at runtime as new frames are captured, before sending them to the other neural networks for recognition. This provides an abundance of pixel-based features to accurately recognize against. To further enhance this capability, the fingers are tracked using unique colors per finger, allowing tracking down to the smallest parts of every single finger, with the pose estimation capturing 3D data instead of just 2D, giving even more identifying features for the recognition process.

In some embodiments, improved pose estimation overlay modifies a pose estimation overlay technique where, instead of the CNNs processing enormous numbers of pixel features spread across large numbers of hidden layers, only the data points themselves for the relevant parts of the body, such as the face, arms, legs, body, right hand, left hand, and other parts of our bodies are processed in the 3D CNNs.

Figure 11:
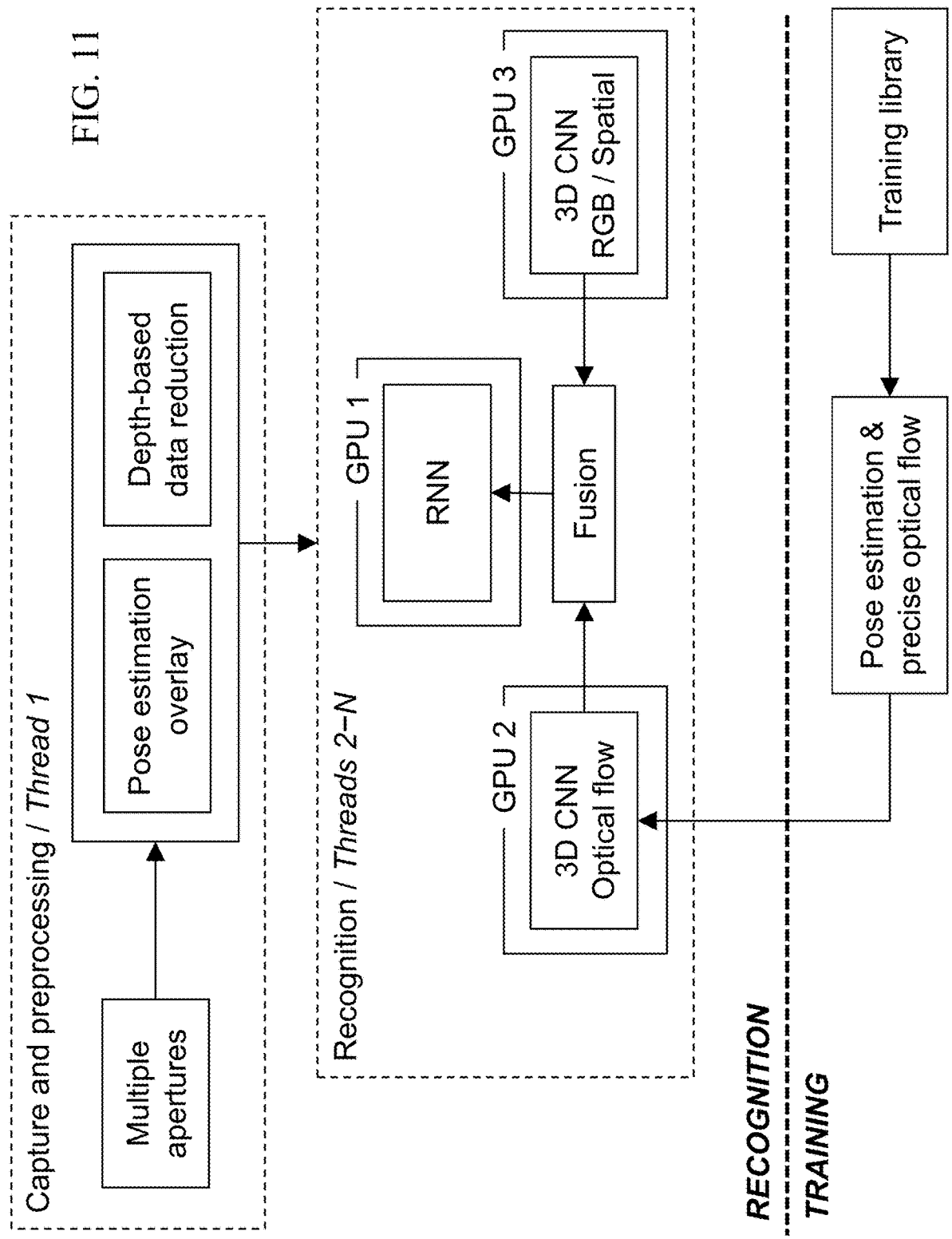
FIG. 11 illustrates an exemplary embodiment for real-time gesture recognition.

FIG. 11 illustrates an exemplary embodiment for real-time gesture recognition system, which includes a capture device with multiple apertures (see, e.g., Section 2) to capture the gesture communicated by a user (or subject), which undergoes preprocessing that includes pose estimation overlay (see, e.g., Section 5) and depth-based data reduction (see, e.g., Section 2). The preprocessed data is sent to a neural network engine (see, e.g., Section 5). For example, the neural network engine can include multiple 3D CNNs whose outputs are fused together prior to being sent to an RNN. In some embodiments, to facilitate the processing of large amounts of data that is provided to the neural network engine, the data capture process may be implemented using one thread and the recognition process implemented using one or more other threads (see, e.g., Section 4). In some embodiments, each of the 3D CNNs and RNN implementations may be instantiated on separate graphics processing units (GPUs) (see, e.g., Section 4). The optimized performance of the real-time gesture recognition is, in part, based on generation of a variated training library (see, e.g., Section 3), which is processed using improved pose estimation and precise optical flow algorithms (see, e.g., Section 5).

Figure 12:
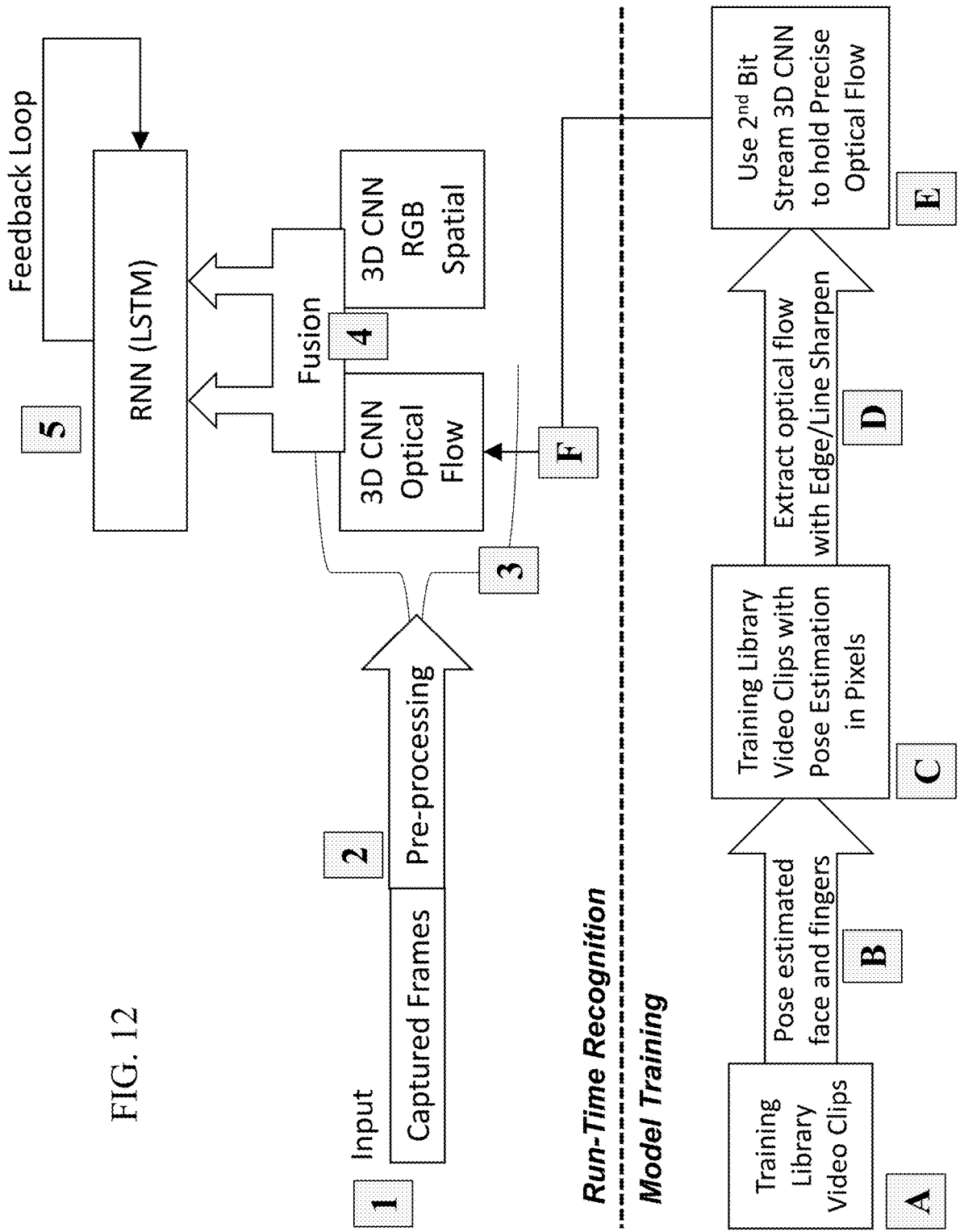
FIG. 12 illustrates an exemplary workflow for real-time gesture recognition.

FIG. 12 illustrates an exemplary workflow for real-time gesture recognition, which includes (a) model creation and (b) recognition. In some embodiments, and as shown in FIG. 12, the model creation (or training) process may include the following operations. For ease of description, certain operations or items in FIG. 12 are identified with letter A through F and 1 through 5. These operations and items are described below.

[A] Video clips are used for training, and may be generated using the training framework described in this patent document (see, e.g., Section 3), or may be provided by the user. The training video clips should cover the gesture to be recognized from multiple (and different) distances and angles. A diverse set of visual characteristics in the training video clips will enable high accuracy recognition.

[B, C] Each frame of the video is processed and pose estimation is applied to the pixels for the body, face and fingers. This results in the training video clips with overlaid pose estimation pixels.

[D] Optical flow is extracted from the frames with overlaid pose estimation pixels. After feature extraction, line, corner, shape and edge rendering is performed to allow borders of the shapes in the training media to be accurate and enable differentiation of one part from another. In some embodiments, sharpening and blur corrections may be applied. This results in very precise feature identification, advantageously enabling far more accurate recognition of movement (flow) of objects that occur across time.

[E, F] The extracted and processed features are provided for training a 3D CNN, as a first bit stream, and a second bit stream for a second 3D CNN includes spatial and color (e.g., RGB) information. The output layers of the two 3D CNNs are fused, thereby enabling the convolution to run across both 3D CNNs, so flow and RGB/spatial information can be processed together as part of the same convolutional kernel.

As also seen in FIG. 12, the recognition process includes the following operations.

[1] Frames are captured from a device with multiple apertures (see, e.g., Section 2), or a webcam or other sensor. The frame capture is implemented using its own thread, and another different thread is used for the recognition system (see, e.g., Section 4) that is ready to accept a frame.

[2] The captured frame is pre-processed with pose estimation for the body, face and fingers, and the resulting pose estimation is laid on top of the existing frame pixels using a transparent layer.

[3] The resulting frames are provided to the recognition process, and both the 3D CNNs begin the recognition process—e.g., one from a motion (optical flow) perspective and the other from a RGB/spatial information perspective.

[4] The two 3D CNNs are fused together to enable their output layers to be processed jointly and using both their data streams.

[5] The recognition results for each frame of pixels are provided to the RNN, which uses, e.g., Long Short-Term Memory (LSTM) to track the recognition process temporally (across time). In some embodiments, the RNN with LSTM uses its own feedback loop to track state across more than a single round of recognition.

Figure 13:
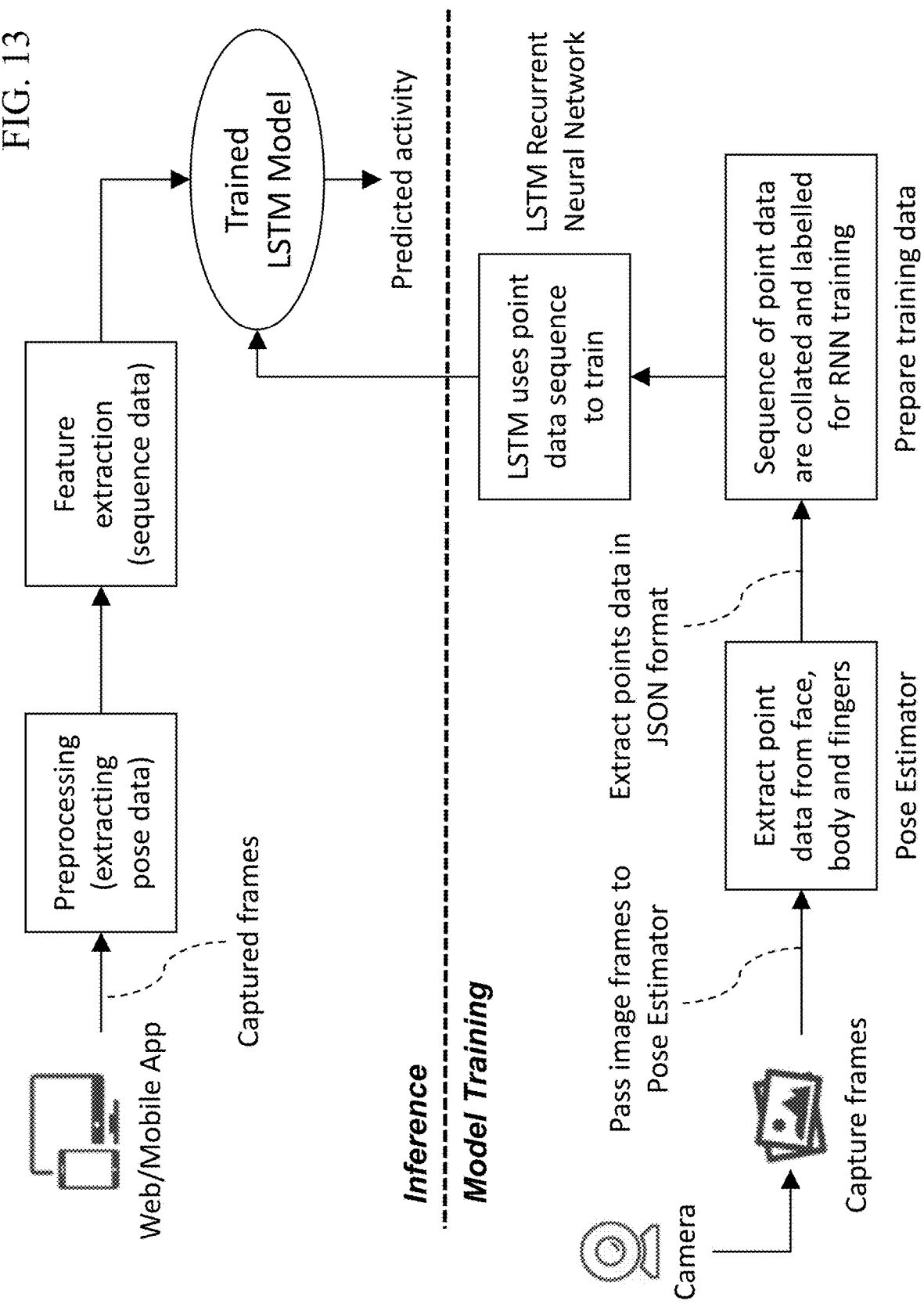
FIG. 13 illustrates an exemplary workflow for improved pose estimation overlay.

FIG. 13 illustrates an exemplary workflow for improved pose estimation overlay, which advantageously enables a significant reduction in the size of the inference model. For example, in one implementation of the process described in FIG. 13, an original model with a size of 1.2 GB was reduced to 384 KB, corresponding to a 96.8% reduction, which is based on only storing the specific data points needed to recognize information across frames (instead of storing all the pixels in each frame).

By utilizing the pose estimation process, the noise in the data that is fed to a neural network is reduced. Some embodiments of the disclosed technology include a pose estimation process that has been configured to extract the X and Y coordinates of pixels that correspond to important points in the image, generally ones that have changed positions within a tolerance of the previous frames set of data points. These points include face, fingers, shoulders, hips, elbows, wrists and knees. The extracted point data is used instead of the image frame's pixels as input to the RNN.

2. Examples of Multiple Input/Output Modalities

Machine-assisted interpersonal communication (or technology-assisted communication) involves one or more people communicating by means of a mechanical or electronic device or devices with one or more receivers. The devices that are used can give the communication permanence (e.g., storage devices) and/or extend its range (e.g., wireless communication) such that the source and receiver can be separated in time and space. One specific application of using devices for machine-assisted interpersonal communication is sign language communication and translation.

In some embodiments, the example configurations in FIGS. 1-13 can include a device that supports multiple modalities in order to capture the complexities and nuances of sign language for its communication and translation.

Figure 14:
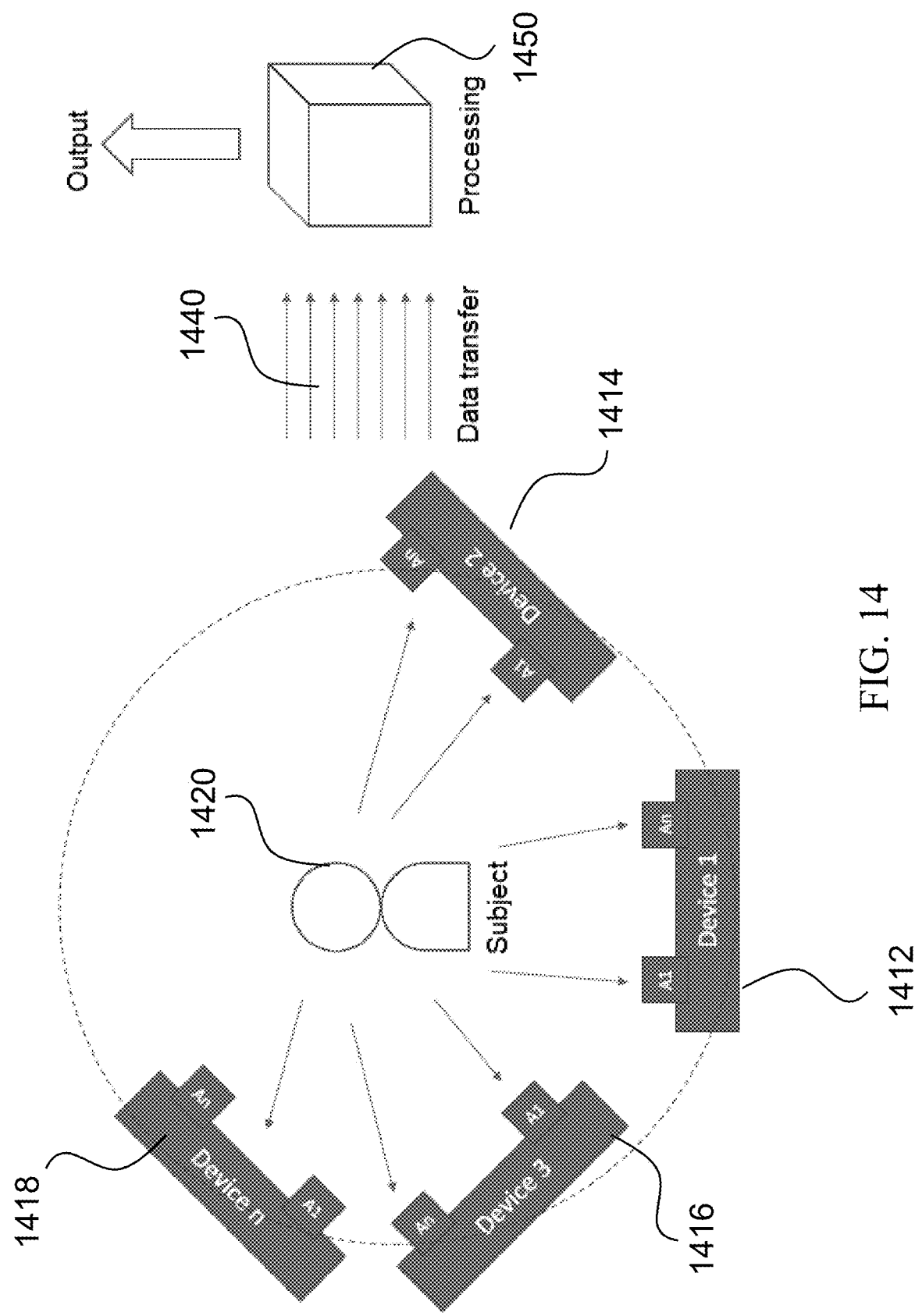
FIG. 14 illustrates an example system for sign language recognition using a device with multiple input and output modalities.

FIG. 14 illustrates an example system for sign language recognition using multiple input and output modalities. As illustrated therein, a number of devices (Device 1, Device 2, . . . Device n, denoted 1412, 1414, . . . 1418, respectively) each include multiple apertures (A1, . . . An) that are arranged around the subject 1420. The orientation of the devices and apertures ensure that the nuances of movements of the sign language being communicated by the subject are captured. In an exemplary implementation, the multiple apertures are arranged so as to cover multiple angles (and perspectives) of the subject and in different spatial planes. In other words, the multiple apertures are not all aligned on the same horizontal or vertical axis.

In an example, each of the devices (1412, 1414, 1416, 1418) illustrated in FIG. 14 typically use an approximately 90° horizontal field-of-view (HFOV), and they are generally oriented by less than half the field-of-view in camera disparity applications (which refers to the use of multiple apertures to capture the same subject). Based on sampling and interferometric considerations, a system with three devices may have a first camera facing the subject head-on, a second camera 90° to one side, and a third camera 45° to the other side. In one exemplary system, these three cameras may be placed in a single horizontal plane. In another exemplary system, the second or the third camera may be positioned at an elevated position of 25-30° above the plane of the other two cameras. In yet another exemplary system, a fourth camera may be placed at an elevated position with respect to the plane.

In some implementations of the disclosed technology, one or more of the devices illustrated in FIG. 14 may be a special type of camera that projects a pattern of light (e.g., through a holographic diffuser) in the Near IR region (~850 nm, which is invisible to humans), and which is detected by a silicon focal plane array (FPA). This advantageously enables depth information to be captured in higher detail as compared to using pure stereoscopic imaging. This framework is typically referred to as a "structured light" camera. In this configuration, the projection "aperture" of the structured light can be mounted to a rigid structure with the stereo apertures to ensure consistent alignment with the cameras and visible camera video can then be combined with the depth information.

By using multiple apertures (or equivalently, multiple input and output modalities) on a single device, and/or multiple multi-aperture devices, a more complete 3D model of a video scene can be captured in real time with enough fidelity to enhance the performance of algorithms acting on the data.

The use of multiple apertures results in the capturing of additional information that cannot be not captured using existing technologies. For example, a conventional camera records light intensity from a single point-of-view, and typically using a single aperture. In another example, a light-field camera captures information about the light field emanating from a scene; e.g., the intensity of light in a scene, and also the direction that the light rays are traveling in space. Light-field cameras are well-suited for static images (or scenes) and enable refocusing the image after the image has been taken.

In contrast to conventional technologies, implementations of the disclosed technology capture an increased amount of information for the same pixel using different cameras and apertures. For example, each camera of a plurality of cameras can capture a different view of the same movement by the subject. While the disclosed devices can be readily equipped with optical elements that can perform focusing in the traditional sense, in one example, this increased amount of information (in an information theory sense) is captured without any refocusing considerations. As such, the captured data includes information that can be used on an as-needed basis. For example, if there is a need to provide a higher resolution image of a particular segment of the captured object, or to analyze a particular motion from different angles, such information can be readily extracted from the captured data. Further note that this increased amount of information becomes increasingly more important to capturing motion, as compared to static images.

In some examples, each of the devices in FIG. 14 may be a single-FPA that is capable of capturing depth information for an image or a frame of a video. Implementations of the disclosed technology may use imaging chips capable of sensing the phase angle of an incident ray on a single pixel with no requirement of a corresponding multi-pixel lenslet. In other words, the devices illustrated in FIG. 14 may effectively sample the quadrature phase information of incoming electrometric radiation (e.g., light) thereby capturing depth information on a per-pixel basis. The use of one or more single- and multiple-aperture visual sensing devices to capture a movement of a sign language from different angles to subsequently enable robust and accurate identification of the movement is one of the capabilities of the disclosed technology.

As illustrated in FIG. 14, the digital representation of the movements of a sign language communicated by the user are transferred (e.g. using a data transfer module 1440) to a processing module 1450. Some implementations may include additional processing and/or hardware capabilities for pre-processing, time-aligning and post-processing the different views of the subject, and subsequently interpreting them to identify the movement communicated by the subject.

For example, each device illustrated in FIG. 14 may include an ARM processor running a variant of the Linux operating system, which may be used for the pre- and post-processing operations of the disclosed methods. The pre- and post-processing operations may include filtering, transforming and other image processing operations. In some implementations, the processing of the video and images through an artificial intelligence (AI)-based deep neural network (DNN) or convolutional neural network (CNN) may be performed on-board, prior to the off-platform transform.

More generally, numerous video processing operations, including but not limited to timestamping, decoding/encoding, color space conversion, de-Bayering, and other signal and/or image processing, may be performed using on-board GPU hardware in the device.

In an example, aligning the digital representations captured using the multiple apertures in the temporal domain may be implemented using a GPS (Global Positioning System) 1 PPS (pulse-per-second) signal or a network-based time service (e.g. NTP (Networking Time Protocol) or SMPTE timecodes. In an example, the camera clocks may be synchronized using NTP or the 1 PPS signal.

In other examples, the clocks for both the active and passive cameras in the system are synchronized locally via a common clock signal based on the support of the individual hardware devices. Some cameras may directly link their clock signals, but most commonly a frame integration pulse is used, either rising and falling at the start of the frame, or staying high through the integration duration, and then falling low during readout. Typically, the focal plane array (FPA) manufacturer (e.g., Sony, ON, Aptina, etc.) specifies the compatible pin signals for clock synchronization. This signal synchronizes the clocks locally, and can then be synchronized globally either through the network, and/or via 1 PPS or greater GPS sync lines from an on-board GPS receiver. Commonly, a GPS device is used in concert with the NTP software to provide distributed timing information to networked devices, which then "slew" their timing signal to match the reference, resulting in synchronized frame captures throughout the networked devices. In some embodiments, the networked devices include multiple input modalities, e.g. a depth-field camera, a sound sensor and an infra-red (IR) camera. For example, the clocks in each of the modalities may be synchronized based on the PPS or GPS signals.

In certain scenarios, the system may not necessarily require the data from all apertures to be registered or consolidated prior to processing. For example, the processing algorithms may process multiple camera feeds from multiple angles independently. While a single camera with one aperture may be sufficient for the recognition of a simple sign corresponding to a single letter, e.g., "A," a sign involving motion would necessitate multiple apertures to be recognized accurately. Furthermore, reading the "emotion" of the subject may require facial analysis from a completely independent data stream than the one used to identify the sign language movements. Implementations of the system may beneficially make the independent data streams available in both raw and processed formats, so that various (and very different) algorithms may be used to robustly and accurately interpret sign language. In one example, the OpenPose library may be used to implement facial recognition algorithms. In another example, algorithms that could be used for facial recognition may include principal component analysis using eigenfaces, linear discriminant analysis, elastic bunch graph matching using the Fisherface algorithm, the hidden Markov model, the multilinear subspace learning using tensor representation, and the neuronal motivated dynamic link matching. Thus, the accuracy of results may be improved by including unique information, which is not possible to observe except through implementations of the disclosed technology.

Figure 15:
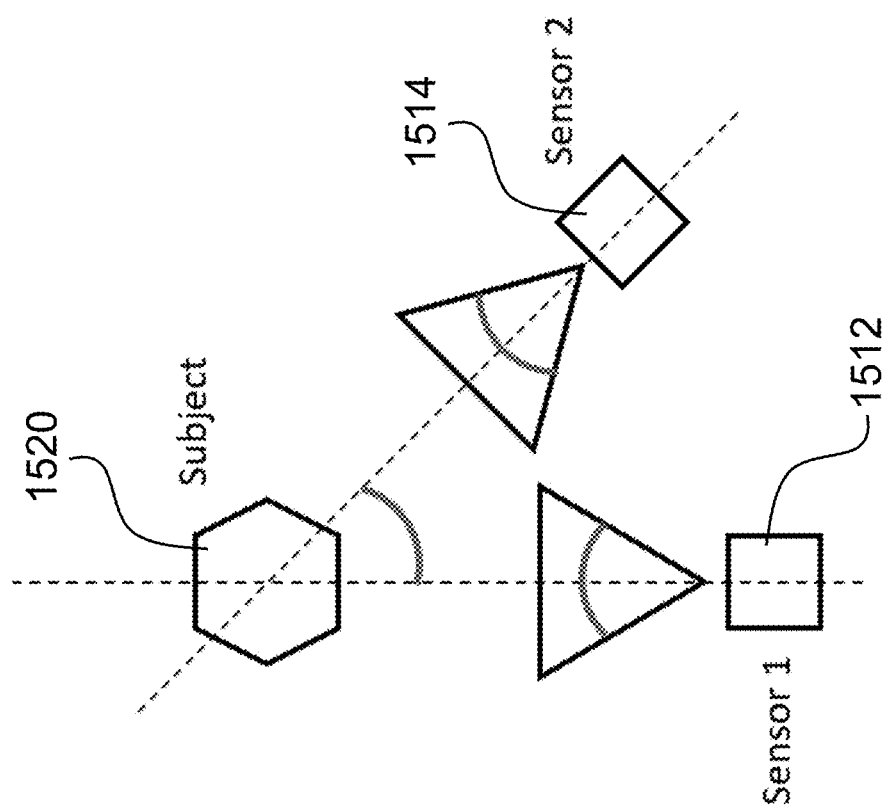
FIG. 15 illustrates another example system for sign language recognition using a device with multiple input and output modalities.

FIG. 15 illustrates another example system for sign language recognition using a device with multiple input and output modalities. As illustrated therein, two sensors (Sensor 1 and Sensor 2 denoted 1512 and 1514, respectively) are arranged to ensure that nuances of sign language movements by the subject 1520 are captured in order to increase the recognition capabilities of the subsequent processing algorithms. In an example, two sensors may be arranged with a 4° field-of-view (FOV) overlap. As illustrated in FIG. 15, the two sensors are arranged to provide a 45° FOV with an angular separation of $(45-2\times4)=37°$ angular separation.

In alternate implementations, the desired FOV overlap may be computed for multiple devices, and as discussed above, may be implemented such that the devices are not aligned along the same horizontal or vertical axis. In general, the more the data collected by each sensing device differs, the richer the overall data set after processing will be. Furthermore, and in the context of being able to interpret the different nuances of sign language (e.g., movement, emotion, etc.), the different feeds from each of the multiple sensing devices can be processed by different algorithms. Having overlapped pixels (or more generally, information) from each device enables their alignment after possibly disparate processing, and results in accurate and robust interpretation of signed language.

For example, one set of visual sensing devices can capture information related to the movements of the sign language being performed by a subject's hands, which is processed by an AI-based DNN or CNN to interpret its meaning. Additionally, a different set of visual sensing devices can capture information related to the movement of the eyebrows, gaze direction and blinks of the subject, which is processed by facial recognition algorithms. In an example, the subject may look upward when indicating a hypothetical statement. Thus, implementations of the disclosed technology are able to align and combine disparately processed results to provide more accurate interpretations of the subject's thoughts and meanings.

In some embodiments, the Sensor 1 and Sensor 2 may be implemented using the exemplary device illustrated in FIGS. 8A and 8B. Referring back to FIGS. 8A and 8B, the device illustrated therein may include a depth sensor that may advantageously augment the amount of information collection for signal language recognition, and which may be configured to measure the "depth" or distance from the camera focal baseline to the object corresponding to a particular pixel in the scene.

In a first example, the depth sensor may operate using structured light projections that are based using a light source to project a known pattern, and using a receiver to detect the distortion of the reflected pattern to calculate a depth map based on geometry. This approach can produce very accurate depth measurement results, but can be computationally expensive. Furthermore, structured light projections are sensitive to environmental brightness, and are typically used in dark or indoor areas.

In a second example, the depth sensor may operate based on the time-of-flight (ToF) approach that relies on a light source to send out a pulse and a sensor to detect that pulse's reflection off the target object to record it's time of flight. The ToF-based depth sensor may be implemented using a short pulse to provide very accurate (and more expensive) results, or it may use a modulated pulse and detect a phase change, which provides less accurate (but much cheaper) results.

The use of a depth sensor (or equivalently, depth information obtained from one or more apertures of one or more sensing devices) advantageously enables filtering out data that is not related to the sign (e.g., the gesture formed by the signer) itself. For example, the gesture/movement recognition algorithms can be used to remove unrelated or unnecessary pixels from the image that are not within a desired depth range. Additionally, a "3D" framework for the movement may be established using the depth information, so as to be able to detect nuances in not only the image plane, but even in planes that are perpendicular to the image plane.

Figure 16A:
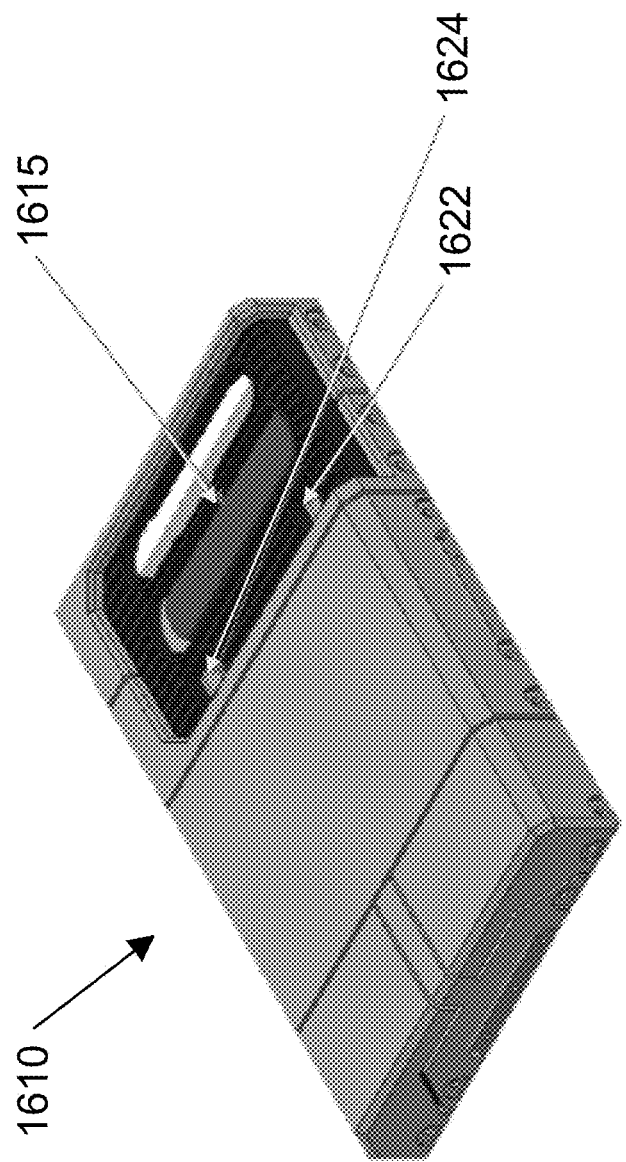
FIGS. 16A, 16B and 16C illustrate an example device for sign language recognition using a device with multiple input and output modalities.
Figure 16B:
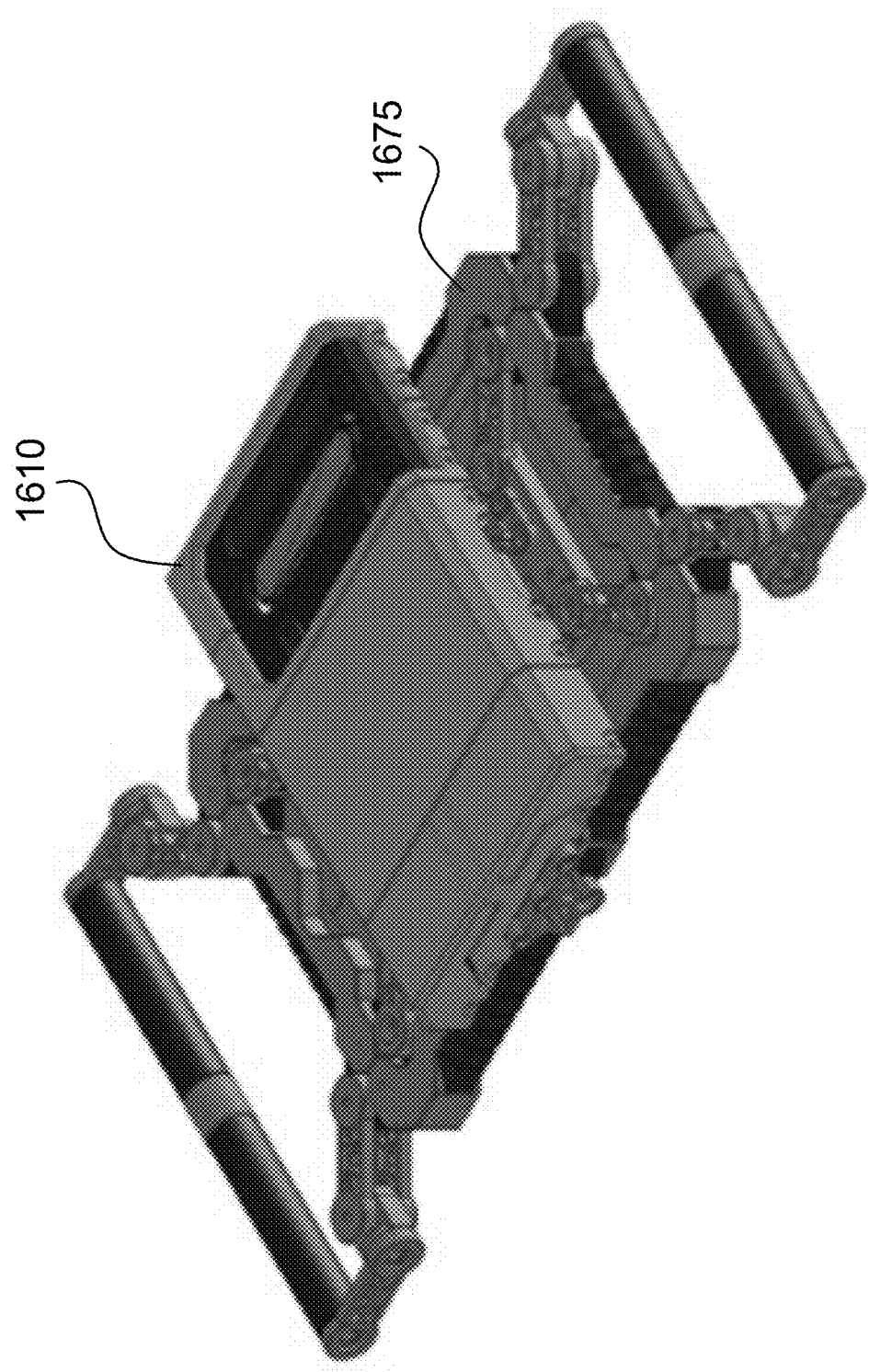
Figure 16C:
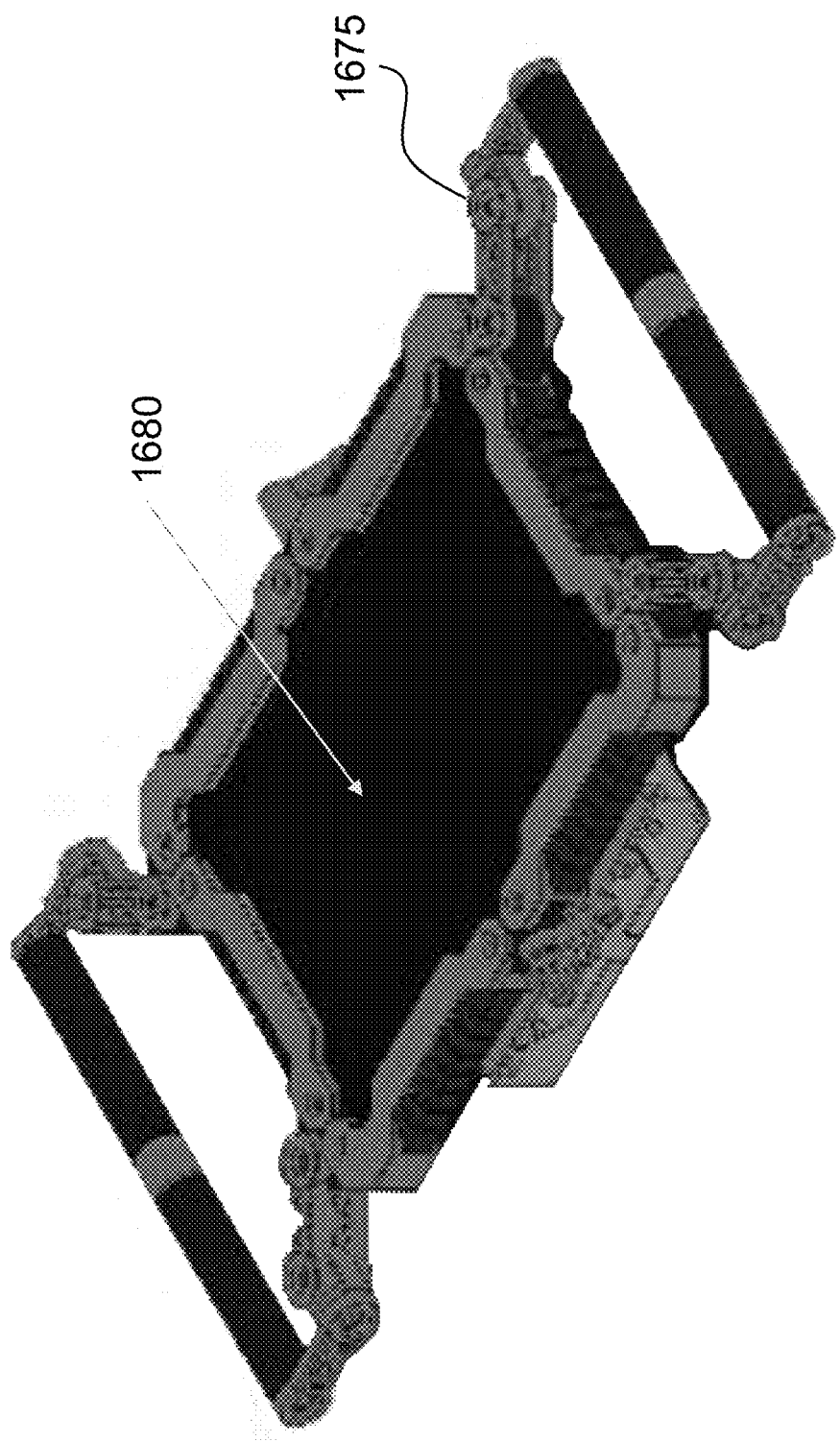

FIGS. 16A, 16B and 16C illustrate another example device for sign language recognition using a device with multiple input and output modalities. As illustrated in FIG. 16A, the device includes active 3D sensors 1615 and passive stereo sensors (1622 and 1624). As illustrated in FIGS. 16B and 16C, the example device 1610 from FIG. 16A may be used as a handheld device when attached to a modular frame 1675 (as seen in FIG. 16B) in conjunction with a tablet 1680 (as seen in FIG. 16C), providing an implementation with input and output capabilities that is suited for sign language translation when more traditional (and expensive) infrastructure is not available. The passive stereo sensors (1622 and 1624) are more economical than a full structured light sensor, but the latter provides an accuracy that may be two orders of magnitude greater than that provided by the former.

For example, the device illustrated in FIGS. 16A-16C may be oriented so the device 1610 is facing the signer, and the tablet 1680 is facing the person holding the modular frame 1675. The device 1610, with the active 3D sensors 1615 and the passive stereo sensors (1622 and 1624), can capture the sign language movements communicated by the signer, perform sign language recognition, and display a textual output of the interpretation on the tablet 1680 screen. Alternatively, the tablet could be facing the signer, the device (with a microphone) could be facing the person holding the modular frame. In this scenario, the microphone can recognize speech, convert it to sign language, and display it on the tablet using an avatar. Thus, a person is able to communicate with a signer using implementations of the disclosed technology.

The implementations illustrated in FIGS. 8 and 16 have multiple apertures that are closely co-located. This advantageously allows stereo processing, the ability to average out noise and improve signal-to-noise ratio (SNR), and enables using fewer devices. In one example, the device illustrated in FIGS. 16A and 16B may be a more complex version of the device illustrated in FIGS. 8A and 8B. For example, the devices in FIGS. 16A and 16B may additionally include one or more of a spatial/DSP-processed mic array, a full structured light sensor and a USB hub. Different example devices that are illustrated in various figures of this document provide improved sign language recognition capabilities using multiple apertures, and may be manufactured at different price-points based on the additional capabilities supported.

As described above, using multiple apertures increases fidelity so as to enable the high-quality reproduction of the movement. This allows additional information for each pixel to be captured, which can be used to create unique feature signatures for the different movements of the sign language. The features may be leveraged to identify the movements in the subsequent processing stage. In an example, a feature signature may be the right hand of the subject moving horizontally within a particular 3D volume in a particular amount of time. Features such as these, in combination with other sign language movements and the subject's emotions, may be mapped onto an interpretation of the sign language.

For example, the feature signatures from each of these different modalities may be combined through a point-cloud model, or a multi-camera, or multi-frame 3D model construction algorithms or artificial intelligence (e.g., DNNs, CNNs) programs, which enables more accurate and robust recognition. As expected, increasing the number of feature signatures used results in an increase in the training set as well as the recognition network. In general, the more unique/differentiated information is captured, the greater the accuracy (in statistical terms) of distinguishing one feature from another. The use of multiple apertures increases the amount of non-redundant data that is captured by the system.

Figure 17:
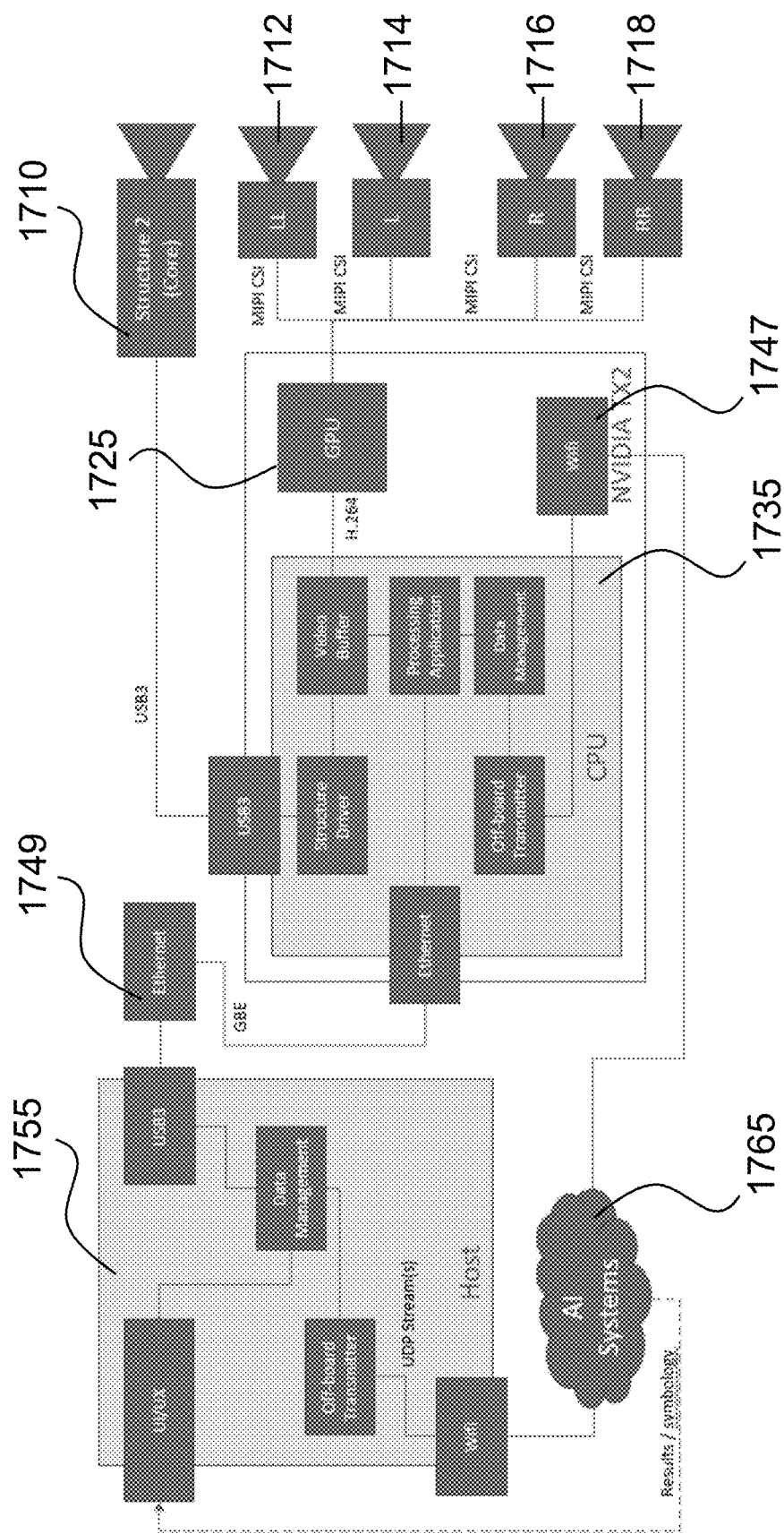
FIG. 17 illustrates example components of a system using a device for sign language recognition using a device with multiple input and output modalities.

FIG. 17 illustrates example components of a system using a device for sign language recognition using a device with multiple input and output modalities. As illustrated in the example in FIG. 17, multiple sensing devices (denoted 1710, 1712, 1714, 1716 and 1718) may be connected to a common processing structure that includes a GPU 1725, video processing capabilities and data management capabilities (which may be, in an example, co-located on a single CPU 1735), as well as communication support (e.g., Wi-Fi 1747 and Ethernet 1749). The multiple apertures of implementations of the disclosed technology capture sign language movements from different angles, and may then use an artificial intelligence system 1765 for accurate and robust detection of the movements.

Figure 18:
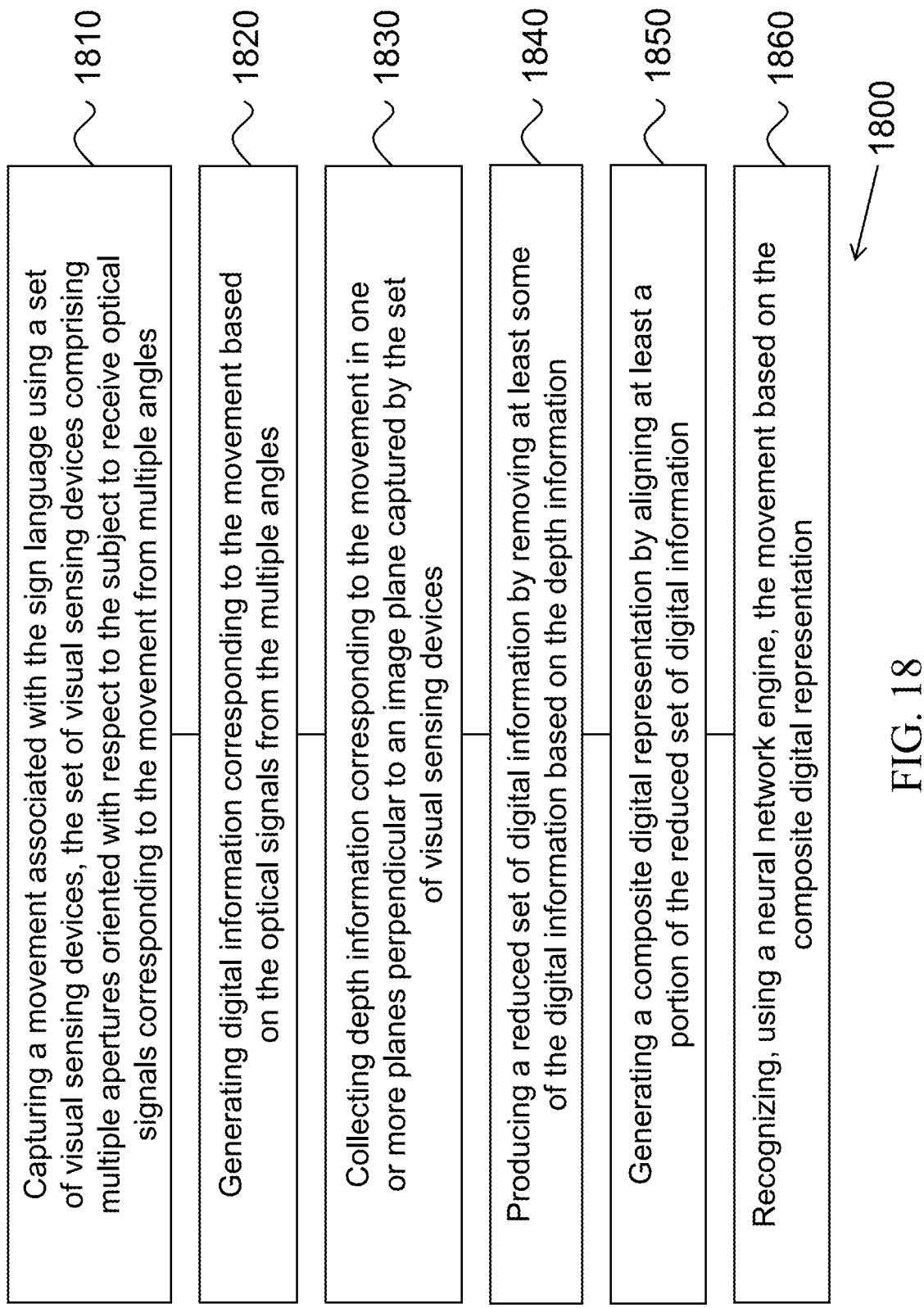
FIG. 18 illustrates a flowchart of an example method for sign language recognition using a device with multiple input and output modalities.

FIG. 18 illustrates a flowchart of an example method 1800 for sign language recognition using a device with multiple input and output modalities. The method 1800 includes, at operation 1810, capturing at least one movement associated with the sign language using a set of visual sensing devices, the set of visual sensing devices comprising multiple apertures oriented with respect to the subject to receive optical signals corresponding to the at least one movement from multiple angles. In an example, the set of visual sensing devices comprises one or more of an RGB color camera, a monochrome camera, a 3D stereo camera, a structured light emitter/receiver, or a time-of-flight emitter/receiver.

The method 1800 includes, at operation 1820, generating digital information corresponding to the at least one movement based on the optical signals from the multiple angles.

The method 1800 includes, at operation 1830, collecting depth information corresponding to the at least one movement in one or more planes perpendicular to an image plane captured by the set of visual sensing devices. In an example, collecting the depth information includes using a structured-light depth sensor or a time-of-flight depth sensor. In an example, the depth information includes a depth range from one of the set of visual sensing devices to the subject's hands. In another example, producing the set of reduced information includes removing at least some of the digital information that corresponds to depths not within the depth range.

The method 1800 includes, at operation 1840, producing a reduced set of digital information by removing at least some of the digital information based on the depth information.

The method 1800 includes, at operation 1850, generating a composite digital representation by aligning at least a portion of the reduced set of digital information. In an example, the composite digital representation may be a point-cloud or a multi-frame three-dimensional model. In another example, aligning at least the portion of the reduced set of digital information includes using one or more of a Global Positioning System (GPS) 1 pulse-per-second (PPS) signal, a networking time protocol (NTP) or an SMPTE timecode to temporally align part of the reduced set of digital information.

The method 1800 includes, at operation 1860, recognizing, using a neural network engine, the at least one movement based on the composite digital representation. In an example, recognizing the at least one movement based on the composite digital representation uses an artificial intelligence (AI)-based deep neural network (DNN) and/or convolutional neural network (CNN).

In some embodiments, the neural network engine may include one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time steps as it cascades forward to affect the processing of each new example. It is finding correlations between events separated by many moments, and these correlations are called "long-term dependencies", because an event downstream in time depends upon, and is a function of, one or more events that came before.

The neural network engine takes the training image(s) and performs the training accordingly, e.g., using the CNN(s) and/or RNN(s). In some embodiments, the neural network engine executes on one or more graphics processing units to leverage the parallel computing power. As discussed above, the training process can be iterative—by evaluating the performance and/or accuracy of the neural network process, the training system can determine if re-generating a different set of training images is necessary.

The method 1800 may further include capturing, using the set of visual sensing devices, one or more of an eyebrow movement, a gaze direction or one or more blinks of the subject that are associated with the at least one movement, and where recognizing the at least one movement comprises using information associated with the captured eyebrow movement, the gaze direction or the one or more blinks to improve recognition of the at least one movement. In an example, the method 1800 may use facial recognition algorithms to generate the information associated with the eyebrow movement, the gaze direction or the one or more blinks.

The method 1800 may further include capturing, using one or more audio sensors, an audible input associated with the at least one movement, and using information associated with the audible input to improve recognition of the at least one movement. Subjects who primarily use sign language to communicate may try to accommodate for hearing people with poor signing skills by vocalizing the words sometimes, or to convey additional aspects of the information being signed. Implementations of the disclosed technology are able to capture this audio input, and use it to improve the recognition of the movements of the signed language.

The method 1800 may further include capturing, using the set of visual sensing devices, external information indicated by the subject. The external information, which may include the subject pointing to a portion of text, or an object or person in the vicinity of the subject, will typically augment the information being signed. This external information can be captured and used to recognition of the associated movement.

Figure 19:
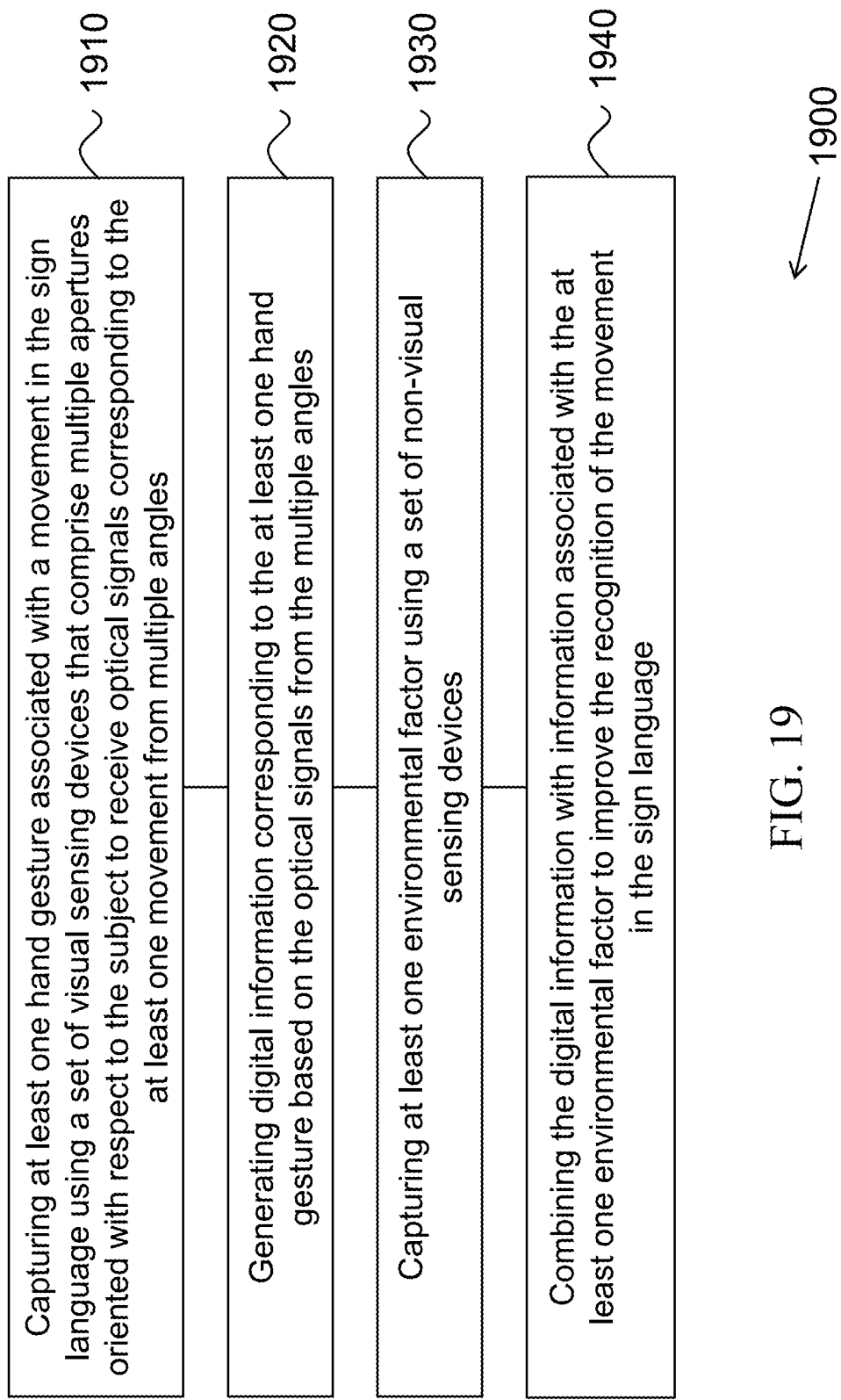
FIG. 19 illustrates a flowchart of another example method for sign language recognition using a device with multiple input and output modalities.

FIG. 19 illustrates a flowchart of an example method 1900 for sign language recognition using a device with multiple input and output modalities. The method 1900 includes, at operation 1910, capturing at least one hand gesture associated with a movement in the sign language using a set of visual sensing devices. In some embodiments, the set of visual sensing devices include multiple apertures oriented with respect to the subject to receive optical signals corresponding to the at least one movement from multiple angles.

The method 1900 includes, at operation 1920, generating digital information corresponding to the at least one hand gesture based on the optical signals from the multiple angles. In some embodiments, the method 1900 further includes the operation of combining the optical signals from the multiple angles after aligning their respective timestamps (e.g., using the 1 PPS or the GPS signal for synchronization and alignment).

The method 1900 includes, at operation 1930, capturing at least one environmental factor using a set of non-visual sensing devices.

The method 1900 includes, at operation 1940, combining the digital information with information associated with the at least one environmental factor to improve the recognition of the movement in the sign language.

Figure 20:
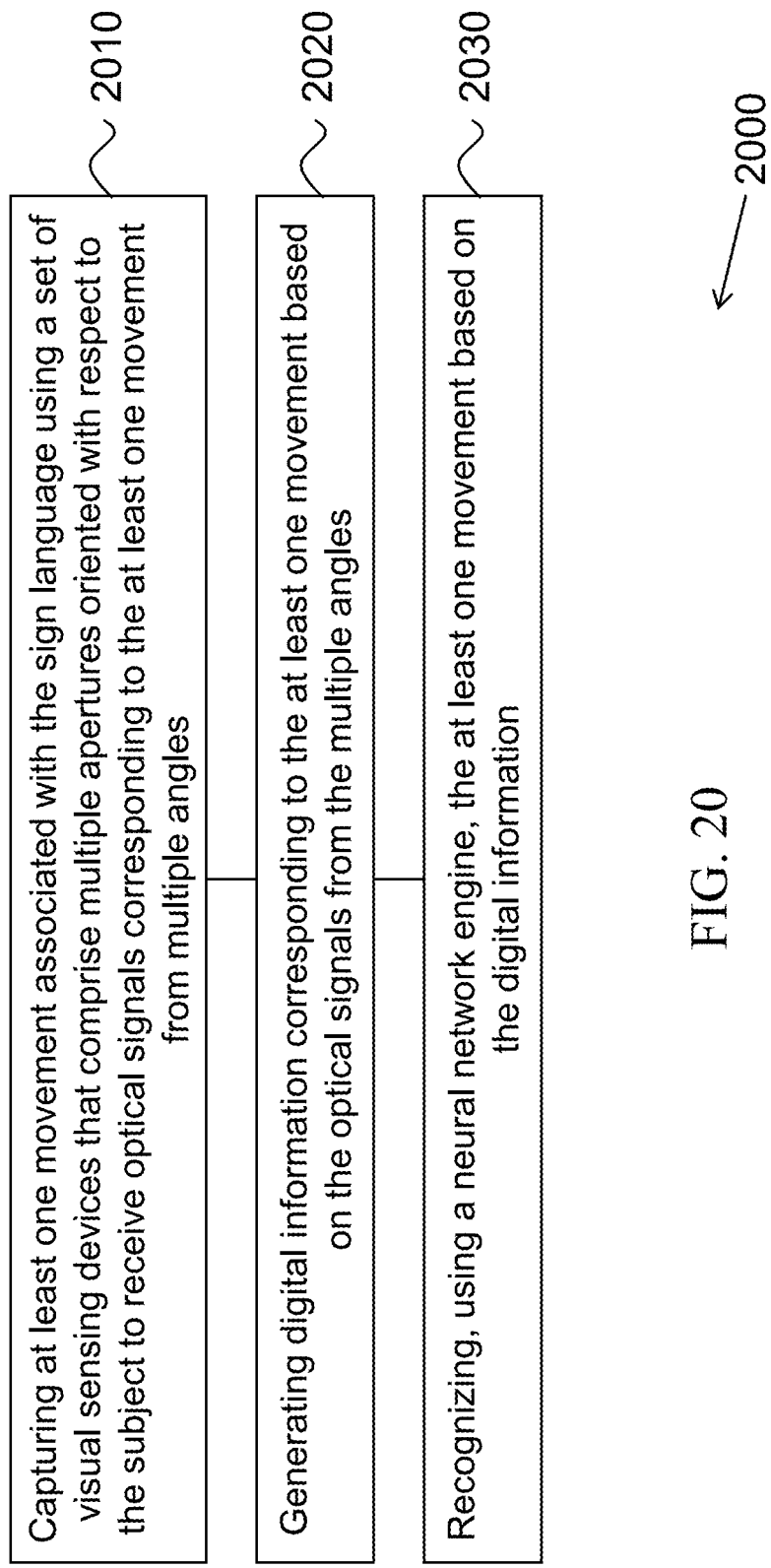
FIG. 20 illustrates a flowchart of yet another example method for sign language recognition using a device with multiple input and output modalities.

FIG. 20 illustrates a flowchart of an example method 2000 for sign language recognition using a device with multiple input and output modalities. The method 2000 includes, at operation 2010, capturing at least one movement associated with the sign language using a set of visual sensing devices that comprise multiple apertures oriented with respect to the subject to receive optical signals corresponding to the at least one movement from multiple angles.

The method 2000 includes, at operation 2020, generating digital information corresponding to the at least one movement based on the optical signals from the multiple angles.

The method 2000 includes, at operation 2030, recognizing, using a neural network engine, the at least one movement based on the digital information.

Some aspects of the disclosed embodiments relate to a non-transitory computer readable medium having processor code stored thereon including program code for performing a method for recognizing a sign language communicated by a subject. Such a method includes capturing at least one movement associated with the sign language using a set of visual sensing devices, where the set of visual sensing devices include multiple apertures oriented with respect to the subject to receive optical signals corresponding to the at least one movement from multiple angles. The method also includes generating digital information corresponding to the at least one movement based on the optical signals from the multiple angles, collecting depth information corresponding to the at least one movement in one or more planes perpendicular to an image plane captured by the set of visual sensing devices, and producing a reduced set of digital information by removing at least some of the digital information based on the depth information. The method additionally includes generating a composite digital representation by aligning at least a portion of the reduced set of digital information, and recognizing, using a neural network engine, the at least one movement based on the composite digital representation.

In some embodiments, collecting the depth information includes using a structured-light depth sensor or a time-of-flight depth sensor. In some embodiments, the above noted method further includes capturing, using the set of visual sensing devices, one or more of an eyebrow movement, a gaze direction or one or more blinks of the subject that are associated with the at least one movement. In such embodiments, recognizing the at least one movement comprises using information associated with the captured eyebrow movement, the gaze direction or the one or more blinks to improve recognition of the at least one movement.

According to some embodiments, the above method further using a facial recognition algorithm to generate the information associated with the eyebrow movement, the gaze direction or the one or more blinks. In yet another embodiment, the set of visual sensing devices comprises one or more of an RGB color camera, a monochrome camera, a 3D stereo camera, a structured light emitter/receiver, or a time-of-flight emitter/receiver. In still another embodiment, aligning the at least a portion of the reduced set of digital information includes using one or more of a Global Positioning System (GPS) 1 pulse-per-second (PPS) signal, a networking time protocol (NTP) or an SMPTE timecode to temporally align part of the reduced set of digital information.

3. Examples of Variated Training Methods

Pattern recognition is the automated recognition of patterns and regularities in data, and in many cases, pattern and gesture recognition systems are trained from labeled training data using one or more training methods. Among the many algorithms that can be implemented to perform the training, such as decision trees, Bayesian classifiers, and linear/quadratic discriminant analysis, the use of neural networks is gaining an increasing amount of attention in the field of artificial intelligence. A neural network, in the case of machine learning, is an interconnected group of artificial neurons that uses a mathematical or computational model for information processing based on connectionism. One specific application of using the neural networks for pattern and gesture recognition is sign language translation.

In some embodiments, the example configurations in FIGS. 1-13 can include the ability to observe and leverage what has been learnt from each party in order to provide a desired outcome or result, such as providing a more natural translation of the communication between the two parties. As discussed above, the processing and analysis of the information, such as processing and interaction between the parties in a sign language translation application, can be implemented using a learning process as part of an artificial intelligence (AI) system such as a neural network system, to improve the accuracy and the performance of analysis.

Referring back to FIG. 9, the neural network engine can operate in two modes: training mode (e.g., the neural network learning process) and interpretation mode (e.g., the neural network execution process). In the training mode, the neural network, which forms a part of the artificial intelligence (AI) core, receives known inputs and associated meanings and other information. In the interpretation mode, the neural network engine attempts to identify and interpret the input data that is collected by, for example, the disclosed interactive sign language system, which also forms part of the learning process. The modes of operation can be selectively enabled or disabled to allow the system to be configured for one or the other mode of operation.

In some embodiments, the training and interpretation of the neural network may use supervised learning, unsupervised learning, or reinforcement learning techniques at various stages depending on the data available and the particular learning task being optimized. These learning paradigms can be augmented by content by additional information, such as information from sign language experts in sign language translation application, which provides situational context and results in a more natural translation.

In the sections that follow, examples from the sign language translation system are used to further illustrate the disclosed enhancements in training and utilization of neural networks associated with an AI system. Training of the translation system can face several challenges. Typically, a large set of training data (e.g., training images) is needed to allow the system to accurately recognize the target image of interest from subsequently collected data, and to, for example, provide accurate translations for a sign language. It is also desirable for the training data to have a certain degree of variance to reduce translation errors. For example, to allow the system to accurately recognize the hand movement that represents the word "apple" in the ASL, a data set of 150 to 300 images in different angles of view are typically needed. Obtaining the data set can be a time-consuming task. Furthermore, it can be very difficult to obtain a good set of training data for low resolution sign languages that are not widely used, and thus no readily available data can be obtained. Currently, there is a major lack of video clip or image libraries to furnish a variety of different data covering distances, angles, and other characteristics required to have good training media that will result in high accuracy recognition results. Even if a person locates or takes enough videos, the content across many of the clips overlap, and thus does not add extra value, In the training mode, the neural network engine also needs the associated meanings for the training data. Currently, the training data is labeled manually by a system operator or an expert to identity the features of interest in a training image, such as a person's finger, hand, and/or face. The labeling process, however, can be extremely time-consuming. Referring back to the example of an "apple" in the ASL, after obtaining a training data set of 150 to 300 images, the system operator or the expert must manually label the gesture for an apple, i.e., placing the knuckle of the right index finger against the cheek in all images, which is extremely time consuming. The task of manual labeling may become more cumbersome, or even impossible, when irregularly-shaped features must be labeled. For example, the system operator may create a circular label for the knuckle of the right index finger. Because the knuckle has a non-circular shape, the labeled area includes noise or unwanted features, which lower the training efficiency and impact the execution accuracy of the trained translation system.

Figure 21:
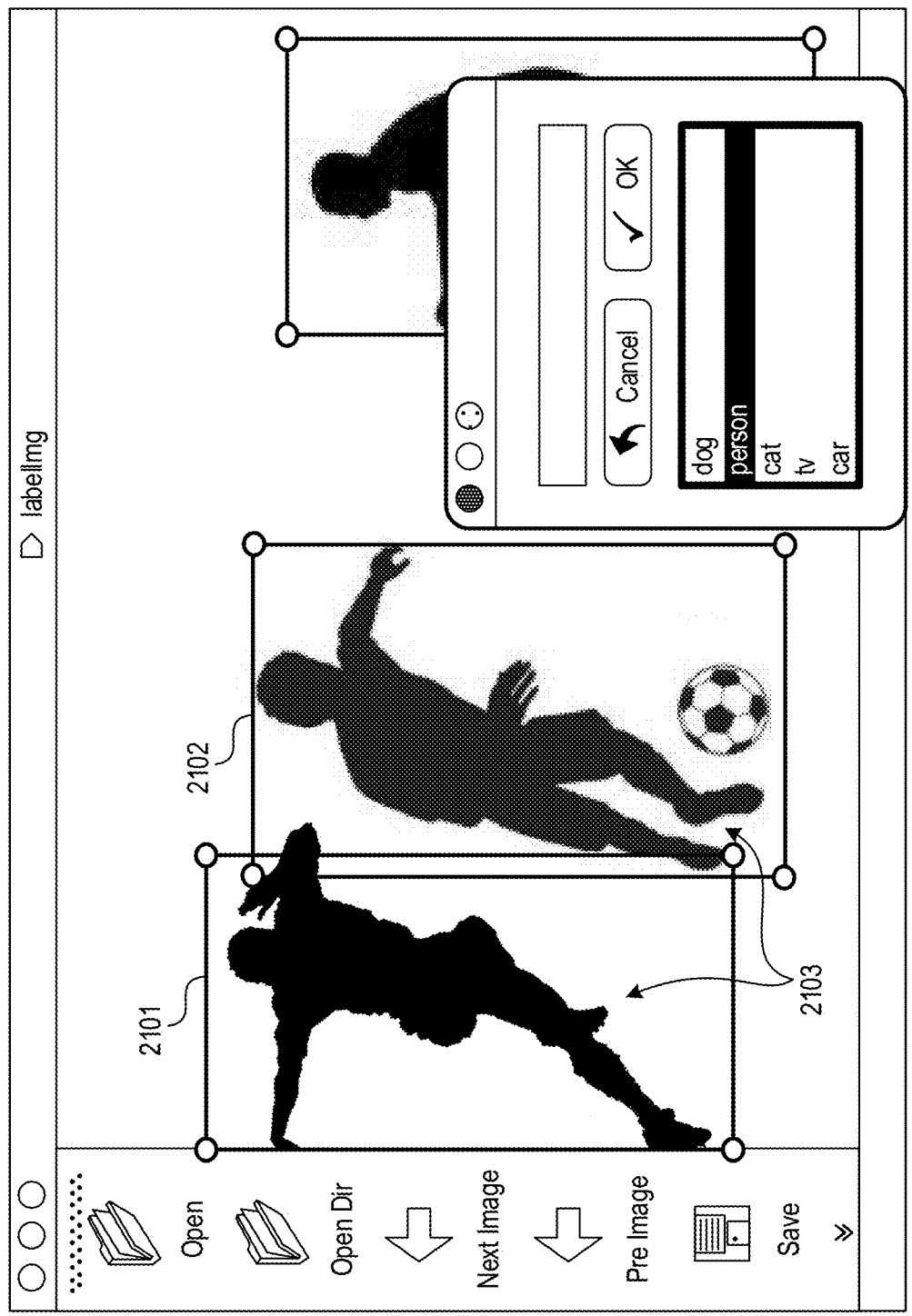
FIG. 21 illustrates an amount of noise and/or unwanted features that can be introduced using regular-shaped labels in pattern recognition.

FIG. 21 illustrates an amount of noise and/or unwanted features that can be introduced using regular-shaped labels in pattern recognition. In FIG. 21, a system operator labels each person with a rectangular label. Each rectangular label 2101, 2102 for a person includes a large amount of background pixels 2103 (e.g., grass on the playing field), which are considered noise and can negatively impact the training efficiency of the system.

Figure 22:
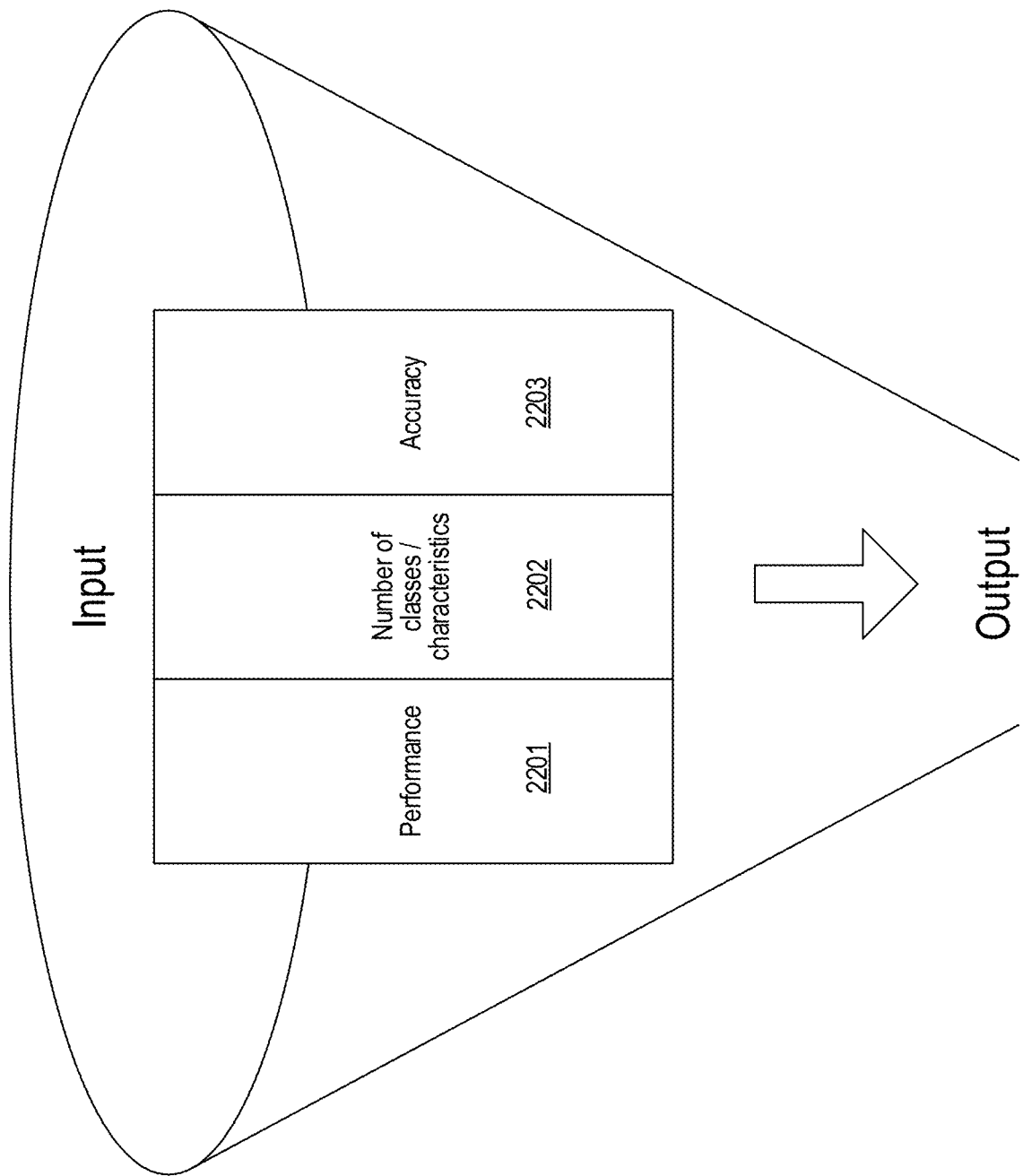
FIG. 22 illustrates three aspects that optimization can be performed to improve pattern and gesture recognition systems in accordance with an example embodiment of the disclosed technology.

The disclosed techniques that are described in the following sections can be used in various embodiments to efficiently train a neural network of an AI system, such as a sign-language translation system, to facilitate identification, understanding and translation of one or more features of interest using a small set of training data. The disclosed techniques can be implemented in various embodiments to significantly surpass the efficiency and capabilities of the existing training processes. As illustrated in FIG. 22, the disclosed optimization techniques can be applied to one or all of the following aspects to improve the training of a pattern and gesture recognition system: performance 2201 (e.g., the execution time of a recognition event), the number of classes/characteristics 2202 (e.g., the number of different images, or regions of an image, that can be recognized), and accuracy 2203 (e.g., the percentage that a recognition event properly identifies the input pixels).

Section headings below are used only to improve readability and do not limit scope of the disclosed embodiments and techniques in each section to only that section.

3.1 Example Synthetic Data Generation

A three-dimensional (3D) model is based on mathematical representations of surfaces of an object in three dimensions. Typically, surfaces of an object in a 3D model are represented as vertices, curves, and/or voxels. One or more 3D models can be placed into a virtual setup, which is sometimes referred to as a 3D scene. A typical 3D scene includes at least a virtual camera, one or more virtual lights, and a scene background so that renderings of the 3D objects in the scene can be generated. A 3D scene can also include parameters (e.g., camera attributes, lighting attributes, and/or animation sequences) to allow different renderings of the 3D model(s) to be created. It is noted that the use of the term camera and light in the context of the 3D model refers to capturing a 3D scene as if it were positioned under a light source and captured from the angle and position of a camera, though no real cameras or light sources were used.

The disclosed embodiments rely at least in-part on 3D models that are placed in a scene to facilitate the generation and selection of a proper set of training data. In particular, 3D models of the human body can be obtained to generate synthetic training data for sign language training, which eliminates the need for manual search of suitable training images. For example, after a 3D model of a human body is obtained from one of the online sources, the model can be positioned in a 3D scene, either manually, using a motion capture suit, or using a 3D scanning system, to show a gesture that represents a letter, a word, or a phrase in a particular sign language. Using this setup, a reduced set of training images can be obtained from rendered images of the 3D scene. As will be described below, the set of images produced based on the above technique eliminates (or greatly reduces) the need for manual labeling and enables optimization of different aspects of the translation system.

Figure 23:
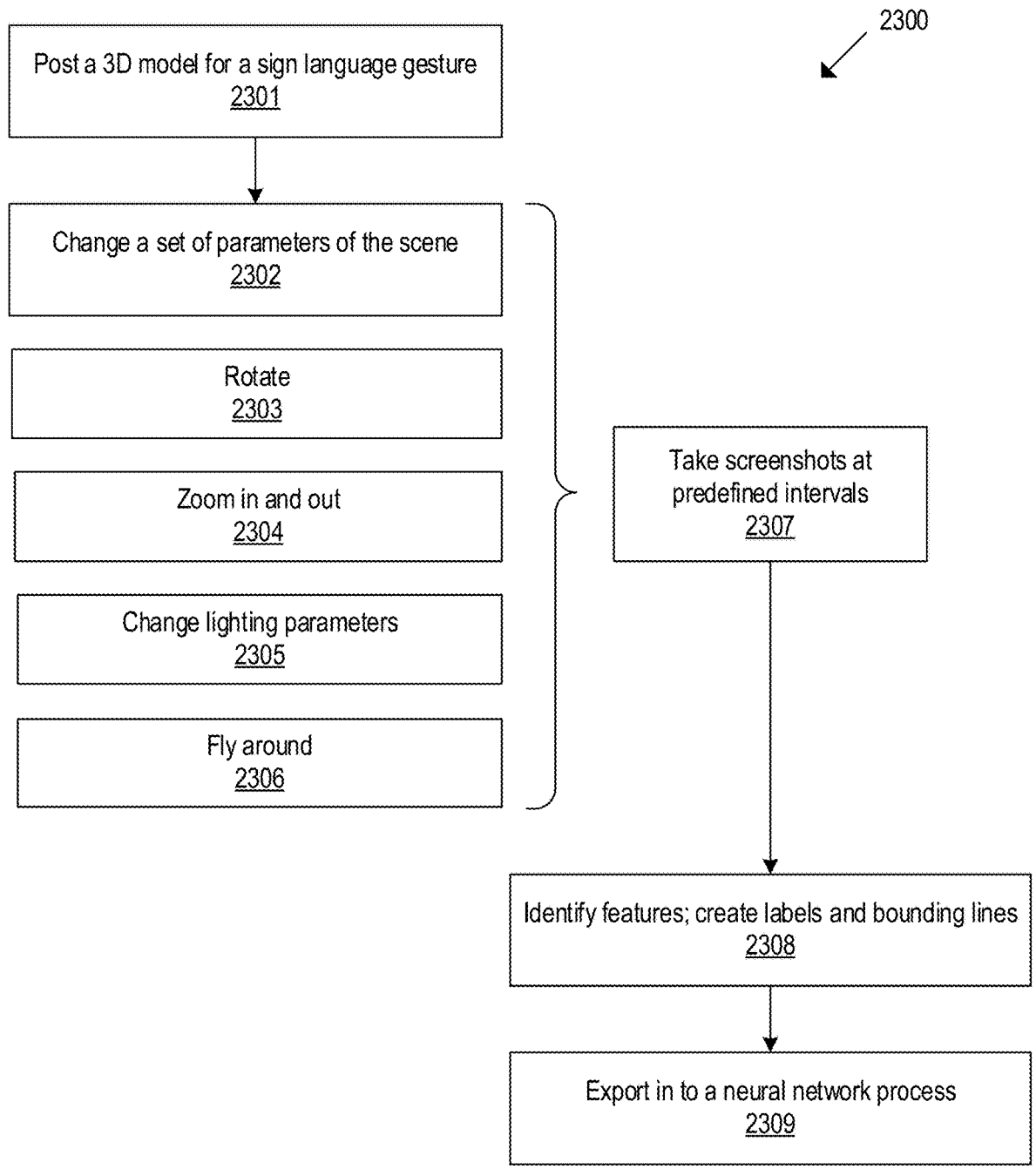
FIG. 23 illustrates representative operations taken by a training system implemented in accordance with an example embodiment the disclosed technology.

FIG. 23 illustrates representative operations taken by a training system implemented in accordance with an example embodiment the disclosed technology. After obtaining a 3D model, the training system may pose or configure, at operation 2301, the 3D model (also known as rigging the 3D model) to show a gesture that corresponds to a letter, a word, or a phrase in a sign language. The rigging process allows parts of the 3D model that are relevant to the gesture to be marked as visible. In some implementations, the 3D model can be displayed via a user interface of the training system on a display device, such as a computer screen or a monitor, and/or projected onto a projection screen.

A gesture can be static or animated. In some embodiments, the system can apply keyframes to the 3D model to show an animated sequence of movements. Here, a keyframe defines the starting and ending points of a smooth transition between the positions. For example, referring back to the example of "apple" in the ASL, a 3D model can be rigged and/or key-framed to show an animated sequence of movements with the right-hand rotating around the knuckle.

Referring to FIG. 23, the training system can change, at operation 2302, a set of parameters of the 3D scene automatically to create different training images. For example, the system can rotate, at operation 2303, the 3D model along one or more axes (e.g., X, Y, and/or Z axes) of the scene. The system can also zoom in and/or out, at operation 2304, to show a bigger and/or smaller view of the 3D model. In some embodiments, the lighting parameters for the model can be changed at operation 2305. For example, the brightness of one or more lights can be changed to show a brighter or darker rendering of the model. The background of the 3D scene can also be changed to mimic real-life scenarios. In some embodiments, the system can also change the color of the skin, the placement of the facial features, and/or the textures of the clothing so that the resulting training images have a large degree of variance. In some embodiments, the system can set up a "fly-around" path, at operation 2306, to produce scenes that are viewed from different angles (e.g., different "camera angles" that simulate movement of a camera with respect to the object). The "fly-around" path allows the camera to capture different views of the object without moving the object itself, thereby avoiding the risk of introducing undesired changes to the relative positions of the components in the model.

The system also generates, at 907, a set of two-dimensional (2D) images of the 3D scene as training images at predetermined intervals. The 2D images can be generated by rendering the 3D scene from the camera's perspective. The rendering may include both photo-realistic rendering and real-time rendering. For example, techniques such as global illumination can be used to generate photo-realistic renderings that show real-life lighting effects. Alternatively, renderings that do not require sophisticated lighting effects can be generated in real-time using a smaller amount of computational power. For static gestures, a training image can be rendered after a change in one or more parameters of the 3D scene. In some embodiments, the system uses the "fly-around" path to generate renderings for different camera positions within a predetermined duration. The camera may have the same or different orientations at different positions. An image can be generated each time the camera updates its position long the path.

In some embodiments, the system imposes a set of displacements (e.g., translations and/or rotations) to the model. An image can be rendered after each translation and/or rotation of the model. For example, an image is rendered after the model is rotated around the Z axis for 36 degrees, resulting in five images in total for a rotation of 180 degrees around the Z axis. The "fly-around" path can also be used together with translations and/or rotations of the model to create a more sophisticated set of training images.

For animated gestures, images can be taken based on the length of the animated sequence, as well as changes of the scene parameters. For example, for each change in a parameter value (e.g., the camera position), several images can be taken to capture the entire sequence of movements that represents "apple" in ASL.

To reduce the training data size while maintaining or even improving the training performance, the system can adopt a set of criteria to obtain desirable parameter changes. In some embodiments, the system can first set a particular value for the total number of images to be captured. The system then generates a "fly-around" path and/or displacements, based on the total number of images, to obtain a suitable amount of variance among the images. For example, the horizontal angles of view of the camera are within a range of 30 to 150 degrees. If the total number of images to be captured is 30, the horizontal angles of view of the camera can be equally distributed within the range (e.g., {34, 38, . . . , 150} degrees) so that the entire range of the angles of view is represented in the images.

In some embodiments, an iterative approach can be used. For example, the system first sets the total number of training images for a model to 30. The system then generates a "fly-around" path that includes five different camera locations in a predetermined time duration. For each of the camera locations, the system generates six rotations for the model so that the model is rotated twice around each of the X, Y, and Z axes. After obtaining the 30 images, the training system is evaluated to determine if it has been properly trained. For example, testing that covers various areas such as performance, accuracy, and/or number of classes/characteristics can be performed as a part of the evaluation. If the training system determines that the trained translation system fails to meet one or more thresholds in one of the areas (e.g., the accuracy of the translation system is lower than a threshold), the training system can revise the "fly-around" path and/or displacements to generate a different set of training images. This process can repeat until the translation system is deemed as adequately trained.

In some embodiments, the system evaluates each of the training images before the full set is finalized. For example, after each image is generated, the system can feed the generated training image to the translation system. The recognition result of the translation system is evaluated to determine how many characteristics the system has recognized, the accuracy of the recognition, and/or the amount of time used for performing the recognition. If any of these criteria (also shown in FIG. 22) deteriorates or shows no improvement for the translation system, the system can discard that training image, generate another training image and repeat the process.

3.2 Example Automatic Labeling

To address the problem of manual labeling, the training system can automatically label (e.g., operation 2308 in FIG. 23) one or more features in the model by identifying polygons in the model that represent the features of interest.

By the way of example and not by limitation, a feature can be a subsection of one or both hands, such as a finger or a palm, that can indicate a hand movement. In some embodiments, a feature can also be used to indicate non-manual activities. For example, facial features and/or body postures, such as the shape or a change in the shape of the left eye, the right eye, the left shoulder, or the right cheek, tilt of the head, can be used to show a particular non-manual activity. Because the 3D model often represents a feature in the form of a group of polygons (e.g., a set of polygons can be grouped together and named as "right finger"), the feature to be labeled can be automatically highlighted with proper bounding lines.

Figure 24B:
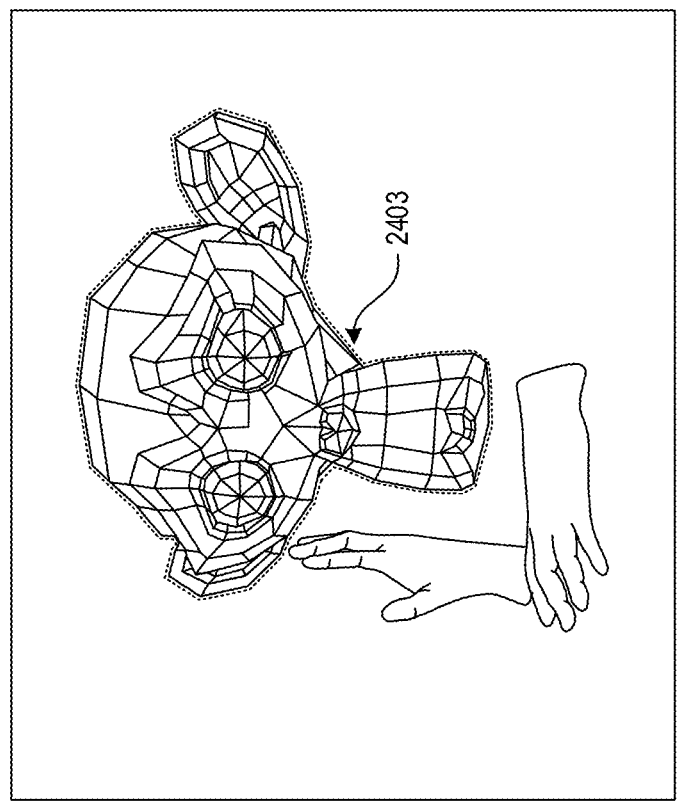
FIG. 24B illustrates another rendering of the monkey head and the two hands in accordance with an example embodiment of the disclosed technology.
Figure 24A:
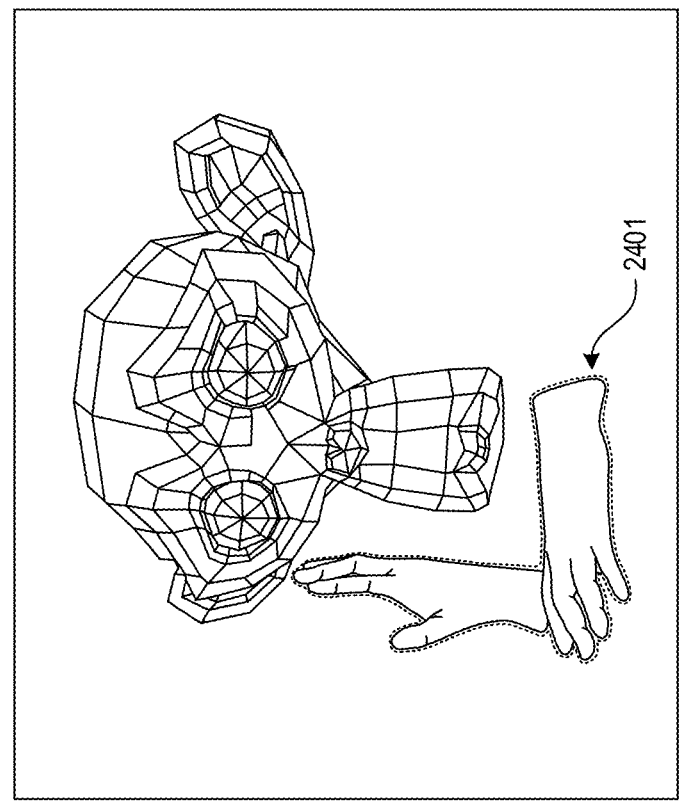
FIG. 24A illustrates a rendering of a monkey head and two hands in accordance with an example embodiment of the disclosed technology.

For example, FIG. 24A shows an example rendering of a monkey head and two hands. The two hands are identified as the feature of interest, so the corresponding image shows highlighted bounding lines 2401 that form the boundaries of the hands. FIG. 24B shows another example rendering of the monkey head and the two hands. In this example, the monkey head is identified as the feature of interest, so the corresponding image shows highlighted bounding lines 2403 that form the boundary of the head. It is thus evident that, as opposed to manual labeling process of images that is either time consuming or can generate lots of noise (e.g., as described in connection with FIG. 21), the disclosed labeling technique takes advantage of the already-known configuration of polygons that form, e.g., the hand, a finger, the head, etc., to quickly and efficiently label the section(s) of interest, as will be further described below.

Figure 24C:
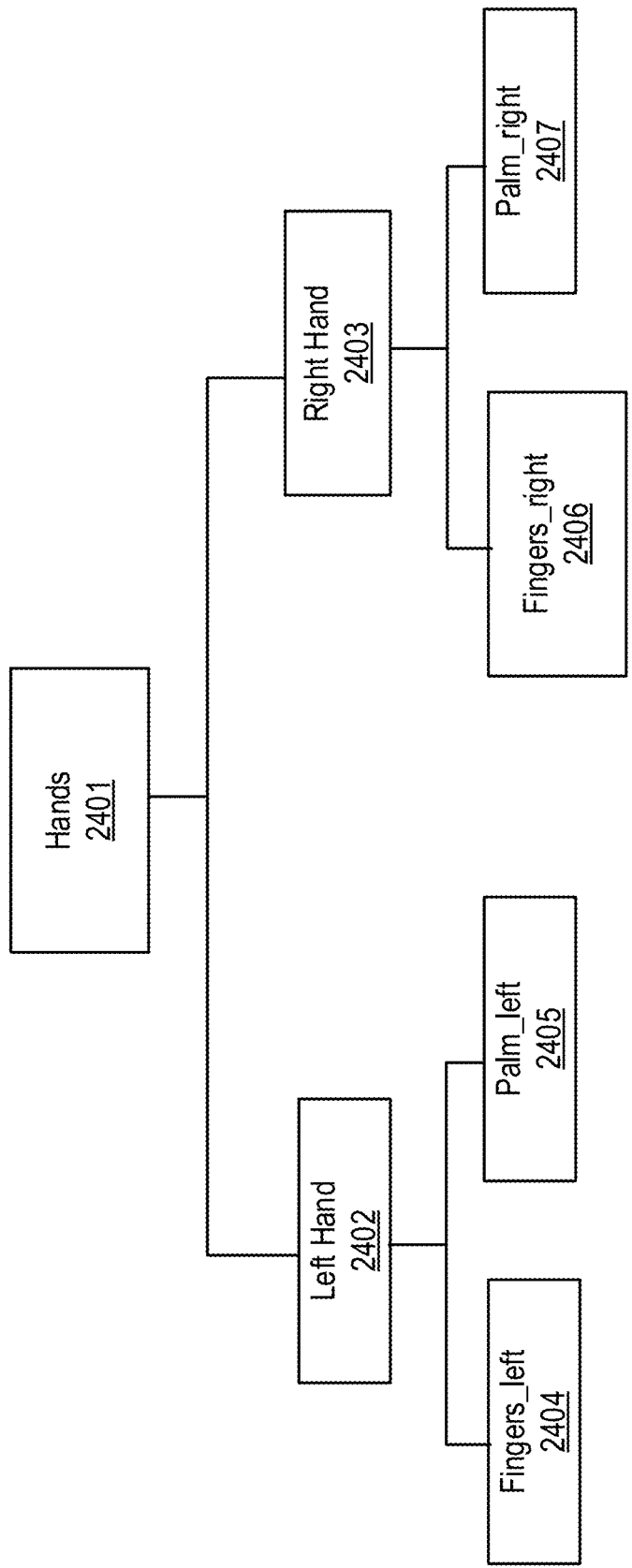
FIG. 24C illustrates an example hierarchy of polygons in a three-dimensional (3D) model in accordance with an example embodiment of the disclosed technology.

Different groups of polygons in the 3D model may be organized in different ways. For example, a 3D model may include a first group of polygons to represent the fingers and a second group of polygons to represent the palm. If the system wants to identify the feature "hand," two groups of polygons can be selected at the same time. The polygons can also be organized hierarchically. For example, as shown in FIG. 24C, a parent group "left hand" 2402, which includes the left fingers 2404 and the left palm 2405, can be created to represent the feature "left hand". Similarly, another parent group "hands" 2401 can be created to represent both features—"right hand" 2403 and "left hand" 2402—at the same time. The "right hand" group can further include the right fingers 2406 and the right palm 2407. To identify both hands, the system can simply select a single group "hands" 2401. In some embodiments, the system may select the group "left hand" 2402 and another group lower in the hierarchy such as "Fingers_right" 2406 for identifying a particular gesture. Regardless of how the polygons are organized, when using the 3D models to generate synthetic training images, manual labeling is no longer required because the selected polygons can provide the precise boundaries of the features of interest.

Referring back to FIG. 23, the training images can then be exported, at 2309, into a neural network engine of the translation system. In some embodiments, the neural network engine may include one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time steps as it cascades forward to affect the processing of each new example. It is finding correlations between events separated by many moments, and these correlations are called "long-term dependencies", because an event downstream in time depends upon, and is a function of, one or more events that came before.

The neural network engine takes the training image(s) and performs the training accordingly, e.g., using the CNN(s) and/or RNN(s). In some embodiments, the neural network engine executes on one or more graphics processing units to leverage the parallel computing power. As discussed above, the training process can be iterative—by evaluating the performance and/or accuracy of the neural network process, the training system can determine if re-generating a different set of training images is necessary.

Figure 25A:
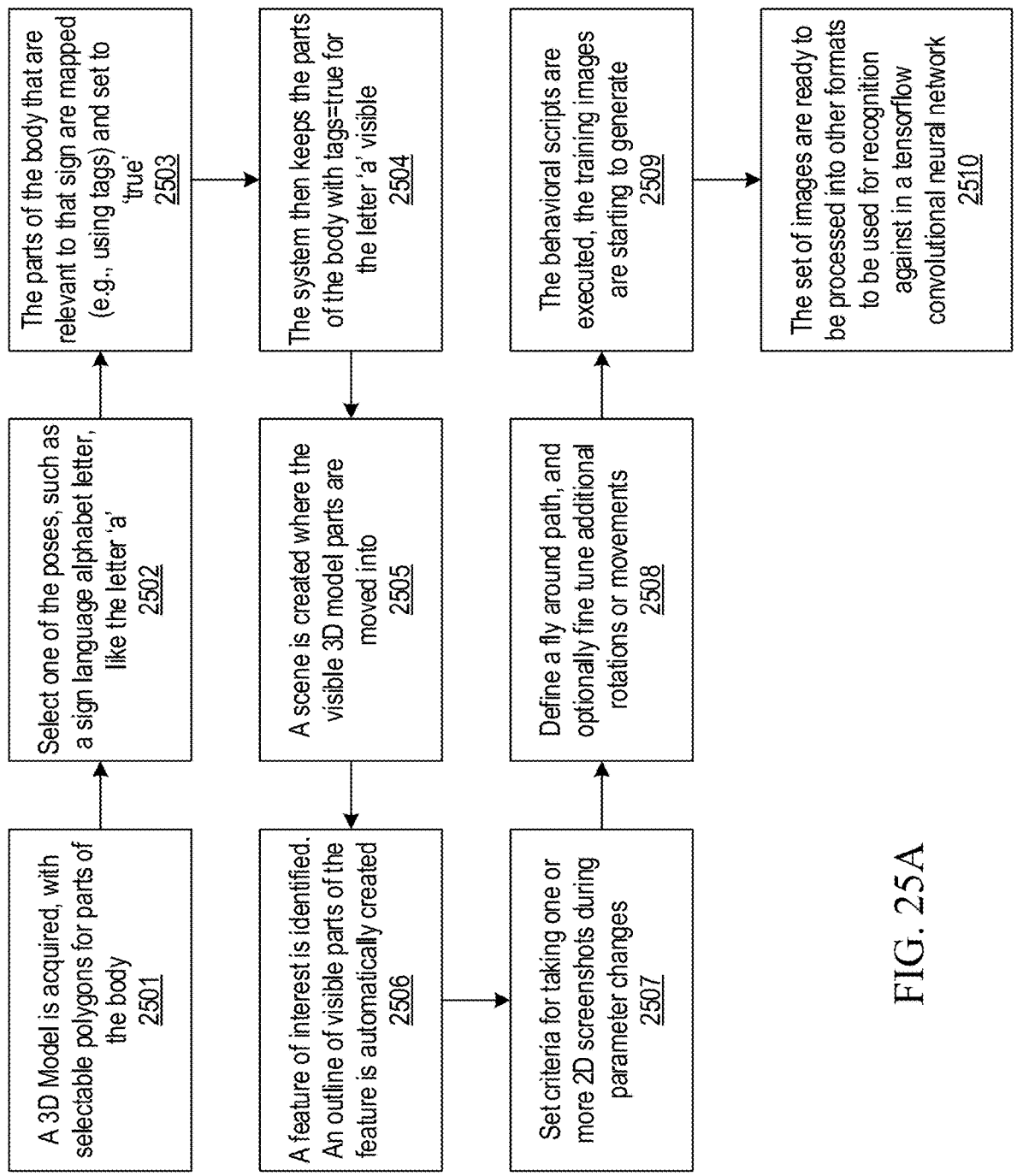
FIG. 25A illustrates a set of operations that are carried out to generate training images for a letter of the alphabet in accordance with an example embodiment of the disclosed technology.

FIG. 25A illustrates a set of operations that can be carried out by to generate training images for a letter (e.g., the letter "a") in the ASL in accordance with one or more embodiments of the disclosed technology.

Operation 2501: A 3D model of a human body is acquired. The 3D model includes selectable polygons for parts of the body.

Operation 2502: The training system selects one of the static poses—e.g., the letter "a" in the ASL—as the gesture.

Operation 2503: The system includes tags that can be turned on or off to map the model to the gesture. The parts of the model that are relevant to the sign of letter "a" are mapped (e.g., the polygons in these parts are marked as "true").

Operation 2504: The system keeps the mapped parts visible and makes the rest of the model invisible.

Operation 2505: A 3D scene is created to hold the visible parts to allow parameters changes by one or more scripts. The scripts control various scene parameters, such as rotations, translations, camera angles, lighting, etc.

Operation 2506: The system identifies a feature of interest. After the feature is identified, an outline of the visible parts of the feature (e.g., one or more bounding lines that form a precise boundary of the feature) is automatically generated.

Operation 2507: The system sets criteria for taking one or more 2D screenshots. For example, the system determines that a total of 50 images are needed as the training set. Other criteria, such as image resolution or number of features to be labeled, can also be set.

Operation 2508: The system determines, based on the criteria, a "fly-around" path in a specified time duration. The system can optionally determine additional parameters that can be changed in the time duration.

Operation 2509: The scripts are executed to generate the desired training images.

Operation 2510: The training images can be provided to a convolutional neural network (e.g., TensorFlow) to perform training. In some embodiments, the training images are converted to other formats that are compatible with the neural network process.

Figure 25B:
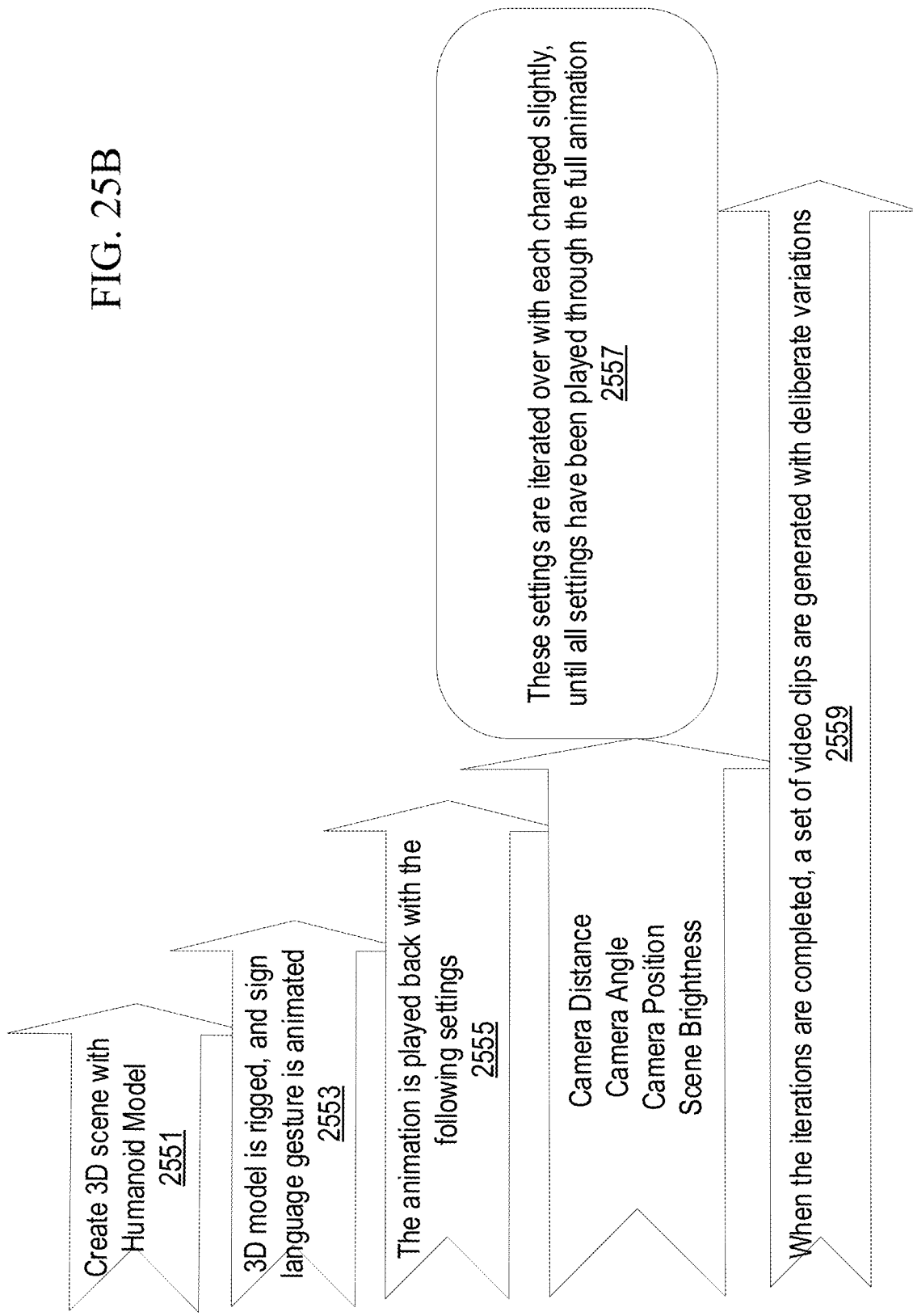
FIG. 25B depicts a high-level overview of 3D model generation work flow in accordance with an example embodiment of the disclosed technology.

FIG. 25B depicts a high-level overview of a three-dimensional (3D) model generation work flow in accordance with an example embodiment of the disclosed technology.

Operation 2551: A 3D scene is created with a Humanoid model. Each part of the model, with descriptive tag names.

Operation 2553: The model is rigged to depict a sign language gesture. The system can generate animations based on any tagged part of a model, or across all tags of a model. Each part of the model can be interacted with in all the ways the model's part is capable of, such as moving, rotating, and other similar kinds of movements. A first video clip can be created and output to the file system.

Operation 2555: The first video clip is played back with a set of settings that includes at least the camera distance from the object, the camera angle, the camera position, and the scene brightness.

Operation 2557: These settings are iterated over with each changed slightly, until all settings have been played through the full animation. For each iteration, a different video clip is generated.

Operation 2559: When the iterations are completed, a set of video clips are generated with deliberate variations. The video clips are now used to train the neural networks.

Figure 26:
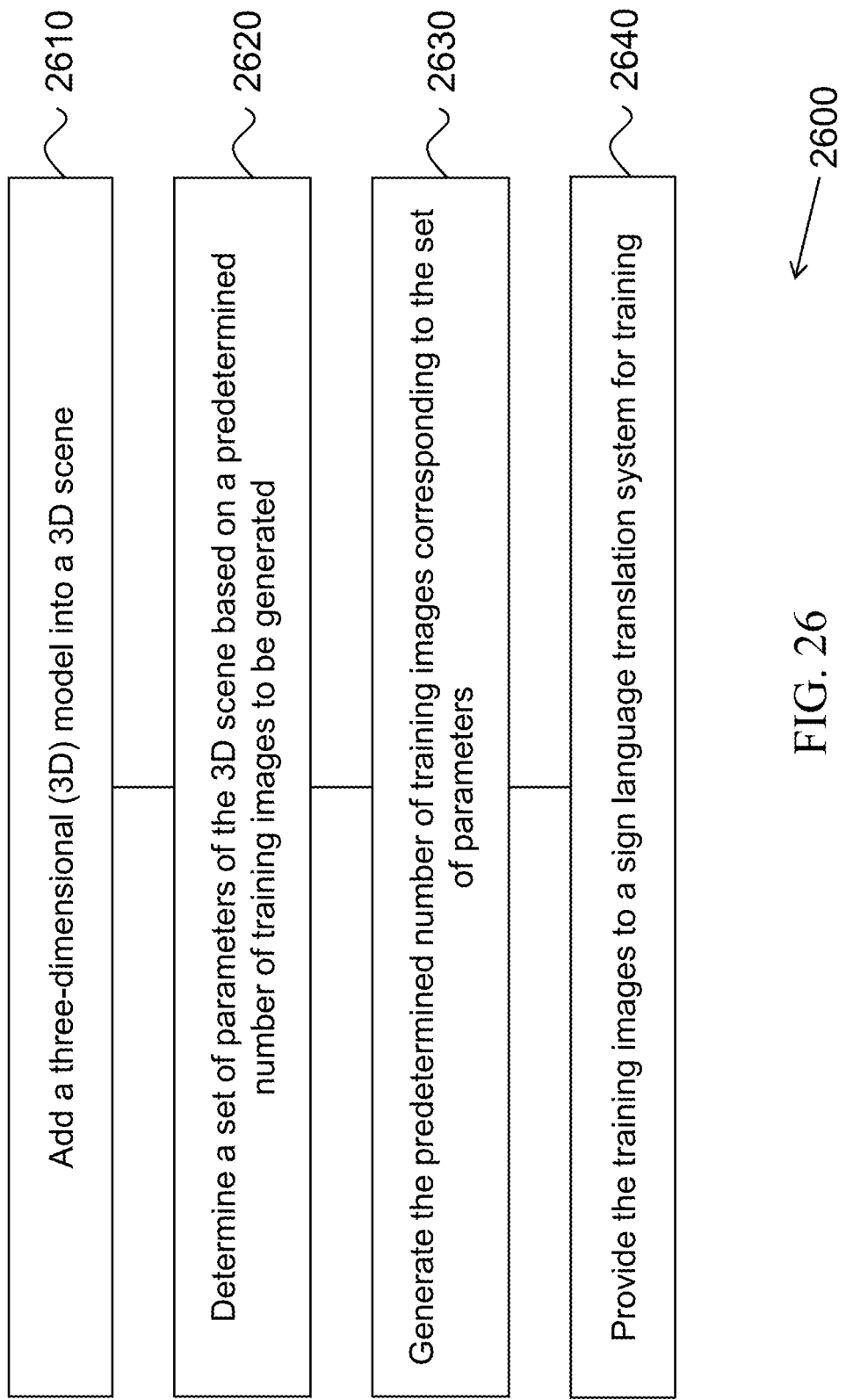
FIG. 26 illustrates a flowchart of an example method for training a sign language translation system in accordance with an example embodiment of the disclosed technology.

FIG. 26 shows a flowchart of an example method 2600 for training a sign language translation system in accordance with one or more embodiments of the disclosed technology. The method 2600 includes, at 2610, adding a three-dimensional (3D) model into a 3D scene. The 3D model is positioned to show a gesture that represents a letter, a word, or a phrase in a sign language. The method 2600 includes, at 2620, determining a set of parameters of the 3D scene based on a predetermined number of training images to be generated. The method 2600 includes, at 2630, generating the predetermined number of training images corresponding to the set of parameters. Each image is generated based on at least one value of the set of parameters, and at least a subset of the parameters is adjusted sequentially in a time domain. The method 2600 also includes, at 2640, providing the predetermined number of training images to a neural network learning engine of the sign language translation system to perform training.

Figure 27:
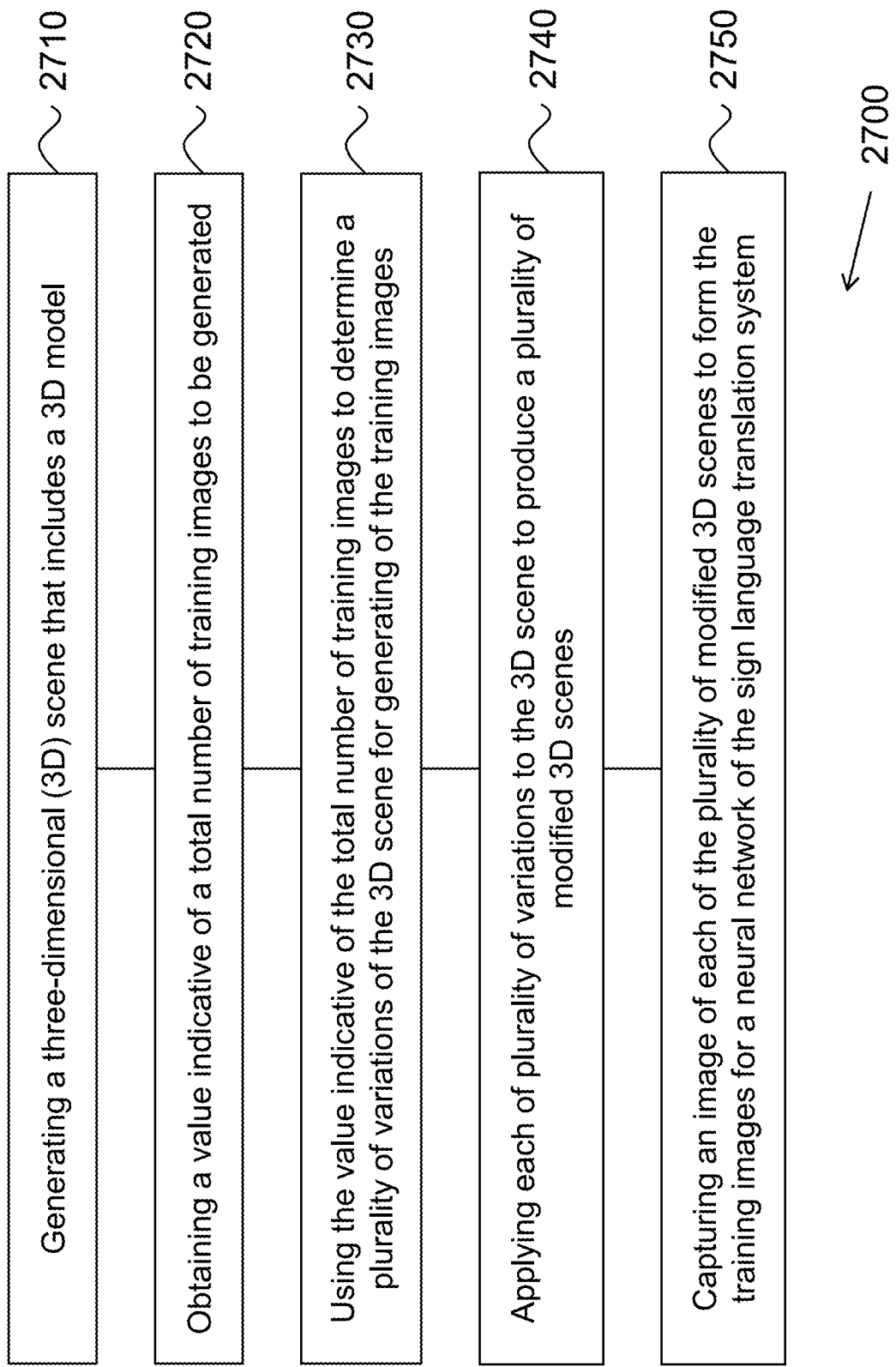
FIG. 27 illustrates a flowchart of another example method for training a sign language translation system in accordance with an example embodiment of the disclosed technology.

FIG. 27 shows a flowchart of an example method 2700 for providing training images for training a neural network of a sign language translation system in accordance with one or more embodiments of the disclosed technology. The method 2700 includes, at 2710, generating a three-dimensional (3D) scene that includes a 3D model representing at least a part of a human body. The 3D model is positioned in the 3D scene to simulate a gesture that represents a letter, a word, or a phrase in a sign language. The method 2700 includes, at 2720, obtaining a value indicative of a total number of training images to be generated. The method 2700 includes, at 2730, using the value indicative of the total number of training images to determine a plurality of variations of the 3D scene for generating of the training images. The method 2700 includes, at 2740, applying each of plurality of variations to the 3D scene to produce a plurality of modified 3D scenes. The method 2700 also includes, at 2750, capturing an image of each of the plurality of modified 3D scenes to form the training images for a neural network of the sign language translation system.

Based on empirical data obtained using the disclosed techniques, it has been determined that a small amount of training images (e.g., around 50 images) is sufficient to train a pattern and gesture recognition system effectively. Thus, the number of training images can be greatly reduced. As the size of training data (e.g., the number of training images) becomes smaller, the performance of the training process is increased accordingly. For example, the reduction in processing can enable the implementation of the disclosed translation system using fewer hardware, software and/or power resources, such as implementation on a handheld device. Additionally, or alternatively, the gained computational cycles can be traded off to improve other aspects of the system. For example, in some implementations, a small number of training images allows the system to select more features in the 3D model. Thus, the training aspect can be improved due to the system's ability to recognize a larger number of classes/characteristics per training data set. Furthermore, because the features are labeled automatically with their precise boundaries (without introducing noise pixels), the accuracy of the training is also improved.

It is thus evident that the disclosed techniques can be implemented in various embodiments to optimize one or more aspects (e.g., performance, the number of classes/ characteristics, accuracy) of the training process of an AI system that uses neural networks, such as a sign language translation system. It is further noted that while the provided examples focus on recognizing and translating sign languages, the disclosed techniques are not limited in the field of sign language translation and can be applied in other areas that require pattern and/or recognition. For example, the disclosed techniques can be used in various embodiments to train a pattern and gesture recognition system that includes a neural network learning engine.

In one example aspect, an apparatus for training a sign language translation system is disclosed. The apparatus includes a processor and a memory including processor executable code. The processor executable code, upon execution by the processor, causes the processor to generate a three-dimensional (3D) scene that includes a 3D model representing at least a part of a human body. The 3D model is positioned in the 3D scene to simulate a gesture that represents a letter, a word, or a phrase in a sign language. The processor executable code upon execution by the processor configures the processor to obtain a value indicative of a total number of training images to be generated, use the value indicative of the total number of training images to determine a plurality of variations of the 3D scene for generating of the training images, apply each of plurality of variations to the 3D scene to produce a plurality of modified 3D scenes, and capture an image of each of the plurality of modified 3D scenes to form the training images for a neural network of the sign language translation system.

In some embodiments, the processor executable code, upon execution by the processor, further configures the processor to, for each of the training images, automatically generate a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, the processor executable code, upon execution by the processor, configures the processor to determine the plurality of variations of the 3D scene based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, the processor executable code, upon execution by the processor, configures the processor to apply each of plurality of variations to the 3D scene by changing the 3D scene in a temporal sequence in accordance with the set of parameters.

In some embodiments, the processor executable code, upon execution by the processor, further configures the processor to obtain an evaluation of the sign language translation system after the sign language translation system performs training and re-generate another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the processor executable code, upon execution by the processor, further configures the processor to obtain an evaluation of the sign language translation system for each of the training images one at a time and, for at least one of the training images, upon a determination that the sign language translation system performance in identifying a feature interest using the at least one of the training images has failed to improve from its performance based on a previous training image, discard the at least one training image.

In another example aspect, a method for providing training images for training a neural network of a sign language translation system is disclosed. The method includes generating a three-dimensional (3D) scene that includes a 3D model representing at least a part of a human body. The 3D model is positioned in the 3D scene to simulate a gesture that represents a letter, a word, or a phrase in a sign language. The method includes obtaining a value indicative of a total number of training images to be generated. The method includes using the value indicative of the total number of training images to determine a plurality of variations of the 3D scene for generating of the training images. The method includes applying each of plurality of variations to the 3D scene to produce a plurality of modified 3D scenes. The method also includes capturing an image of each of the plurality of modified 3D scenes to form the training images for a neural network of the sign language translation system.

In some embodiments, the method further includes, for each of the training images, automatically generating a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, determining the plurality of variations of the 3D scene is based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, applying each of plurality of variations to the 3D scene includes changing the 3D scene in a temporal sequence in accordance with the set of parameters.

In some embodiments, the method further includes obtaining an evaluation of the sign language translation system after the sign language translation system performs training and re-generating another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the method further includes obtaining an evaluation of the sign language translation system for each of the training images one at a time and, for at least one of the training images, upon a determination that the sign language translation system performance in identifying a feature interest using the at least one of the training images has failed to improve from its performance based on a previous training image, discarding the at least one training image.

In another example aspect, a non-transitory computer readable medium having code stored thereon is disclosed. The code, upon execution by a processor, causes the processor to implement a method that includes generating a three-dimensional (3D) scene that includes a 3D model representing at least a part of a human body. The 3D model is positioned in the 3D scene to simulate a gesture that represents a letter, a word, or a phrase in a sign language. The method also includes obtaining a value indicative of a total number of training images to be generated, using the value indicative of the total number of training images to determine a plurality of variations of the 3D scene for generating of the training images, applying each of plurality of variations to the 3D scene to produce a plurality of modified 3D scenes, and capturing an image of each of the plurality of modified 3D scenes to form the training images for a neural network of the sign language translation system.

In some embodiments, the method further comprises, for each of the training images, automatically generating a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, determining the plurality of variations of the 3D scene is based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, applying each of plurality of variations to the 3D scene includes changing the 3D scene in a temporal sequence in accordance with the set of parameters.

In some embodiments, the method further includes obtaining an evaluation of the sign language translation system after the sign language translation system performs training and re-generating another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the method further includes obtaining an evaluation of the sign language translation system for each of the training images one at a time and, for at least one of the training images, upon a determination that the sign language translation system performance in identifying a feature interest using the at least one of the training images has failed to improve from its performance based on a previous training image, discarding the at least one training image.

In another example aspect, an apparatus for training a pattern recognition system having a neural network engine is disclosed. The apparatus includes one or more processors and a memory including processor executable code. The processor executable code, upon execution by the one or more processors, causes the one or more processors to generate a three-dimensional (3D) scene that includes a 3D model representing an object. The 3D model comprising a plurality of polygonal subsections that collectively form the object. The processor executable code, upon execution by the one or more processors, also causes the one or more processors to determine a total number of training images to be generated for training the neural network, determine, based on the total number of training images, a plurality of parameter variations and applying each of plurality of the parameter variations to the 3D scene to produce a plurality of modified 3D scenes. The modified 3D scenes include at least one set of variations to a spatial position of the moving object in accordance with a temporal sequence. The processor executable code, upon execution by the one or more processors, also causes the one or more processors to capture an image of each of the plurality of modified 3D scenes to form the training images for the neural network learning engine, and, for each of the training images, automatically generate a label that corresponds to a feature of interest of the 3D model. The label includes one or more bounding lines that delineates a precise boundary of the feature of interest by combining an integer number of polygonal subsections of the 3D model.

In another example aspect, a method for training a sign language translation system is disclosed. The method includes adding a three-dimensional (3D) model into a 3D scene. The 3D model is positioned to show a gesture that represents a letter, a word, or a phrase in a sign language. The method includes determining a set of parameters of the 3D scene based on a predetermined number of training images to be generated and generating the predetermined number of training images corresponding to the set of parameters. Each image is generated based on at least one value of the set of parameters, and at least a subset of the parameters is adjusted sequentially in a time domain. The method also includes providing the predetermined number of training images to a neural network learning engine of the sign language translation system to perform training. In some embodiments, the predetermined number is less than or equal to 50.

In some embodiments, the method further includes obtaining an evaluation of the sign language translation system after the sign language translation system performs training; and re-generating a second set of training images when the evaluation indicates that the sign language translation system fails to meet one or more predetermined criteria. In some embodiments, the set of parameters of the 3D scene includes at least one of: a position of the 3D model, an angle of 3D model, a position of a camera, an orientation of the camera, a lighting attribute, a texture of a subsection of the 3D model, or a background of the 3D scene.

In some embodiments, the method further includes identifying a feature within the 3D model, wherein one or more of the predetermined number of training images include a label that corresponds to the feature. In some embodiments, the feature indicates a hand movement of the gesture. In some embodiments, the feature indicates a non-manual activity of the gesture. In some embodiments, the label includes one or more bounding lines that form a precise boundary of the feature. In some embodiments, the one or more bounding lines are automatically selected when the feature is identified.

In another example aspect, an apparatus for training a sign language translation system is disclosed. The apparatus includes a processor and a memory including processor executable code. The processor executable code, upon execution by the processor, causes the processor to add a three-dimensional (3D) model into a 3D scene. The 3D model is positioned to show a gesture that represents a letter, a word, or a phrase in a sign language. The processor executable code upon execution by the processor configures the processor to determine a set of parameters of the 3D scene based on a predetermined number of training images to be generated and generate the predetermined number of training images corresponding to the set of parameters. Each image is generated based on at least one value of the set of parameters, and at least a subset of the parameters is adjusted sequentially in a time domain. The processor executable code, upon execution by the processor, also configures the processor to provide the predetermined number of training images to a neural network learning engine of the sign language translation system to perform training. In some embodiments, the predetermined number is less than or equal to 50.

In some embodiments, the processor executable code, upon execution by the processor, configures the processor to obtain an evaluation of the sign language translation system after the sign language translation system performs training and re-generate a second set of training images when the evaluation indicates that the sign language translation system fails to meet one or more predetermined criteria. In some embodiments, the set of parameters of the 3D scene includes at least one of: a position of the 3D model, an angle of 3D model, a position of a camera, an orientation of the camera, a lighting attribute, a texture of a subsection of the 3D model, or a background of the 3D scene.

In some embodiments, the processor executable code, upon execution by the processor, further configures the processor to identify a feature within the 3D model, wherein one or more of the predetermined number of training images include a label that corresponds to the feature. In some embodiments, the feature indicates a hand movement of the gesture. In some embodiments, the feature indicates a non-manual activity of the gesture. In some embodiments, the label includes one or more bounding lines that form a precise boundary of the feature. In some embodiments, the one or more bounding lines are automatically selected when the feature is identified.

In yet another example aspect, a method for producing an image recognition system having a neural network engine is disclosed. The method includes adding a three-dimensional (3D) model into a 3D scene, determining a set of parameters of the 3D scene based on a predetermined number of training images to be generated, identifying a feature within the 3D model, and generating the predetermined number of training images corresponding to the set of parameters. Each image is generated based on at least one value of the set of parameters, and at least a subset of the parameters is adjusted sequentially in a time domain. One or more of the predetermined number of training images include a label that corresponds to the feature. The label is automatically selected based on one or more bounding lines that form a precise boundary of the feature. The predetermined number of training images forms a set of training images for the neural network learning engine of the image recognition system.

4. Examples of Data Processing Architectures

Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems. For example, in sign language translation systems, gestures are captured as input images. The images are then processed (e.g., removing background pixels, performing image segmentation, and/or matching the segments with signs stored in a database) to recognize what the gestures indicate. In many pattern recognition applications, a large amount of input data (e.g., input images) is processed through the artificial intelligence system. To provide real-time performance, multiple processing cores and/or units are often used. Data management (such as minimizing data transfers across processing units and data format conversions) as well as workload management (such determining the appropriate amount of work to be distributed across various processing cores) are key to the performance of the system.

In some embodiments, and in order to process the large amount of data involved in the above-mentioned applications, the example configurations in FIGS. 1-13 can include heterogeneous computing implementations, which refer to systems that use more than one kind of processor or cores, and that can be utilized to provide real-time performance.

Figure 28:
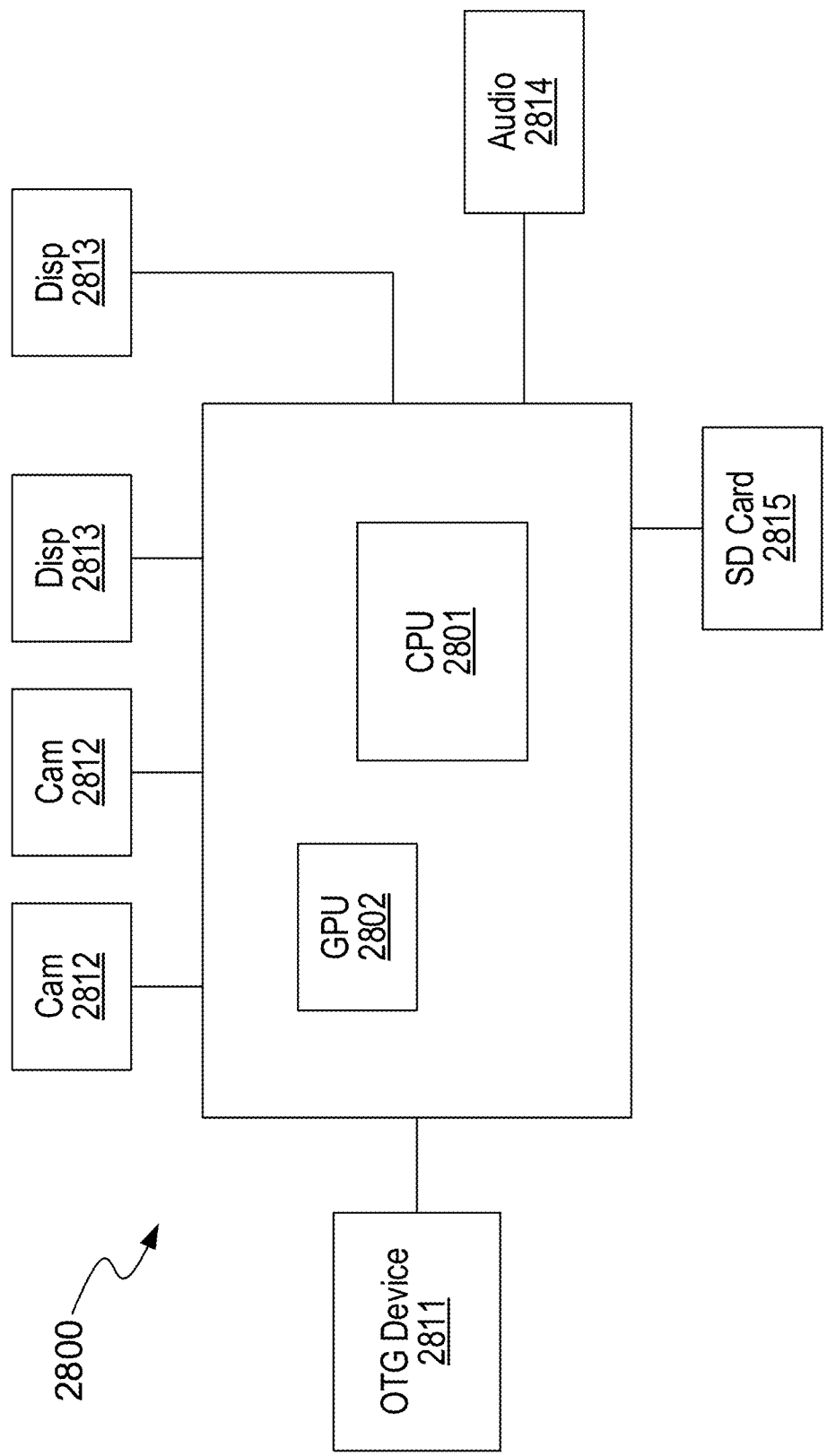
FIG. 28 illustrates an example of hardware architecture of a capture device in a pattern recognition system in accordance with an example embodiment of the disclosed technology.

FIG. 28 illustrates an example of hardware architecture of a capture device 2800 in a pattern recognition system in accordance with an example embodiment of the disclosed technology. The capture device 2800 includes various templates that allow communication with peripheral devices, such as one or more On-The-Go (OTG) devices 2811, one or more cameras 2812, one or more displays 2813, an audio device 2814, and an external storage 2815 such as an SD card. The capture device 2800 adopts heterogenous computing by using a CPU 2801 and one or more Graphics Processing Units (GPUs) 2802.

In heterogenous computing, algorithms and data are distributed across different types of processing units. For example, algorithms that operate on the data in parallel (also known as data parallelism) are suitable to be executed on the GPUs, while algorithms that focus on function and control (also known as task parallelism) are suitable to be executed on the CPU(s).

Figure 29:
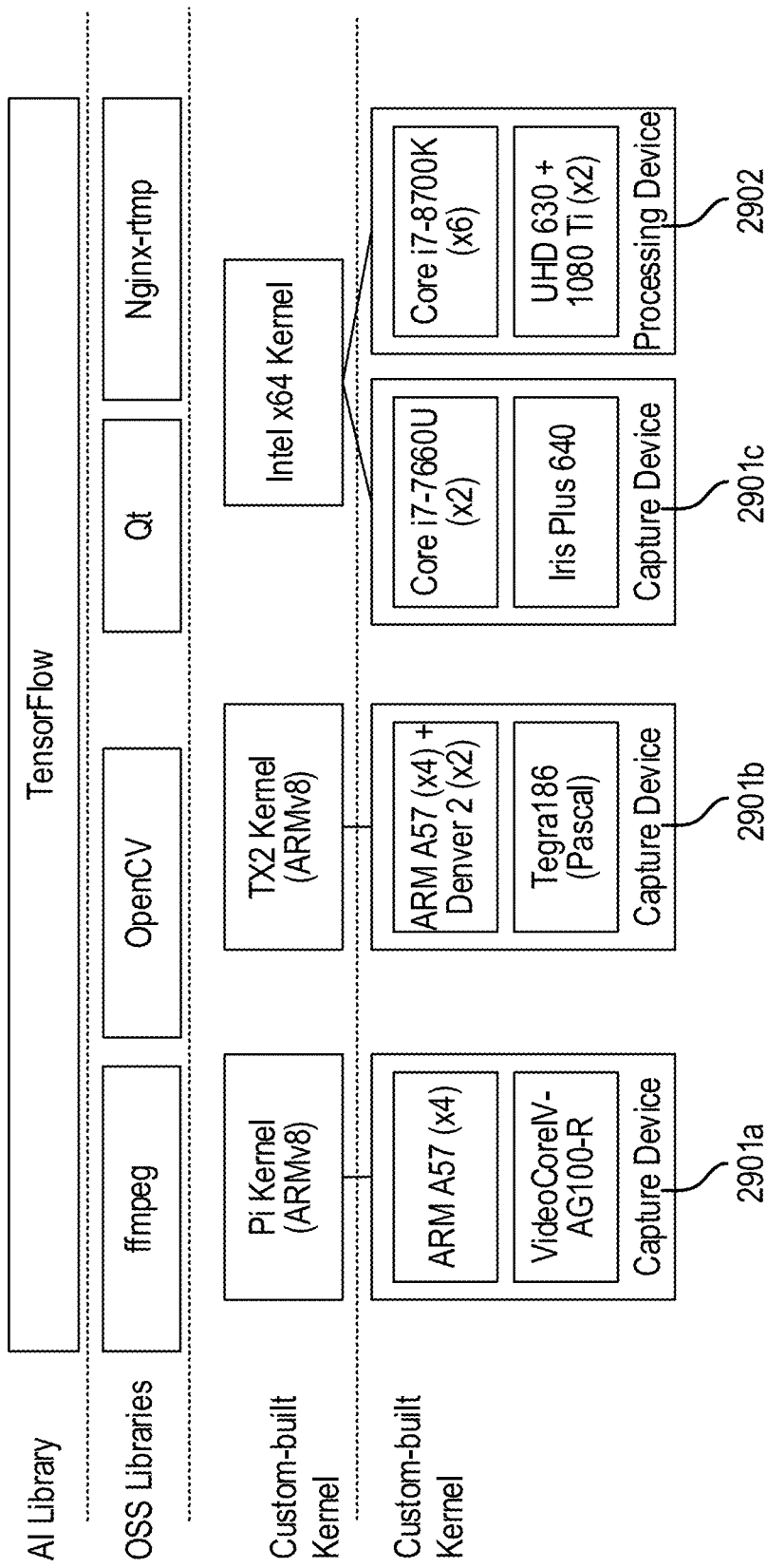
FIG. 29 illustrates an example of software and hardware frameworks that can be used by a pattern recognition system in accordance with an example embodiment of the disclosed technology.

Heterogenous computing presents certain challenges, such as inefficient data transfers, unnecessary data conversions, and an optimal workload distribution. For example, data processing in heterogeneous computing systems can be highly fragmented. This is caused by several factors. First, data management between multiple devices that use different hardware and/or software architectures can be challenging. For example, the capture and processing devices can use various processing units, such as Intel-based CPUs, Advanced RISC Machine (ARM) based CPUs, Intel-based GPUs, NVIDIA-based GPUs, and the combination thereof. FIG. 29 shows a set of example software and hardware frameworks that can be used by a pattern recognition system in accordance with an example embodiment of the disclosed technology. In this example, capture device 2901*a* includes an ARM A57 with four cores as the CPU. The capture device 2901*a* also includes a VideoCore IV-AG100-R as the GPU. The capture device 2901*a* uses a custom-built operating system kernel—Raspberry Pi Kernel—based on ARMv8. Capture device 2901*b* includes two CPUs: ARM A57 with four cores and Denver 2 with two cores. The capture device 2901*b* also includes an NVIDIA Tegra186 as the GPU and uses a custom-built kernel Jetson TX2 kernel. Capture device 2901*c* includes an Intel-based CPU Core i7-7660U with two cores, and an Intel Iris Plus 640 as the GPU. Processing device 2902 includes an Intel-based GPU Core i7-8700K with six cores, and two different GPUs: Intel UHD 630 and Nvidia GeForce 1080 Ti. Both capture devices 2901*c* and 2902 use Intel x64 kernel for the operating systems. The capture devices 2901*a-c* and processing device 2902 all use a variety of Open Source Software (OSS) libraries and AI libraries, such as ffmpeg, OpenCV, Qt, Ngix-rtmp, and TensorFlow.

As shown in FIG. 29, capture devices 2901*a* and 2901*b* use a reduced instruction set computing (RISC) architecture, while capture device 2901*c* uses a family of instruction set architecture that is compatible the Intel x86 chipset. The processing device 2902, which can be located locally or remotely, also uses Intel-based instruction sets. Different architectures may use different ways to organize and address data in memory. As a result, to access image data by multiple processors having differing address/data architectures (e.g., ARM A57 and Tegra186, or Core i7 and Iris Plus), the image data must be copied multiple times between the processors so that the data can be properly addressed and accessed.

Additionally, many software components expect specific data formats that may not be compatible with those required by other software components. For example, as shown in FIG. 29, the capture devices 2901*a*, 2901*b*, 2901*c* and the processing device 2802 use libraries such as ffmpeg, OpenCV, and/or Qt. The processing device 2902 uses TensorFlow in a neural network engine to perform pattern or gesture recognition. To allow data captured by the OpenCV library to be successfully processed by TensorFlow, a format conversion (e.g., to uint8, or to float) is needed. Data conversions add additional cost and reduce the processing speed. It is thus desirable to have a data management layer to eliminate unnecessary data format conversions and/or schedule data format conversions at appropriate times to hide latencies.

Some of the disclosed embodiments, among other features and benefits, describe data management systems that allow efficient management and transporting of data for pattern and/or gesture recognition applications. For example, a data management system leverages a customized template for accessing the data in a consistent and efficient manner while minimizing unnecessary data conversions and/or copies across different devices and/or processing units. Some of the disclosed embodiments further relate to techniques that help determine the suitable amount of processing loads for the CPU core(s), the GPU cores and/or other processing engines that may be implemented in a data processing system. The discloses techniques can be used to, for example, reduce latency (e.g., caused by data transfer or data preparation) such that the utilization rate of each processing core is improved.

The following provides additional details to facilitate the understanding of the underlying technology using specific examples. Section headings below are used only to improve readability and do not limit scope of the disclosed embodiments and techniques in each section to only that section.

4.1 Example Data Management System for Data Transfer and Conversion

A data management system, including a software program or a software library residing on a non-transitory storage medium that can be accessed and executed by a processor, can be implemented on the capture devices, and/or on processing devices that are located either locally or remotely to the capture devices, to manage data transfers across multiple processing units and/or data conversions between different libraries.

Figure 30:
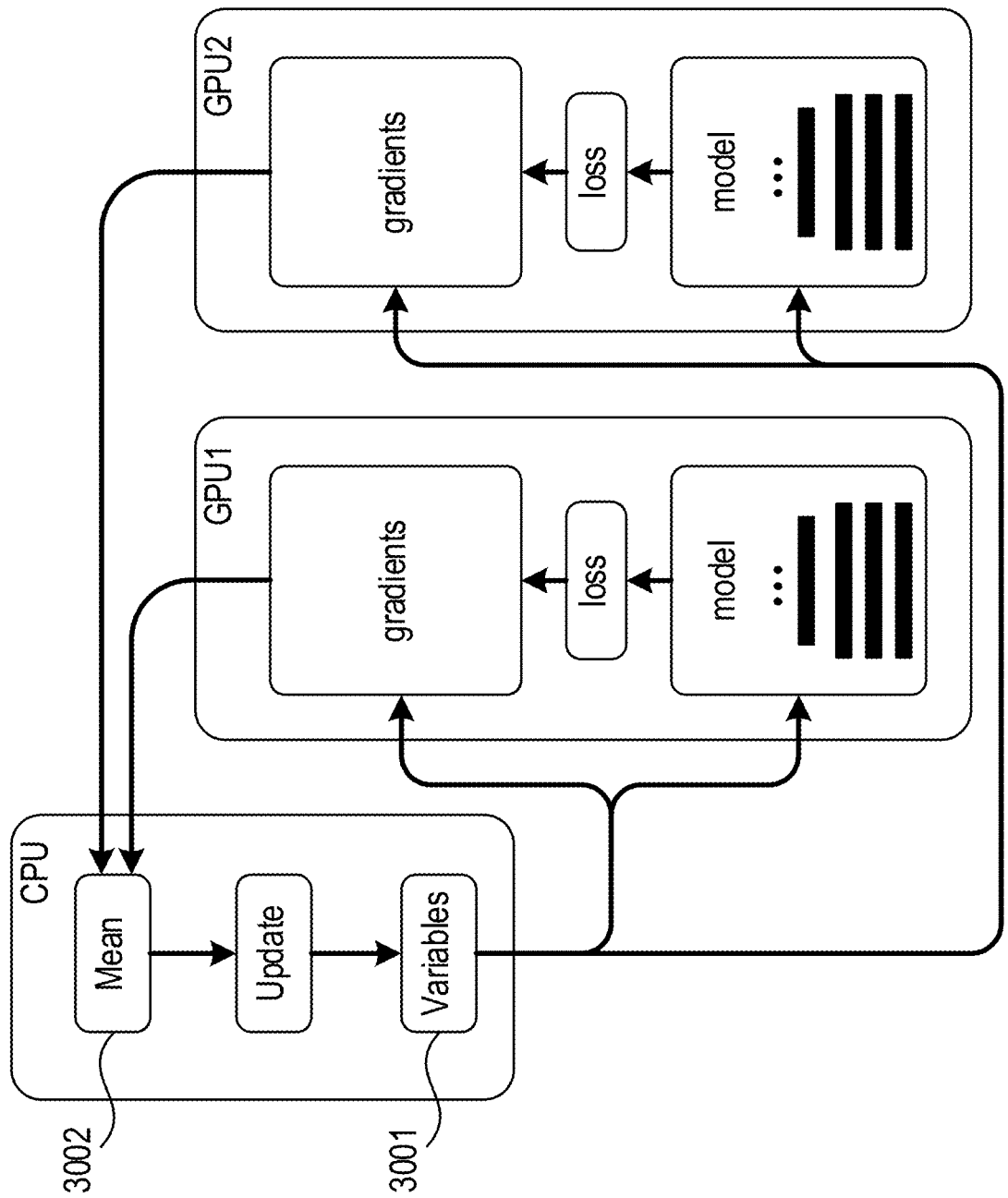
FIG. 30 illustrates an example of a standard TensorFlow process that shows data transfer inefficiency in heterogenous computing.

FIG. 30 illustrates an example of a standard TensorFlow process that shows data transfer inefficiency in heterogenous computing. In FIG. 30, the CPU performs an "Update" operation that updates the variables 3001 based on the mean values 3002. The variables 3001 are used by the model for computations performed on the GPU. The model also computes a corresponding loss, whose value reduces as the model's accuracy improves. In some embodiments, the GPU also constructs symbolic derivatives, known as gradients, based on the variables 3001, which are used by the CPU for the computation of mean values 3002. As shown in FIG. 30, the standard approach requires multiple copies of common values between CPU and the one or more GPUs. For example, the algorithms executed by GPU1 and GPU2 share the variables 3001, which are copied twice from the CPU to the GPU1 and from the CPU to the GPU2. The gradients produced by GPU1 and GPU2 are also copied twice to the CPU for the computation of the mean values 3002.

Figure 31A:
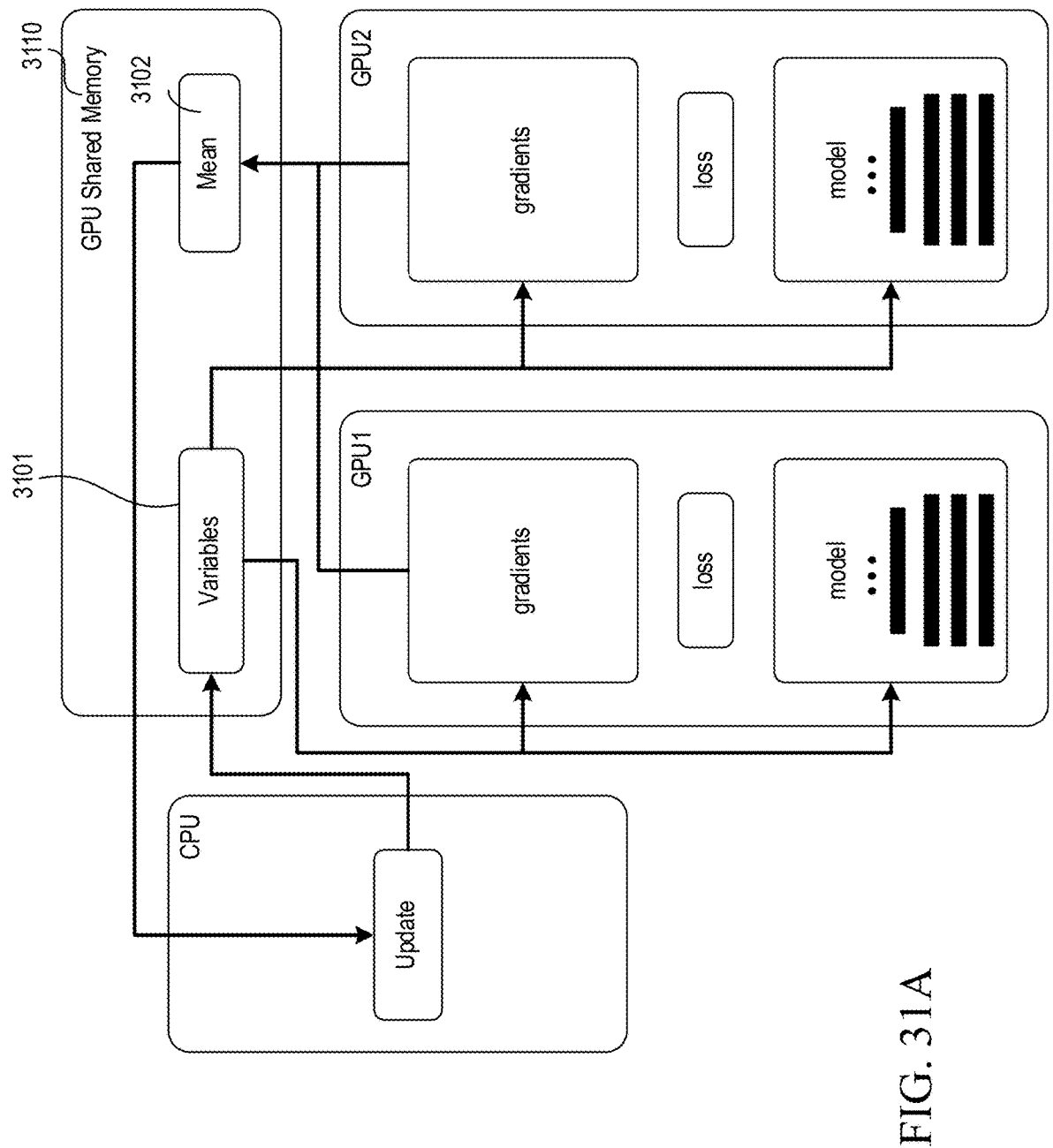
FIG. 31A illustrates an example single-copy approach in accordance with an example embodiment of the disclosed technology.

In such cases, data that is common to the algorithms executed on the GPUs can be managed by a shared memory, thereby reducing the amount of data transfers between CPU and GPUs. FIG. 31A illustrates an example single-copy approach in accordance with an example embodiment of the disclosed technology. In this example, the variables 3101 are copied from the CPU to the GPU shared memory 3110 only once. Then, both GPU1 and GPU2 can access the variables 3101 without incurring additional data transfer time that would be required in the architecture of FIG. 30. Similarly, the mean values produced by GPU1 and GPU2 are also stored in the shared memory 3110. After all the mean values are generated, they are copied once from the shared memory 3110 to the CPU for subsequent updates.

Figure 31B:
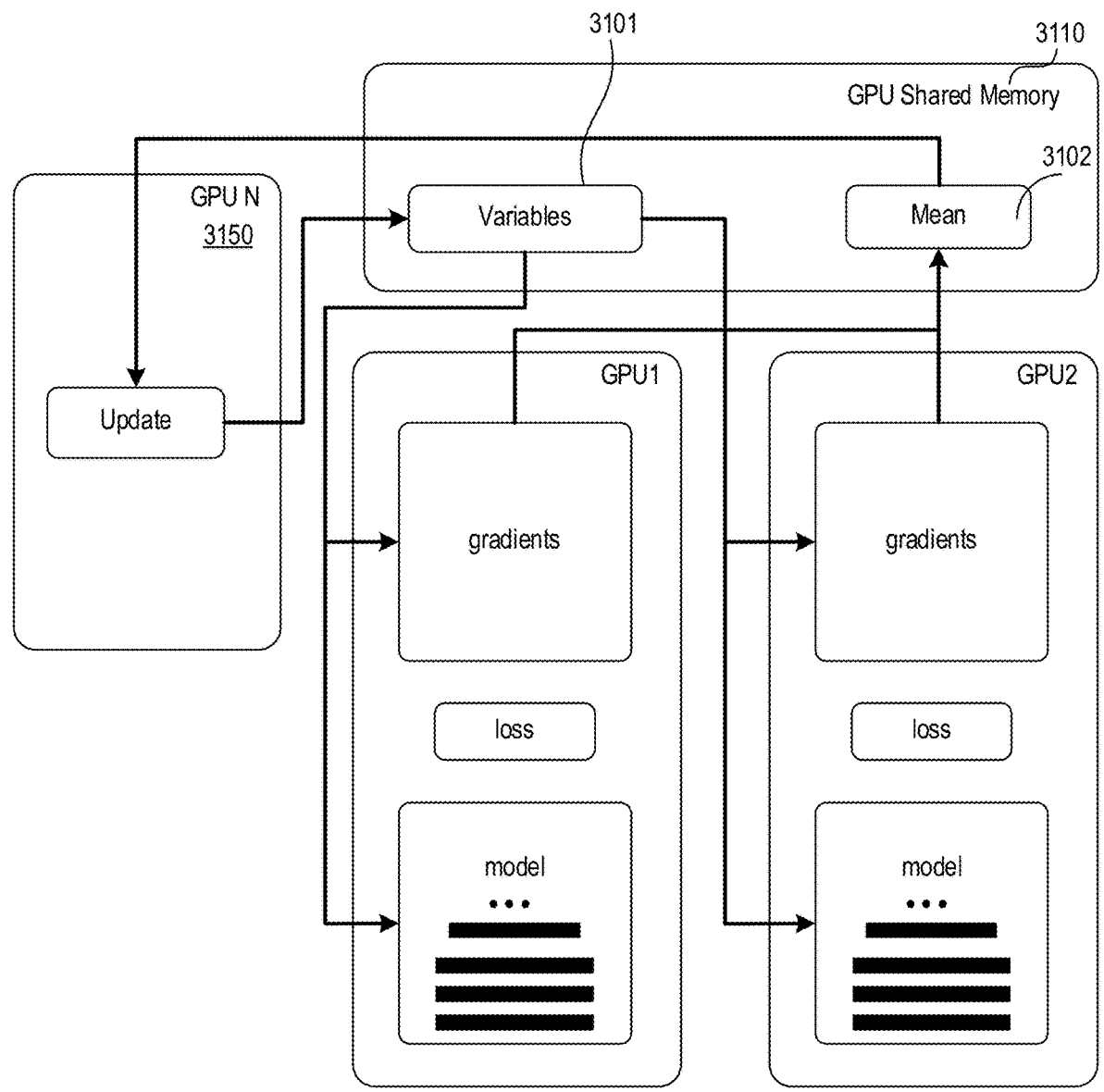
FIG. 31B illustrates an example of a zero-copy approach in accordance with an example embodiment of the disclosed technology.

In some embodiments, a pattern and/or gesture recognition system includes additional GPUs. The control-heavy algorithm previously executed on the CPU can be adapted to run on an additional GPU to leverage the computing resources, thereby eliminating the need of performing data copies altogether. FIG. 31B illustrates an example of a zero-copy approach in accordance with an example embodiment of the disclosed technology. In this example, the CPU is eliminated, and the algorithm that would have been executed on the CPU as shown in FIG. 31A is now run on GPU N (3150). Because all GPUs can access the shared memory 3110, variables 3101 can be set up in the shared memory 3110 directly without performing any copies. Similarly, the mean values 3102 are written directly to the shared memory 3110 to allow them to be accessed GPU N (3150). The GPU N (3150) can perform subsequent updates based on the mean values 3102 without requiring any data transfers between the GPUs. For example, in systems that support Uniform Memory Access (UMA), CPU and GPU can have uniform access to the same data without incurring any cost of copying. Such features can be leveraged by the data management system to reduce data transfer cycles, which becomes especially important in pattern recognition applications due to the large number of data access and processing cycles required for processing image data.

Figure 32:
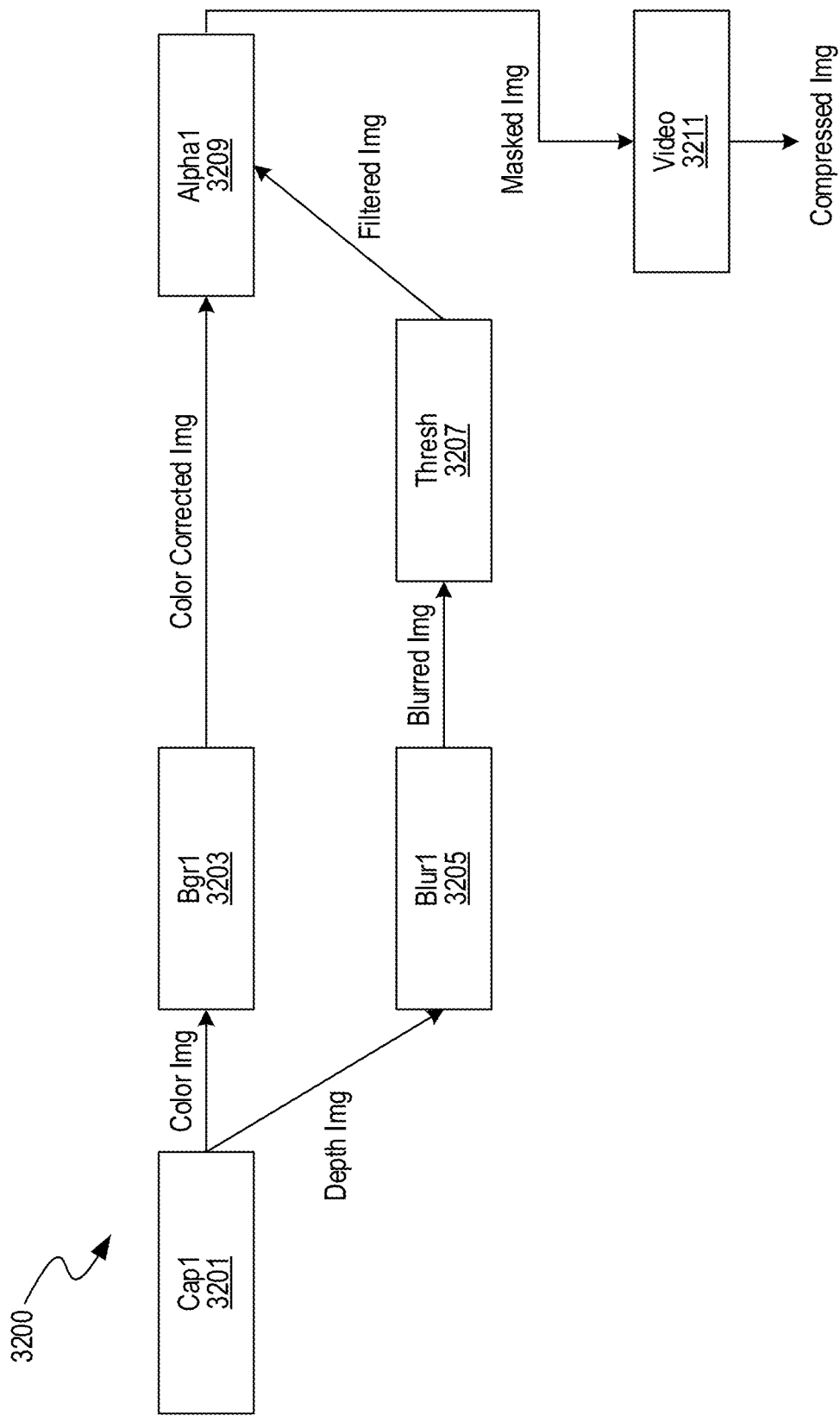
FIG. 32 illustrates an example graph of processing operations used in a pattern and/or gesture recognition system in accordance with an example embodiment of the disclosed technology.
Figure 33A:
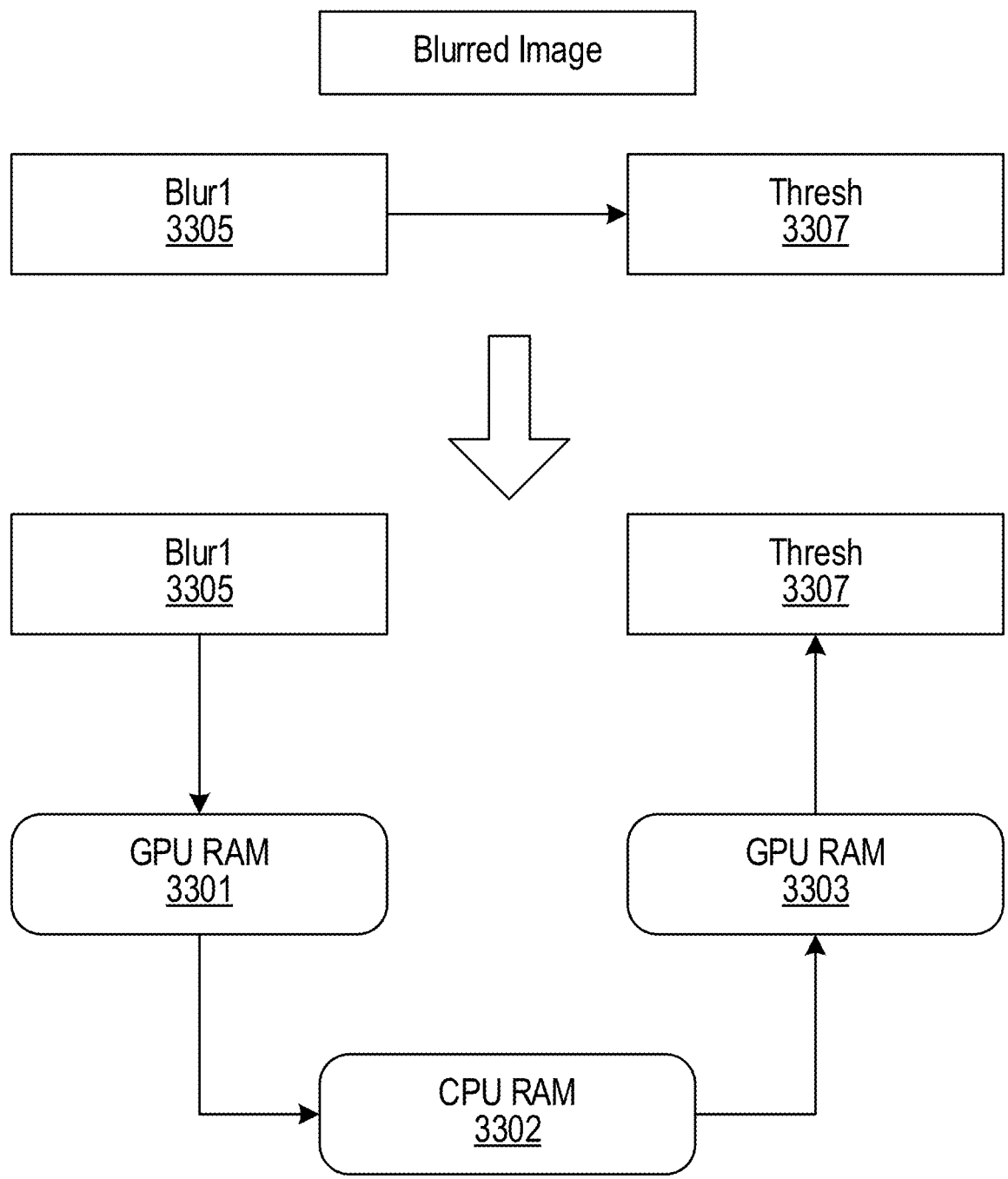
FIG. 33A illustrates an example of generating multiple copies of an image in the blurring stage as shown in FIG. 32.

In some embodiments, to allow the neural network engine to effectively recognize patterns and/or gestures, it is desirable to perform some preliminary processing on the input images captured by the capture device(s). FIG. 32 illustrates an example graph 3200 of processing operations used in a pattern and/or gesture recognition system in accordance with an example embodiment of the disclosed technology. The graph 3200 includes a capture stage 3201 that captures both a color image and a depth image. The color image then goes through a background stage 3203 to produce a color corrected image that differentiates the foreground and the background portions. At the same time, the depth image goes through a blur stage 3205 to generate a blurred depth image. The blurred image then goes through a threshold stage 3207 so that the depth values are kept under a threshold value. The processed color and depth images are combined in an alpha stage 3209 to generate a masked image for masking out the background. The masked image is then fed into the video stage 3211 to produce a compressed video frame. At each stage of the graph 3200, an output image is created for use as an input by the next stage. If an image resides in the CPU memory, copying of the image is then necessary for the GPU(s) to access the image. Similarly, if an image resides in the GPU local memory, copying of the image is necessary for the CPU and other GPU(s) to access the image. Time for each copy operation must be allocated across the entire graph. FIG. 33A illustrates an example of set of operations that are typically carried out at the blur stage 3205 that is shown in FIG. 32 to provide the result to the threshold operation. As shown in the bottom section of FIG. 33A, the input image is copied to GPU Random-Access Memory (RAM) 3301 for the blur operation. The output blurred image is then copied to CPU RAM 3302. The blurred image is copied to GPU RAM 3303 again so that it becomes available to the threshold operation. Without any optimization, the graph shown in FIG. 32 can require a minimum of eight copy operations to complete all the stages.

Figure 33B:
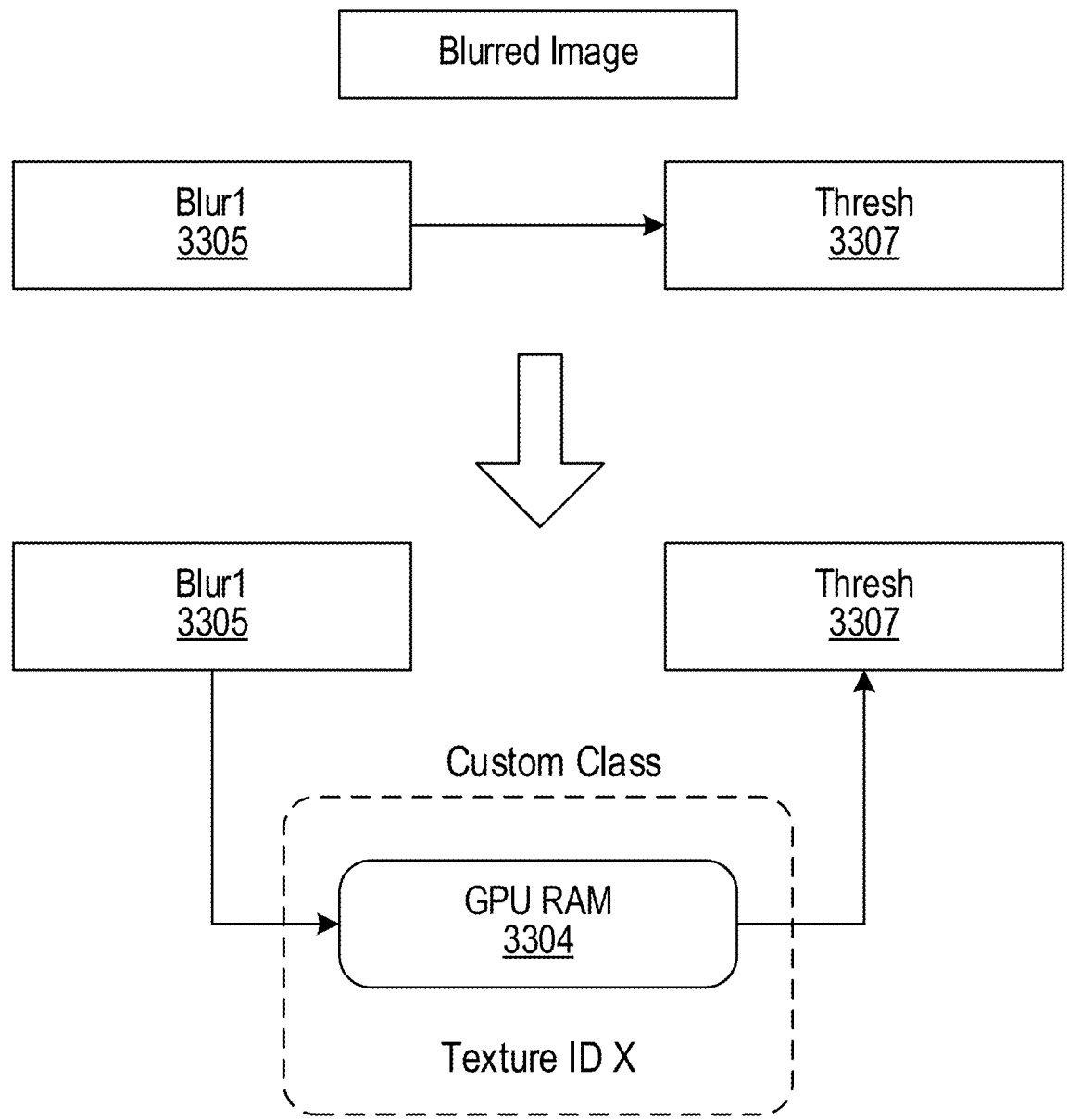
FIG. 33B illustrates an example of a customized template for managing data access in accordance with an example embodiment of the disclosed technology.

To address such performance penalty associated with the multiple copies, a customized code template can be generated to uniformly define attributes for all image data and allow access to the image data without any copies. For example, as shown in FIG. 33B, a custom template that characterizes data access and/or data formats, such as a custom class derived from OpenCv's cv::Mat class, can be defined to manage all captured image data uniformly. In this example, the custom template includes a Texture ID attribute to store the input as textures on the GPU shared memory 3304. The system determines the value of the Texture ID attribute based on where the captured image data is stored (as a texture) in the shared GPU memory 3304. The GPU can then translate the Texture ID value to an actual address value at which the image data is stored. Therefore, the GPUs can access the image without performing any copies. When UMA is enabled, the CPU can also access the image data via the Texture ID (or other similar indicators), thereby eliminating the need to copy the data back and forth between GPU(s) and the CPU.

FIG. 33C illustrates an example description of a customized template for managing data access and format conversions in accordance with an example embodiment of the disclosed technology. In this particular example, the template includes a timestamp attribute to indicate when a data frame is captured. The timestamp allows synchronization of the data across different processing units and different devices. The timestamp value can be in one of the following formats: millisecond, frame number, and/or Society of Motion Picture and Television Engineers (SMPTE) timecode. In some implementations, the template includes a time type value to indicate the type of time units. For example, the time type can be one of Unix system time, a frame number, or a time value used in the SMTPE standards.

The template also includes an attribute that indicates a storage type of the data frame. The value of the storage type indicates where the frame is stored. For example, the data can be stored on a local CPU, a local GPU, a remote CPU, and/or a remote GPU. When multiple processing units are available in a single device, each processing unit is given a corresponding storage type (e.g., local_GPU0, local_GPU1, etc.). The template further includes one or more attributes to indicate the address value(s) of the stored data. Such attribute can be assigned a reference value (e.g., an address value) that corresponds to a particular storage type. In some embodiments, the template can also include attributes such as the width of the frame, the height of the frame, and the format(s) in which the frame is stored.

It is noted that the customized template shown in FIG. 33B and FIG. 33C are only examples of the customized template. The data management system can use other suitable formats to represent and manage the underlying data.

In some embodiments, the data management system can include a data pool to store the customized template of the underlying frames and/or the actual data. For example, the data pool can be organized using a data structure such as a queue, a circular buffer, a stack, and/or a linear buffer. Data stored in the pool (e.g., the corresponding customized template of the data frames) can be ordered based on the timestamps. As discussed above, the timestamps allow synchronization of data frames across different processing units and/or devices.

Figure 34:
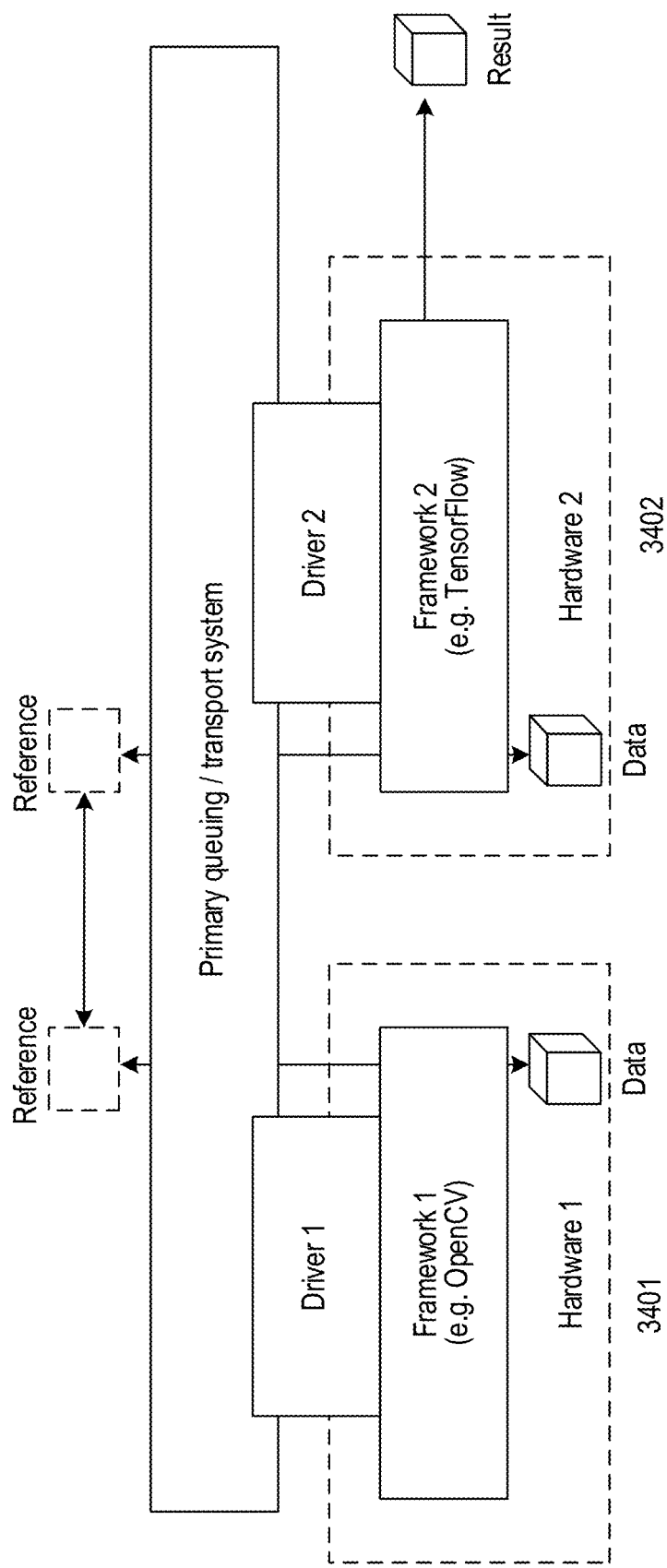
FIG. 34 is a schematic illustration of example functions performed by a data and management system in accordance with an example embodiment of the disclosed technology.

FIG. 34 is a schematic of example functions performed by a data management system in accordance with an example embodiment of the disclosed technology. In FIG. 34, Hardware A 3401 captures input data using Framework 1 (e.g., the OpenCV library). The data management system places the input data in a first location and initiates a preconfigured algorithmic process on the data. For example, the input data can be encoded locally (e.g., on a local GPU) to generate an encoded video (e.g., an H.264/MPEG-4 video) using the operations shown in FIG. 32. As a part of the processing, each frame of the input data is associated with a customized template that includes at least a timestamp to indicate when the frame is captured, a storage type to indicate where the data is placed, and a reference value to indicate the address of the data.

The data management system takes the processed data (e.g., the encoded video) and moves the data to a second location for subsequent processing. In some embodiments, the second location is the same as the first location. For example, if Hardware B 3402 is physically co-located with Hardware A 3401, then each encoded video frame can remain in the GPU for subsequent processing by GPU-enabled TensorFlow. This way, no additional data transfer is needed. In some embodiments, the second location is different than the first location. For example, Hardware B 3402 can be in a remote cloud server. The data management system transports the encoded video to the cloud server to allow Hardware B 3402 to perform proper processing on the data. The relevant fields in the customized template can be updated to replace the local GPU storage type with a remote GPU storage type. In this example, the reference value that corresponds to the storage type can also be updated to indicate the address of the data on the remote Hardware B 3402.

In some embodiments, the customized template allows multiple copies of the data to be maintained at the same time. For example, while Hardware B 3402 processes (and possibly modifies) the video frames to perform pattern and/or gesture recognition, other devices (e.g., a back-up device coupled to Hardware A 3401) may access the original input data at the same time. The data management system can remove the local copy on Hardware A 3401 after the back-up operation is completed, and update the metadata field accordingly. In some embodiments, the data management system can initiate data transfer ahead of time so that transfer latency can be hidden.

In some embodiments, the data management system may support appropriate conversions between various AI engines and computer vision libraries used for performing the pattern and/or gesture recognition. For example, the data management system can convert the captured data in a YUV color space into data in an RGB color space. As another example, the data management system can convert data captured using the OpenCV library to a NumPy array to allow proper access by TensorFlow.

In some implementations, multiple copies of the captured data can be stored. In the example discussed above, after a conversion from the YUV to RGB color space is performed, both copies of data (data in both the YUV and RGB color spaces) are stored to eliminate the need to perform the same conversion again in the future. For example, one copy of the data (e.g., the YUV copy) can be stored in the data pool (e.g., identified as remote_CPU storage type in the listing of FIG. 33C), while the other copy (e.g., the RGB copy) can be stored and processed by the processing device. As another example, the data management system can store the intermediate NumPy array in the data pool to avoid additional conversions if the data is to be accessed by TensorFlow again in the future.

As another example, standard TensorFlow image is in the Batch-size-Channel-Height-Width (NCHW) format, while the Nvidia tensor core hardware expects the Batch-size-Height-Width-Channel (NHWC) format. If an input is presented to Compute Unified Device Architecture (CUDA) Deep Neural Network library (cuDNN) in the NCHW format, a conversion operation from NCHW to NHWC (and from NHWC to NCHW) occurs internally, which negates performance improvements by the tensor cores. Given knowledge of the format information, the customized template (e.g., the matrix class) can read data in the proper format to eliminate the need for repeated conversions.

Experiments conducted by the inventors have shown that, without the customized template to manage data access across different types of processing units, the input images (in the RGBD format) can only be processed at a speed of 8.7 frames per second (fps). Using the techniques described above, the processing speed can be drastically improved to above 30 fps.

4.2 Example Load Balancing Module for Workload Distribution

Figure 35:
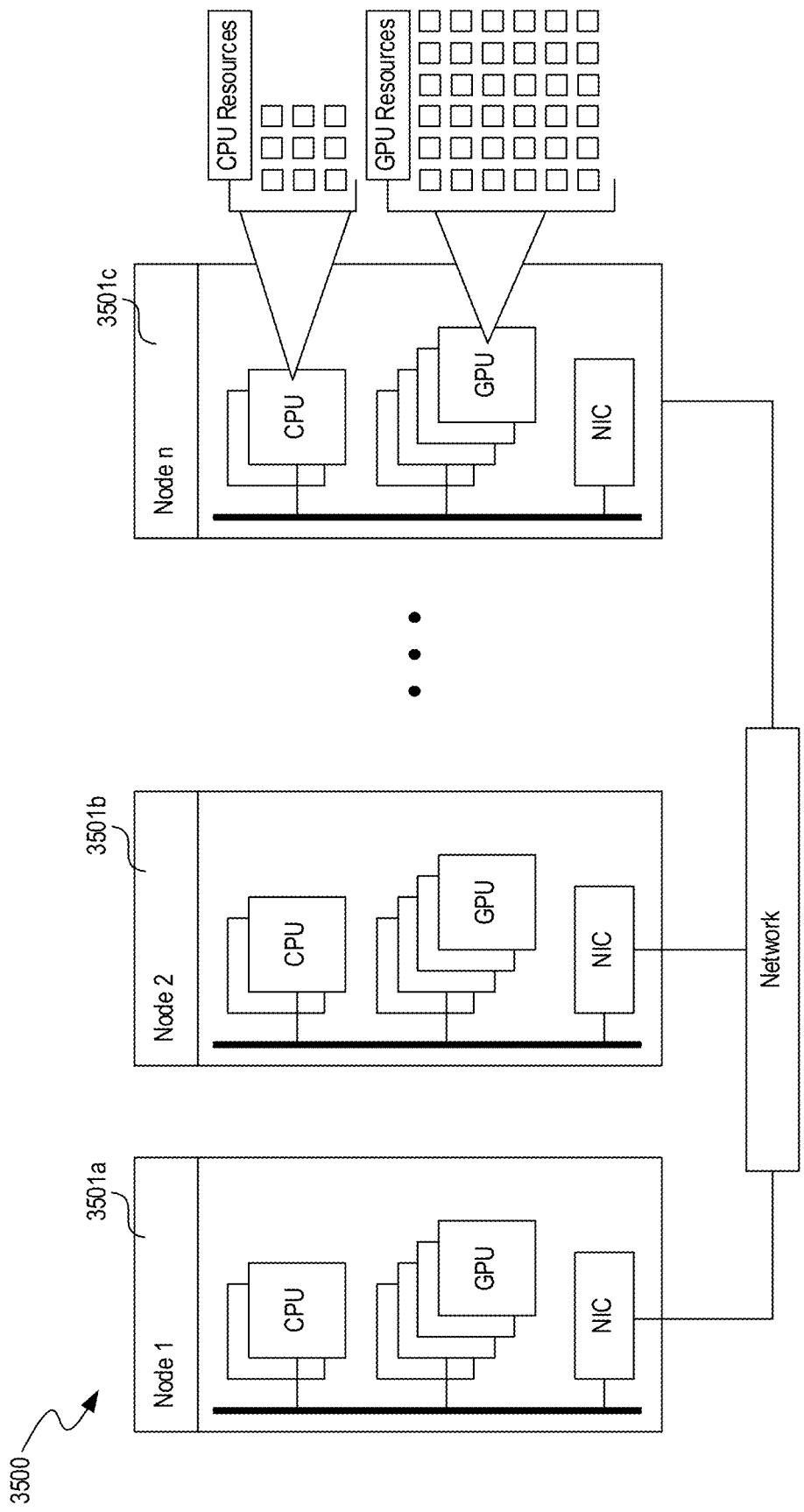
FIG. 35 illustrates an example of hardware architecture of multiple processing nodes in a pattern recognition system in accordance with an example embodiment of the disclosed technology.

FIG. 35 illustrates an example of hardware architecture of multiple processing nodes in a pattern recognition system in accordance with an example embodiment of the disclosed technology. Each processing node 3501a, 3501b, 3501c is a single physical computing system that includes a motherboard, one or more CPU sockets with corresponding CPU resources, one or more GPU cards with corresponding GPU resources, and one or more network interface controllers (NIC) that allows communications with other nodes, and/or with other devices or components, through at least one Network. As discussed above, the amount of control flow in a processing task is an important factor for determining the distribution of workload across multiple processing cores. For example, tasks with complex control flow are suitable to be executed on one or more CPU cores while tasks that include high-level data parallelism are suitable to be executed on GPU cores.

Figure 36A:
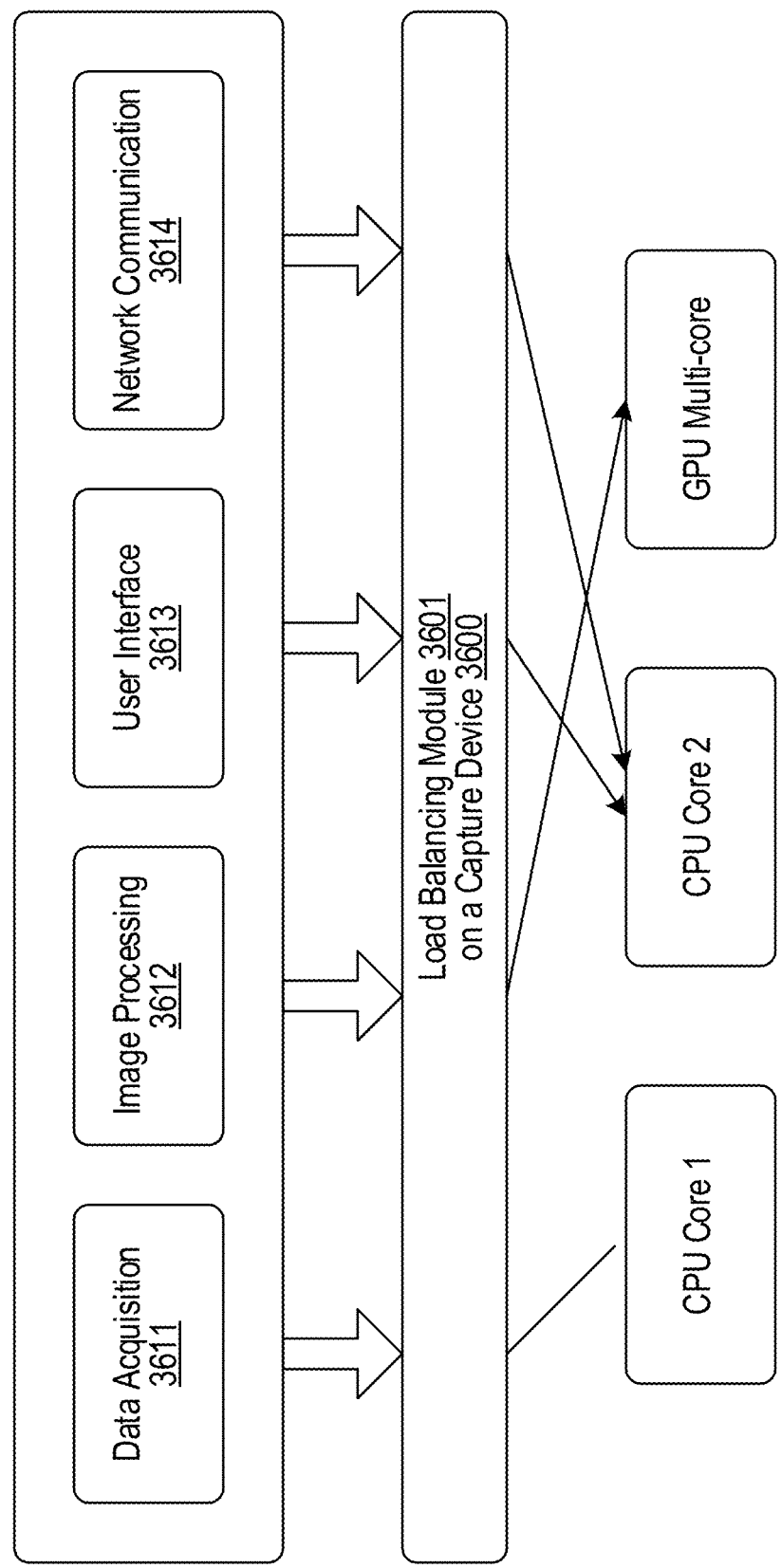
FIG. 36A is a schematic diagram illustrating workload distribution on a capture device in accordance with an example embodiment of the disclosed technology.

FIG. 36A is a schematic diagram illustrating workload distribution on a capture device in accordance with an example embodiment of the disclosed technology. In the example shown in FIG. 36A, a load balancing module 3601, such as a software program or a software library residing on a non-transitory storage medium that can be accessed and executed by a processor, can be implemented on a capture device 3600. The load balancing module can be executed by either a CPU or a GPU of the capture device. The capture device 3600 provides a data acquisition module 3611 (e.g., software programs that communicate with a camera) to capture data. The capture device 3600 can provide an image processing module 3612 to allow the captured data to be processed locally. For example, the captured image frames can be compressed to a video by the image processing module 3612. The capture device 3600 also provides a user interface 3613 to allow users to control and operate the device. The capture device 3600 can further include a network communication module 3614 to transmit captured data to another device for further processing. Thus, the operations on the capture device 3600 can be control-flow heavy, and the load balancing module 3601 may delegate those types of operations to CPU cores. For example, the load balancing module 3601 can determine that data acquisition, the user-template tasks, and network communications are suitable to be executed on CPU cores. The load balancing module thus delegates the data acquisition task to CPU Core 1, and user interface and network communication tasks to CPU core 2. On the other hand, processing of the captured images may involve the same processing operations on a large amount of data. Thus, the load balancing module 3601 determines to delegate such data-intensive tasks to one or more GPU cores.

Figure 36B:
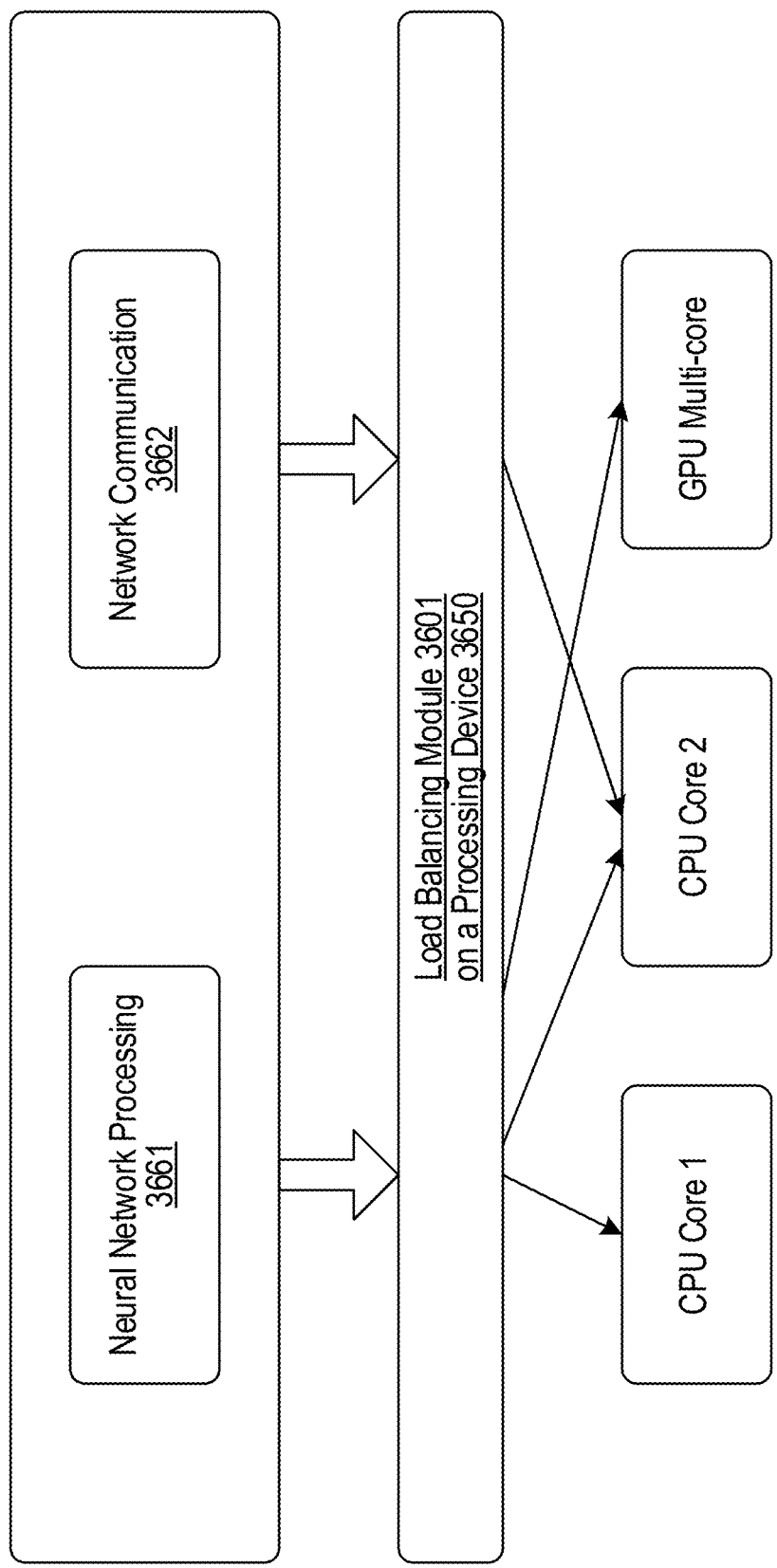
FIG. 36B is another schematic diagram illustrating workload distribution on a processing device in accordance with an example embodiment of the disclosed technology.

To benefit from parallel processing, it is desirable to have large amounts of processor-intensive work to overcome the overhead of parallelization. FIG. 36B is another schematic diagram illustrating workload distribution on a processing device in accordance with an example embodiment of the disclosed technology. The processing device 3650 may be co-located with the capture device. The processing device 3650 may be located remotely from the capture device. In this example, the remote processing device 3650 receives data by a network communication module 3662 from the capture device to perform further processing on the data. The processing device 3650 also includes a neural network processing module 3661 that invokes one or more neural networks to recognize the gestures based on the captured data. The load balancing module 3601 (e.g., load balancing software programs or libraries) can be installed on the processing device to delegate work appropriately. Similarly, the load balancing module can be executed by either a CPU or a GPU of the processing device. For example, the load balancing module 3601 decides to delegate all network communication tasks to one CPU core (e.g., CPU core 2) based on the amount and the complexity of the work. On the processing side, depending on the algorithms adopted by the remote processing device 3650, the load balancing module 3601 may send a portion of the data to the GPU cores for more data-intensive parallel processing. The rest of the data remains on the CPU cores (e.g., CPU core 1 and core 2) due to the complexity of control flow. The load balancing module 3601 can further use a threading model for the CPU tasks so that the amount of idle time on the CPU cores remains as low as possible.

Figure 37A:
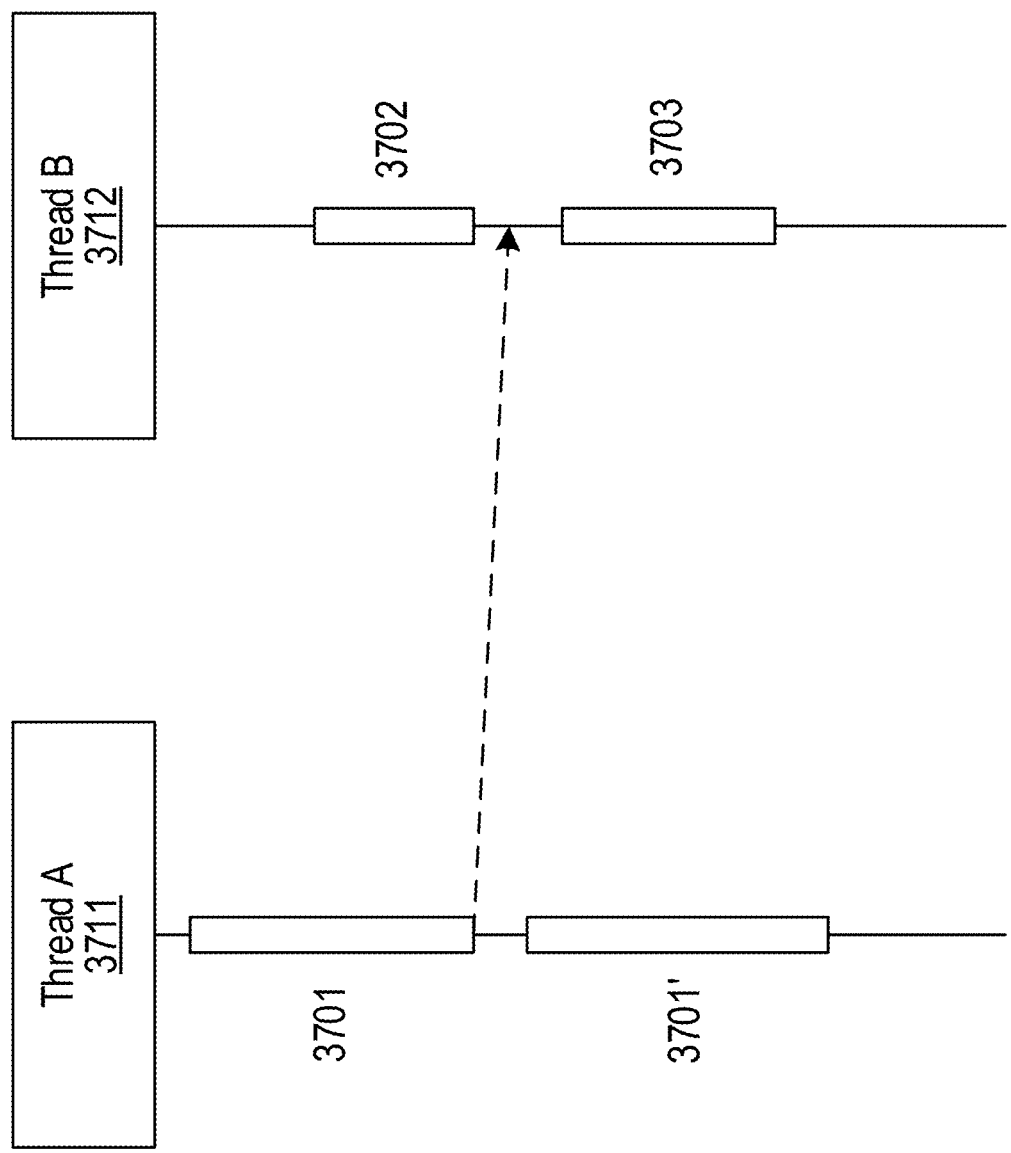
FIG. 37A illustrates an example threading model that can be used for Central Processing Unit (CPU) processing in accordance with an example embodiment of the disclosed technology.

FIG. 37A illustrates an example threading model that can be used for CPU processing in accordance with an example embodiment of the disclosed technology. For simplicity, only one pair of threads (also referred to as ping-pong threads) is used in the context of an image capture, processing and recognition example. The load balancing module first starts Thread A 3711 and Thread B 3712 at the same time. The load balancing module delegates Thread A 3711 to handle the task of input data capturing 3701. In some embodiments, as a part of the input data capturing task 3301, Thread A 3711 can perform some pre-processing operations on the captured data (e.g., color space conversion, or encoding) using the GPU cores. Thread A 3711 then produces an image frame for subsequent processing. For example, Thread A 3711 can preprocess the captured image to remove background pixels, so that only the areas of interest (e.g., foreground pixels that show the gestures) remain in the processed image for subsequent processing. At the same time, Thread B 3712 prepares resources 3702 for a pattern/gesture recognition operation once the input image is ready. For example, Thread B 3712 can allocate a number of cores on CPU/GPU and the necessary amount of memory for the pattern/gesture recognition operation. After Thread B 3712 detects that Thread A 3711 has finished generating the image frame, Thread B 3712 grabs the frame from Thread A 3712 and invokes the pattern/gesture recognition operation 3703. The pattern/gesture recognition operation can be performed entirely on the CPU by Thread B. In some embodiments, the pattern/gesture recognition operation can be executed on a GPU. In some implementations, the operation is divided into several portions for processing on the CPU and/or GPU(s). Thread A 3711 moves onto capturing and processing 3701' of the next frame in parallel with the pattern/gesture recognition operation 3703. This way, latency in preparation and data transfer can be hidden. The threading model can be implemented using various tools including but not limited to the multiprocessing package in Python (version 2.6 or above), Message Passing Interface (MPI), Open Multi-Processing (OpenMP), boost threads, etc.

Figure 37B:
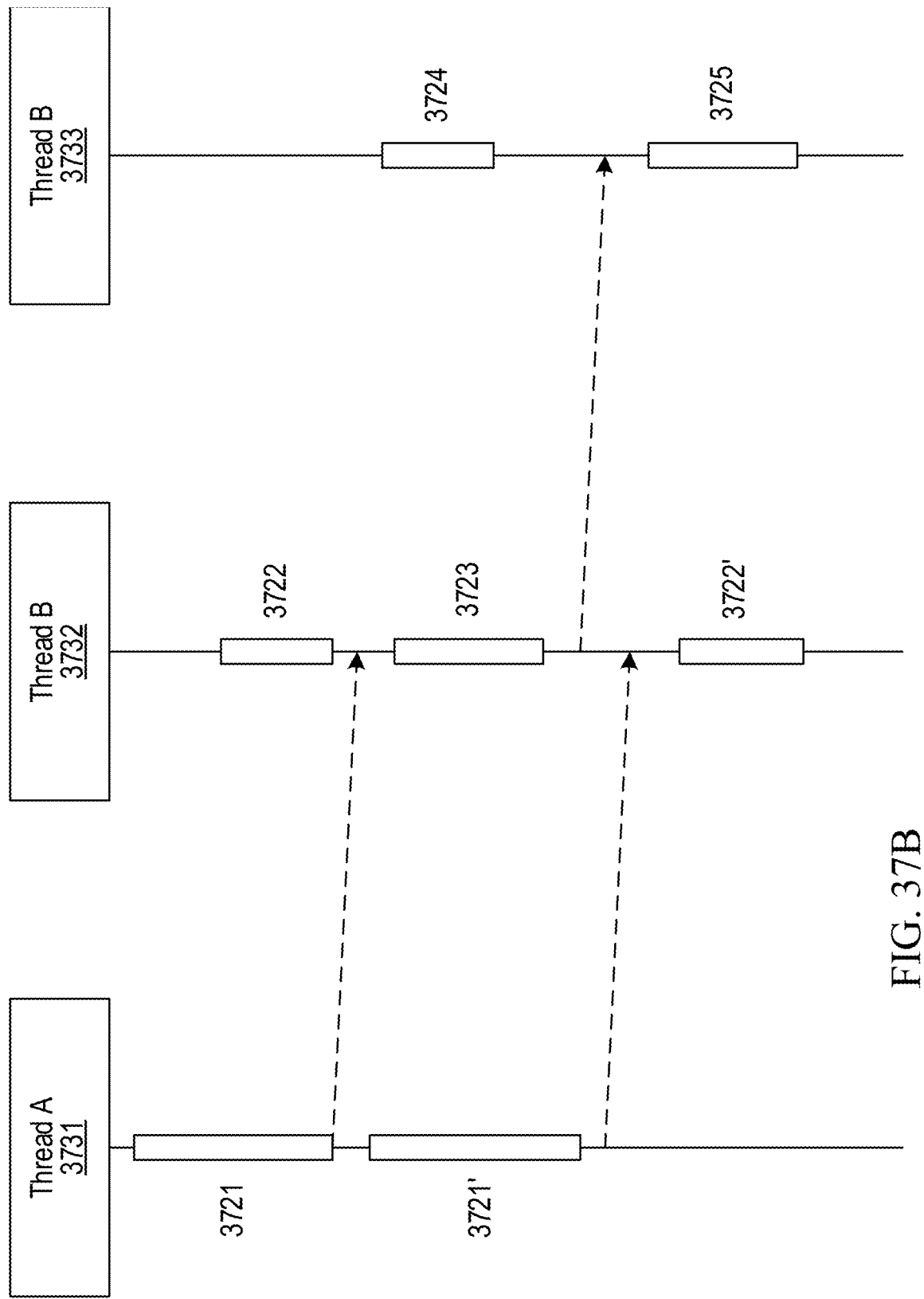
FIG. 37B illustrates another example threading model that can be used for CPU processing in accordance with an example embodiment of the disclosed technology.

FIG. 37B illustrates another example threading model that can be used for CPU processing in accordance with an example embodiment of the disclosed technology. In this example, three threads are used to achieve optimal load balance. The three threads can also be referred to as zing-ping-pong threads. The load balancing module starts Thread A 3731, Thread B 3732, and Thread C 3733 at the same time. The load balancing module delegates Thread A 3731 to handle the task of input data capturing 3721. Thread A 3731 produces a single image frame for subsequent processing. At the same time, Thread B 3732 prepare resources 3722 for a pattern/gesture recognition operation once the input image is ready. After Thread A 3731 finishes generating the image frame, Thread B 3732 and Thread C 3733 continue to process the frame using artificial intelligence techniques.

In some embodiments, the artificial intelligence techniques may include the use of one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time operations as it cascades forward to affect the processing of each new example. It is finding correlations between events separated by many moments, and these correlations are called "long-term dependencies", because an event downstream in time depends upon, and is a function of, one or more events that came before.

For example, referring back to FIG. 37B, Thread B 3732 can process the frame using a primary neural network such as a two-dimensional (2D) CNN 3723. Alternatively, a three-dimensional (3D) CNN can be used to not only process 2D frame information but also depth information included in the image frame(s). The CNN operation can be performed entirely on a CPU core or can be divided into several portions for processing on both the CPU and GPU cores. In the example shown in FIG. 37B, thread C 3733 prepares resources 3724 at the same time and processes the output from CNN using one or more secondary neural networks 3725. For example, Thread C 3733 may invoke a RNN with persistent memory. Thread A 3731 moves onto capturing of the next frame 3721' in parallel with the image recognition operations performed by Thread B 3732 and Thread C 3733. This way, latency in preparation and data transfer can be hidden. Similarly, the threading model can be implemented using various tools including but not limited to the multiprocessing package in Python (version 2.6 or above), MPI, OpenMP, boost threads, etc.

Figure 38:
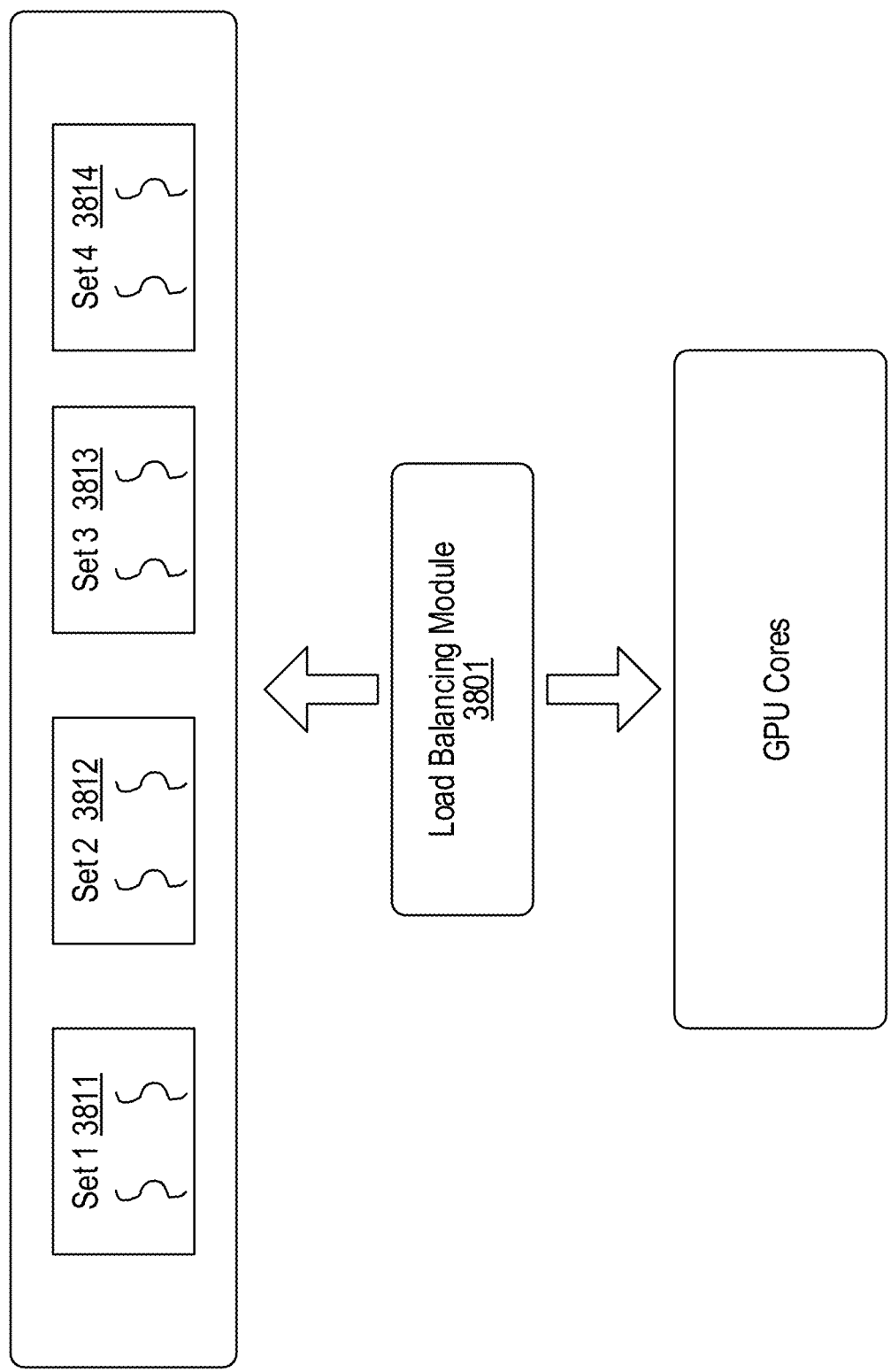
FIG. 38 illustrates yet another example threading model in accordance with an example embodiment of the disclosed technology.

FIG. 38 illustrates yet another threading model in accordance with an example embodiment of the disclosed technology. In this example, the load balancing module 3801 manages multiple sets of ping-pong or zing-ping-pong threads (thread sets 3811-3814). The thread sets 3811-3814 can be represented by multiple bits. For example, one thread set that includes two threads can be represented by two bits: "00." In some implementations, one or more sets can be marked as active thread sets, while the remaining sets provide failover support. The corresponding bits for the thread sets can be marked as "11 11 11 . . . 00," with bit "1" indicating an active thread and bit "0" indicating an inactive, failover thread. In some implementations, all thread sets remain active to allow load balancing of the tasks across all CPU cores. The corresponding bits are marked to "1" to indicate that all threads are active. The load balancing module 3801 may schedule CPU intensive tasks in parallel with data transfers between the GPU and CPU to further hide the data latency.

In some embodiments, as shown in FIGS. 3-5, the capture device may include multiple sensors (e.g., cameras) to capture multiple images at the same time (e.g., multi-aperture capturing). Multiple thread sets, each corresponding to a particular camera, can be configured to obtain input streams from the cameras and process the input streams at the same time. In some embodiments, the capture device may include multiple GPUs so that processing of multiple input streams can be conducted independently on each GPU in parallel. In some embodiments, the capture device includes a CPU and a single GPU—the load balancing module thus schedules the thread sets accordingly to minimize data copy and/or transfer between the CPU cores and the GPU.

For example, as shown in FIG. 38, the load balancing module maintains four sets of ping-pong threads, represented by eight bits. The capture device can include three cameras to capture input data. The load balancing module first starts three sets (3811-3813) of active ping-pong threads (e.g., "11 11 11 00"), each set corresponding to a particular camera to obtain data from the camera and perform subsequent gesture recognition. After the three thread sets finish preliminary gesture recognition of the input data, a fourth set of threads 3814 can be activated (e.g., "11 11 11 11") to take into account additional information in the input (e.g., temporal associations between various frames) and produce a more comprehensive recognition result. Concurrently, the first three sets of ping-pong threads can move onto capturing and processing of more input data, thereby minimizing performance impact on the translation system while providing a more accurate interpretation of the hand gestures.

As the input images change, the amount of work to be performed by the CPU and GPU(s) may change at the same time. In order to increase utilization rate of the CPU and GPU resources, the load balancing module can dynamically determine the suitable amount of work for CPU and GPUs.

Figure 39:
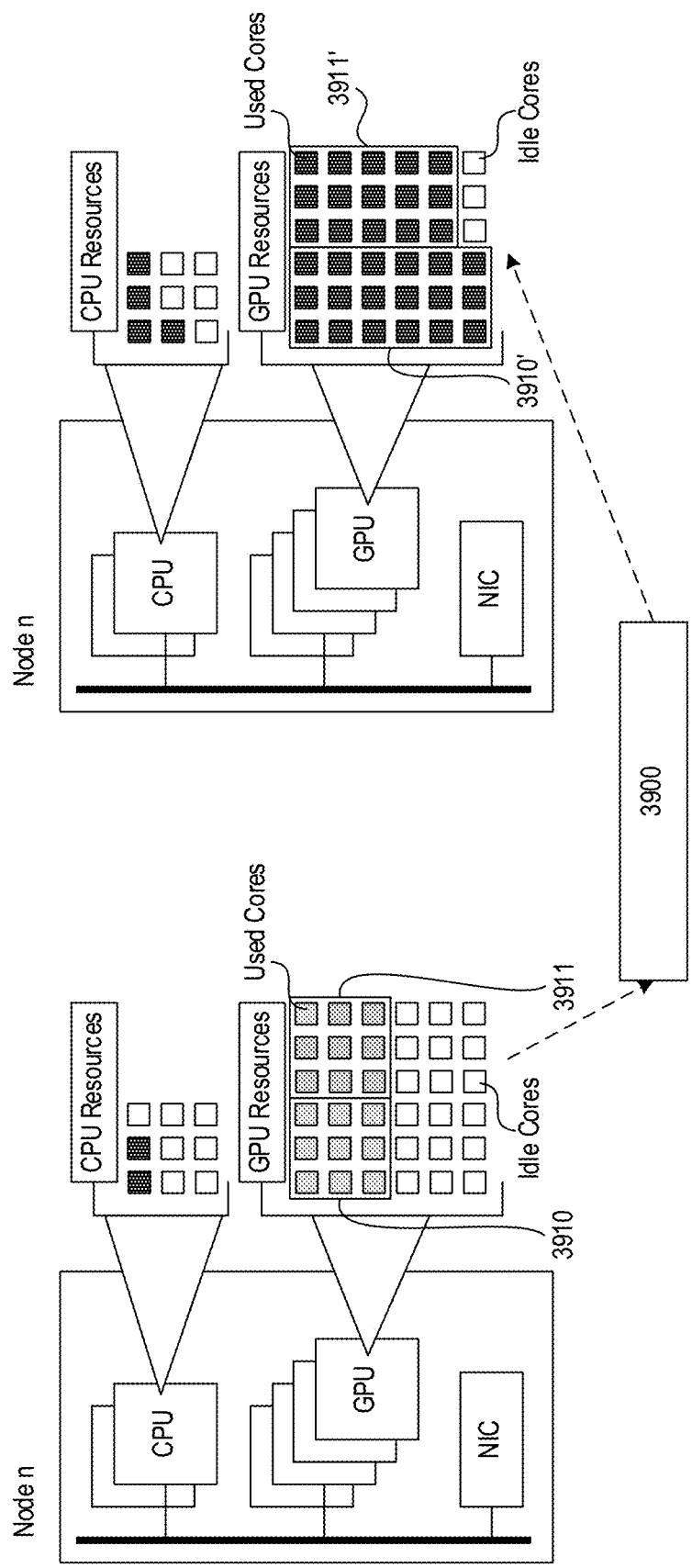
FIG. 39 illustrates an example of a load balancing module that dynamically schedules resources on multiple processing nodes in accordance with an example embodiment of the disclosed technology.

FIG. 39 illustrates an example of a load balancing module that dynamically schedules resources on multiple processing nodes in accordance with an example embodiment of the disclosed technology. In this example, the load balancing module (e.g., software programs that communicate with a camera) can be executed by either on a CPU or a GPU of the capture device. The load balancing module 3900 collects system utilization data during execution. For example, the load balancing module 3900 detects the used CPU and GPU resources. The used GPU resources are grouped in units "towers": Tower A 3910 (depicted as the left 9 gray squares in FIG. 39) and Tower B 3911 (e.g., the right 9 gray squares). The load balancing module 3900 then computes the changes to the resource allocation configurations to increase system utilization rate. The load balancing module 3900 applies the changes to resource allocation on different processing units, resulting in modified tower shapes (e.g., 3910' and 3911') and utilization profiles.

In some embodiments, the load balancing module 3900 can be trained using existing data to determine the optimal resource allocation for processing image data. For example, the load balancing module 3900 observes and stores outcome results, and a learning algorithm, such as supervised learning, unsupervised learning, or reinforcement learning, to increase performance of future outcomes. In some embodiments, the learning algorithm can be executed directly on the GPU to determine subsequent resource allocation.

Figure 40:
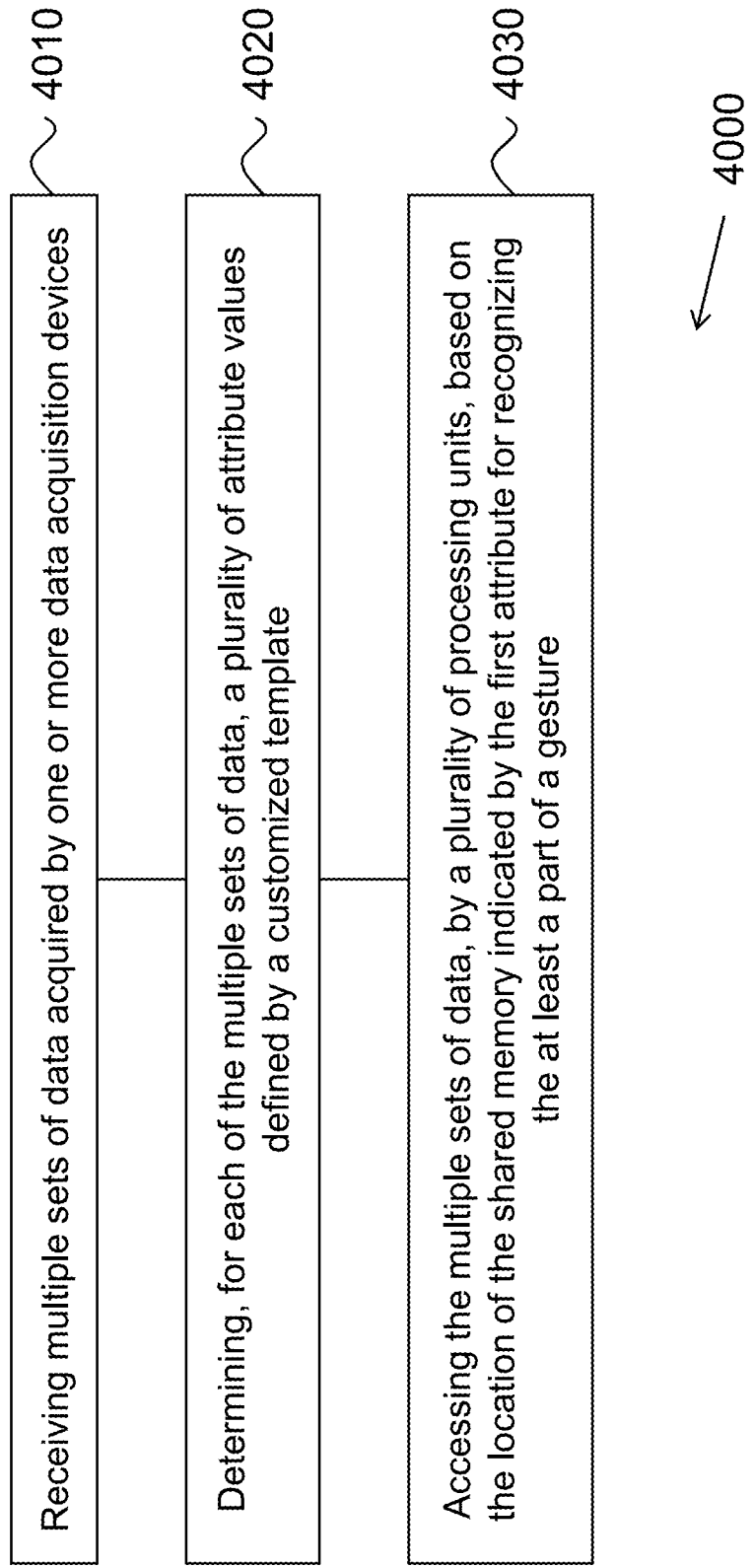
FIG. 40 is a flowchart representation of a method of managing data for a sign language translation system in accordance with an example embodiment of the disclosed technology.

FIG. 40 is a flowchart representation of a method 4000 of managing data for a sign language translation system in accordance with some exemplary embodiments. The method 4000 includes, at 4010, receiving multiple sets of data acquired by one or more data acquisition devices. Each set of data includes an image frame that illustrates at least a part of a gesture, and the gesture represents a letter, a word, or a phrase in a sign language. The method 4000 includes, at 4020, determining, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The method 4000 includes, at 4030, accessing the multiple sets of data, by a plurality of processing units, based on the location of the shared memory indicated by the first attribute for recognizing the at least a part of a gesture. The location allows at least one of the plurality of processing units to access the multiple sets of data in the memory without copying the multiple sets of data to any other memory location.

Figure 41:
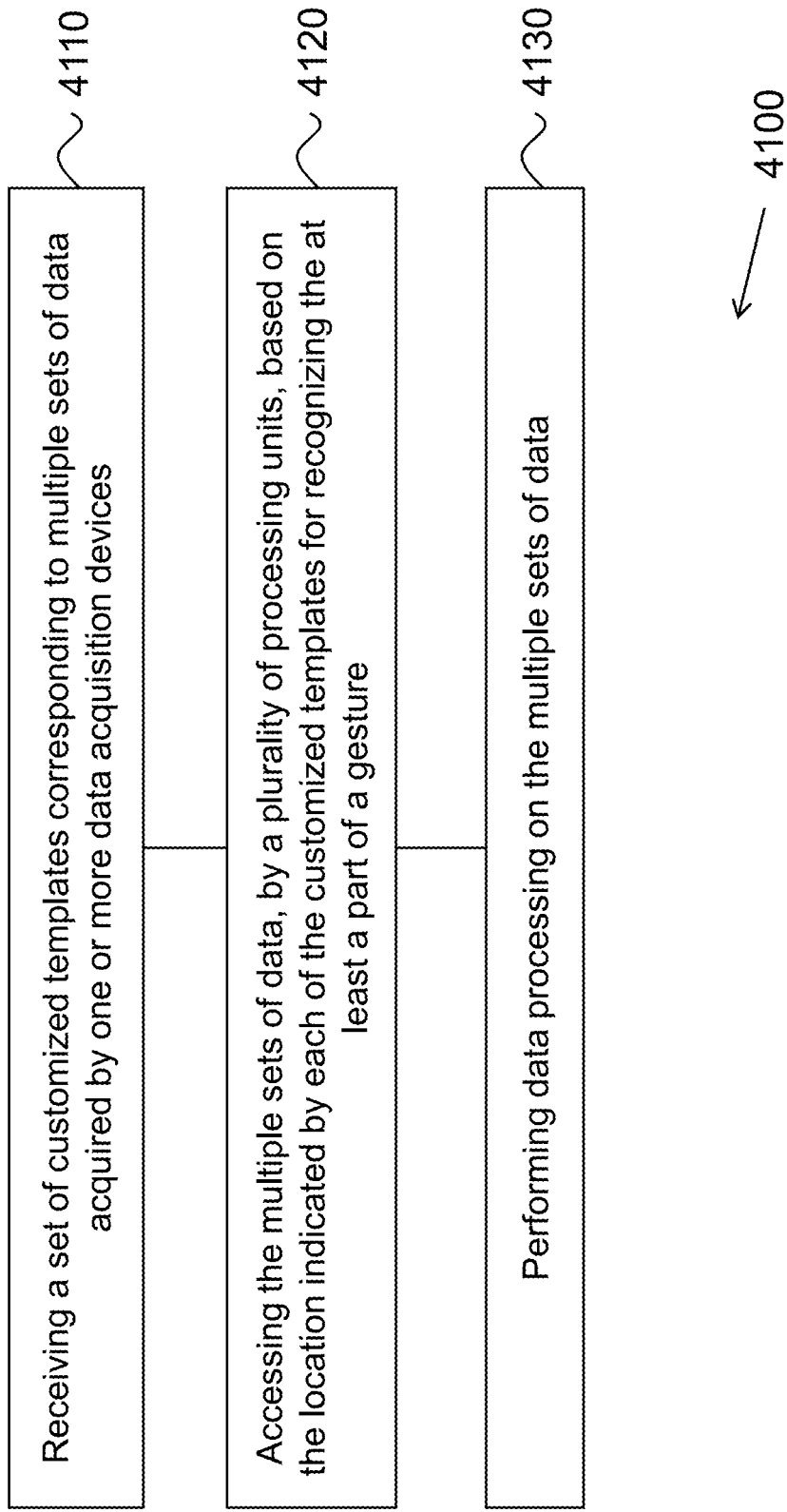
FIG. 41 is a flowchart representation of a method of managing data for a sign language translation system in accordance with an example embodiment of the disclosed technology.

FIG. 41 is a flowchart representation of a method 4100 of managing data for a sign language translation system. The method 4100 includes, at 4110, receiving a set of customized templates corresponding to multiple sets of data acquired by one or more data acquisition devices. Each set of the data including an image frame that illustrates at least a part of a gesture, and the gesture represents a letter, a word, or a phrase in a sign language. Each of the customized templates comprises an indicator that indicates a location at which the corresponding set of data is stored. The method 4100 includes, at 4120, accessing the multiple sets of data, by a plurality of processing units, based on the location indicated by each of the customized templates for recognizing the at least a part of a gesture. The location allows at least one of the plurality of processing units to access the multiple sets of data without copying the data. The method 4100 also includes, at 4130, performing data processing on the multiple sets of data.

Figure 42:
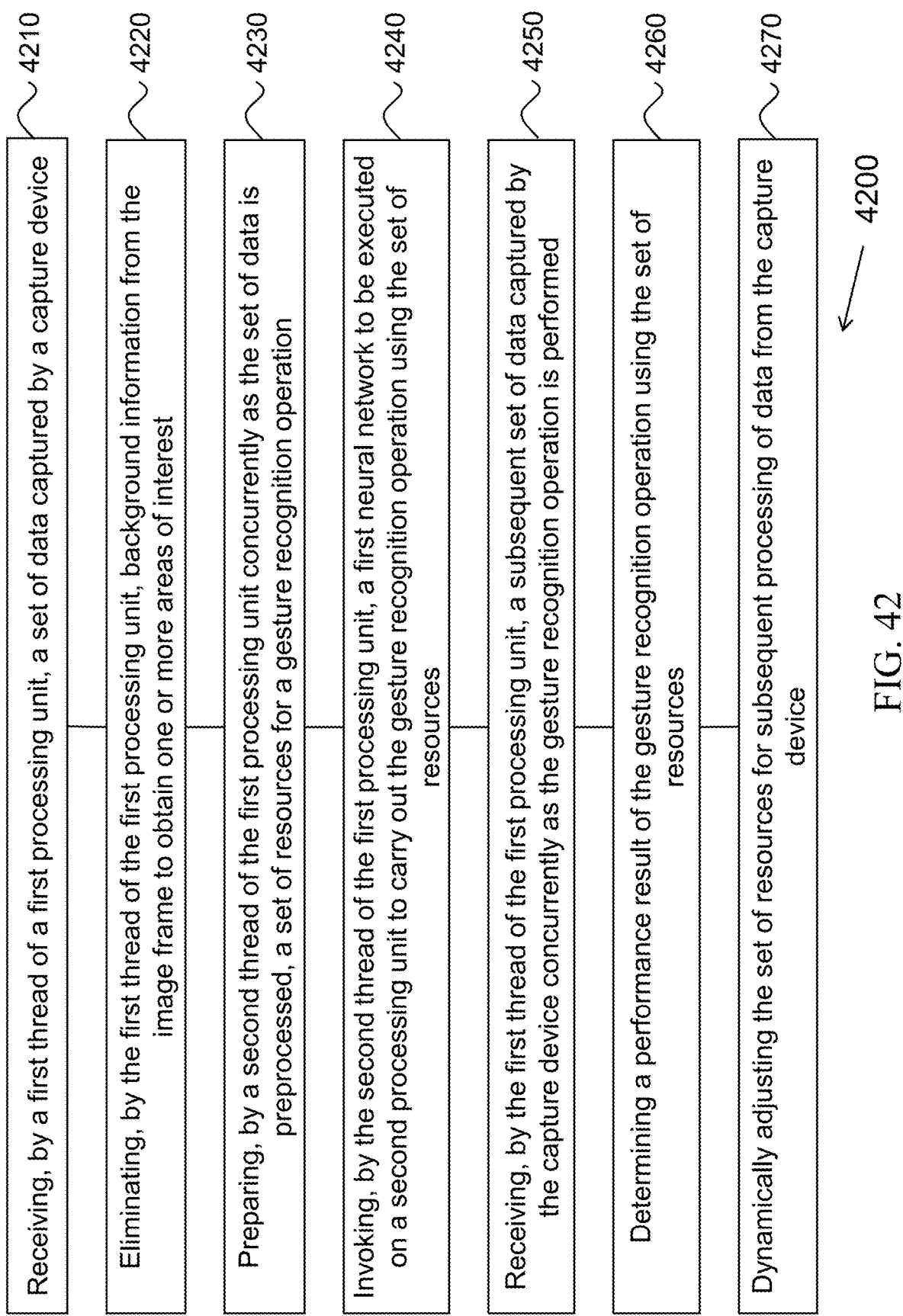
FIG. 42 is a flowchart representation of a method for improving computational efficiency of a computer system for use in a sign language translation system in accordance with an example embodiment of the disclosed technology.

FIG. 42 is a flowchart representation of a method 4200 for improving computational efficiency of a computer system for use in a sign language translation system. The method 4200 includes, at 4210, receiving, by a first thread of a first processing unit, a set of data captured by a capture device. The set of data includes an image frame that illustrates a gesture representing a letter, a word, or a phrase in a sign language. The method 4200 includes, at 4220, eliminating, by the first thread of the first processing unit, background information from the image frame to obtain one or more areas of interest. The method 4200 includes, at 4230, preparing, by a second thread of the first processing unit concurrently as the set of data is preprocessed, a set of resources for a gesture recognition operation. The gesture recognition operation may include performing segmentation on the set of data and/or matching the resulted segments with signs stored in a database. Pattern or gesture recognition typically includes processing the raw data and converting it into a form that can be consumed by a computer, a neural network or an artificial intelligence system. The recognition sometime is carried out using classification and/or cluster of patterns; in classification, an appropriate class label is assigned to a pattern based on, for example, a set of training patterns; clustering typically generates a partition of the data that can be more directly examined to make a decision.

Referring to FIG. 42, the method 4200 includes, at 4240, invoking, by the second thread of the first processing unit, a first neural network to be executed on a second processing unit to carry out the gesture recognition operation on the one or more areas of interest using the set of resources. The method 4200 includes, at 4250, receiving, by the first thread of the first processing unit, a subsequent set of data captured by the capture device concurrently as the gesture recognition operation is being performed. The method 4200 includes, at 4260, determining a performance result of the gesture recognition operation. The method 4200 also includes, at 4270, dynamically adjusting the set of resources for subsequent processing of data from the capture device to improve the performance result.

Figure 43:
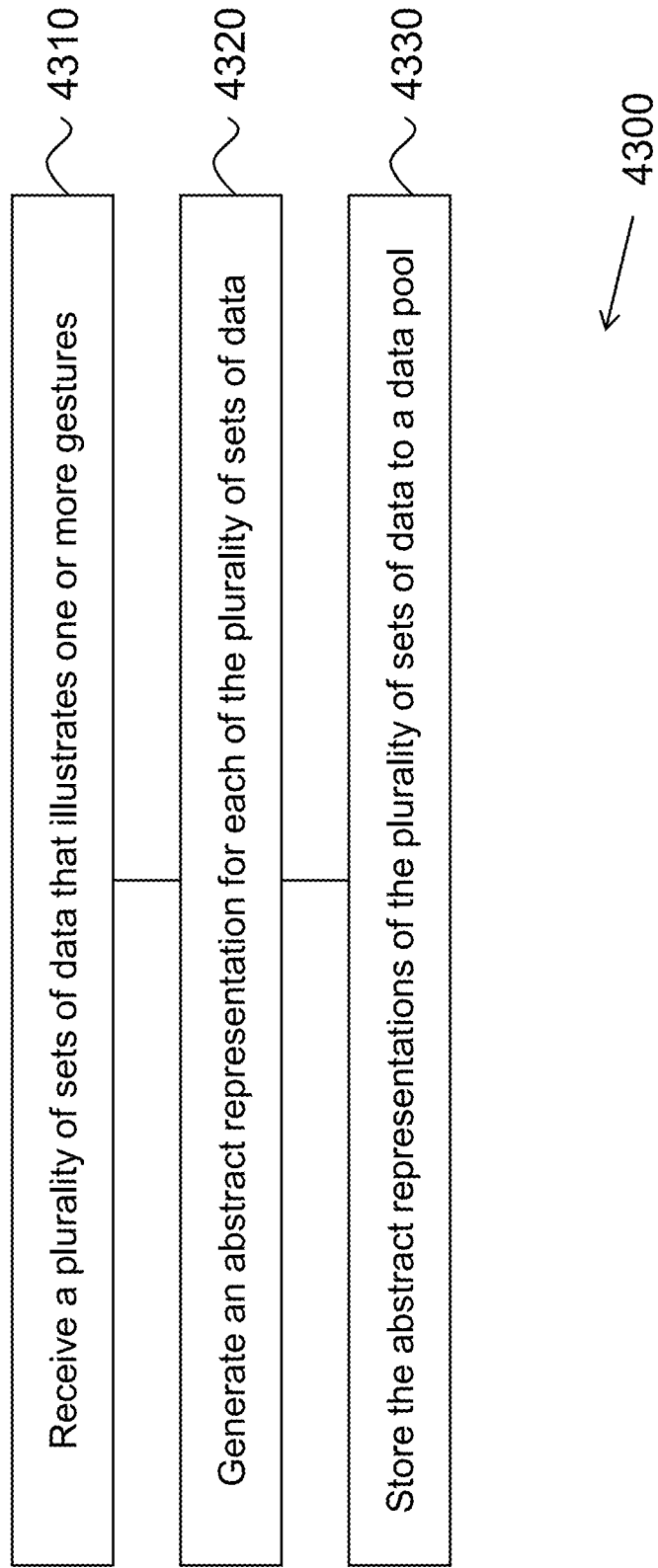
FIG. 43 is a flowchart representation of a method of managing and transporting data for a sign language translation system in accordance with an example embodiment of the disclosed technology.

FIG. 43 is a flowchart representation of a method 4300 of managing and transporting data for a sign language translation system in accordance with the disclosed technology. The method 4300 includes, at 4310, receiving a plurality of sets of data acquired by one or more data acquisition devices or data capture devices. Each set of data includes an image frame that illustrate at least a part of a gesture. The gesture represents a letter, a word, or a phrase in a sign language. The method 4300 includes, at 4320, generating an abstract representation for each of the plurality of sets of data. The abstract representation comprises a timestamp that indicates when a corresponding set of data is captured, a storage type that indicates where the corresponding set of data is stored, and a reference value that indicates an address value for storing the corresponding set of data. The method 4300 includes, at 4330, storing the abstract representations of the plurality of sets of data to a data pool to facilitate subsequent processing of the plurality of sets of data including the image frames.

In some embodiments, the data pool is located at a device different than the one or more data acquisition devices. In some embodiments, the data pool includes a data structure to organize the abstract representations based on the timestamps.

In some embodiments, the method includes capturing the plurality of sets of data by the one or more data acquisition devices, and transmitting the plurality of sets of data to another device configured to process the plurality of sets of data.

In some embodiments, the timestamp is represented by at least one of the following formats: a millisecond, a frame number, a Society of Motion Picture and Television Engineers (SMPTE) timecode. In some embodiments, the reference type includes one of the following: local CPU storage, local GPU storage, remote CPU storage, and remote GPU storage.

In some embodiments, the abstract representation further comprises at least one of: a width of the image frame, a height of the image frame, or a color-space format in which the image frame is stored in.

In some embodiments, the reference value is unique across all devices in the sign language translation system, the reference value indicating a physical address value at one of the devices.

Figure 44:
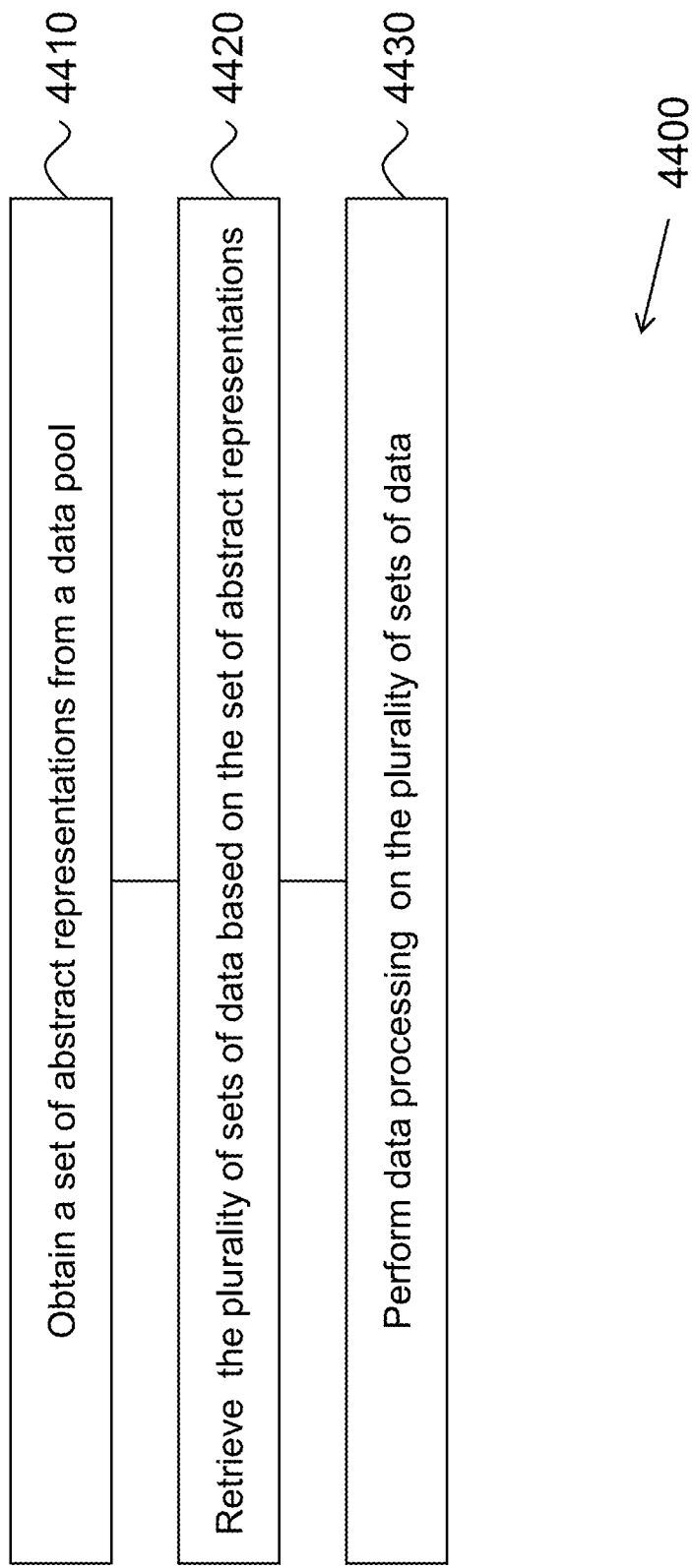
FIG. 44 is a flowchart representation of a method of managing and transporting data for a sign language translation system in accordance with an example embodiment of the disclosed technology.

FIG. 44 is a flowchart representation of a method 4400 of managing and transporting data for a sign language translation system in accordance with the disclosed technology. The method 4400 includes, at 4410, obtaining a set of abstract representations from a data pool. The set of abstract representations correspond to a plurality of sets of data acquired by one or more data acquisition devices including image frames that illustrate at least a part of a gesture. The gesture represents a letter, a word, or a phrase in a sign language. Each of the abstract representations comprises a timestamp that indicates when a corresponding set of data is captured, a reference type that indicates a type of storage for the corresponding set of data, and a reference value that indicates an address value for storing the corresponding set of data. The method 4400 includes, at 4420, retrieving the plurality of sets of data based on the set of abstract representations. The method 4400 also includes, at 4430, performing data processing on the plurality of sets of data.

In some embodiments, the data pool is located at a device different than the one or more data acquisition devices. In some embodiments, the data pool includes a data structure to organize the set of abstract representations based on the timestamps. In some embodiments, retrieving the plurality sets of data comprises transmitting the plurality of sets of data from the one or more data acquisition devices to a processing device.

In some embodiments, wherein the timestamp is represented by at least one of the following formats: a millisecond, a frame number, a Society of Motion Picture and Television Engineers (SMPTE) timecode. In some embodiments, the reference type includes one of the following: local CPU storage, local GPU storage, remote CPU storage, and remote GPU storage. In some embodiments, the abstract representation further comprises at least one of: width of the image frame, a height of the image frame, or a color-space format in which the image frame is stored in.

In some embodiments, the reference value is unique across all devices in the sign language translation system, the reference value indicating a physical address value at one of the devices.

Figure 45:
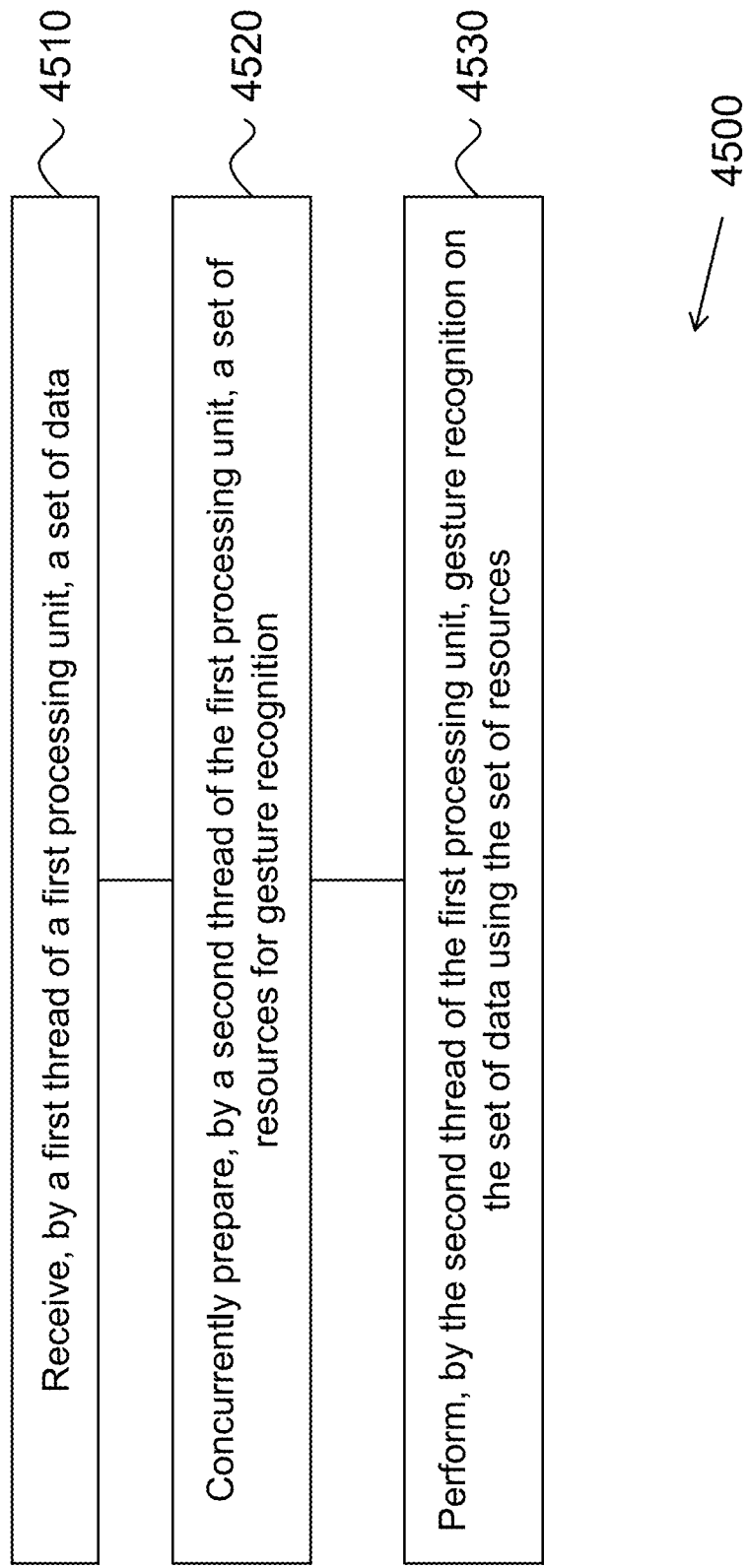
FIG. 45 is a flowchart representation of a method for translating a sign language in accordance with an example embodiment of the disclosed technology.

FIG. 45 is a flowchart representation of a method 4500 for translating a sign language in accordance with an example embodiment of the disclosed technology. The method 4500 includes, at 4510, receiving, by a first thread of a first processing unit, a set of data obtained by a capture device. The set of data includes an image frame that illustrates a gesture representing a letter, a word, or a phrase in a sign language. The method 4500 includes, at 4520, preparing, concurrently as the first thread obtains the set of data, a set of resources for a gesture recognition operation by a second thread of the first processing unit. The method 4500 also includes, at 4530, performing, by the second thread of the first processing unit, the gesture recognition operation based on the set of data using the set of resources.

It is thus evident that the techniques described in this document can be implemented in various embodiments to reduce performance cost in data transfers and conversion in heterogenous systems in order to enhance the performance of pattern and/or gesture recognition systems. The disclosed techniques can also be utilized to optimize workload distributions among different processing units and cores, thereby allowing pattern and/or gesture recognition systems to achieve real-time performance even though processing a large amount of image data is required.

In one example aspect, an apparatus in a sign language processing system includes a plurality of processing units, a non-transitory memory including instructions stored thereupon, and a shared memory accessible to the plurality of processing units. The instructions upon execution by a first processing unit of the plurality processing units cause the first processing unit to receive multiple sets of data acquired by one or more data acquisition devices. Each set of data including an image frame that illustrates at least a part of a gesture, wherein the gesture represents a letter, a word, or a phrase in a sign language. The instructions also cause the first processing unit to determine, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The instructions upon execution by a second processing unit of the plurality of processing units cause the second processing unit to access the multiple sets of data in the shared memory using the location indicated by the first attribute without copying the multiple sets of data to any other memory location.

In some embodiments, the customized template includes a third attribute of a storage type corresponding to the set of data, the storage type including one of: local CPU storage, local GPU storage, remote CPU storage, or remote GPU storage. In some embodiments, the first attribute includes an address value for storing the corresponding set of data. In some embodiments, the second attribute is represented by at least one of: a millisecond, a frame number, or a Society of Motion Picture and Television Engineers (SMPTE) timecode. In some embodiments, the customized template further comprises at least one of: a width of the image frame, a height of the image frame, or a color-space format in which the image frame is stored.

In some embodiments, the instructions upon execution by the first processing unit cause the first processing unit to store the customized templates of the plurality of sets of data to a data pool for facilitating subsequent processing of the plurality of sets of data including the image frames. In some embodiments, the data pool includes a data structure to organize the customized templates based on timestamps, each timestamp indicating when a corresponding set of data is captured.

In another example aspect, a method of managing data for a sign language translation system includes receiving multiple sets of data acquired by one or more data acquisition devices. Each set of data including an image frame that illustrates at least a part of a gesture, wherein the gesture represents a letter, a word, or a phrase in a sign language. The method includes determining, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The method includes accessing the multiple sets of data, by a plurality of processing units, based on the location indicated by the first attribute for recognizing the at least a part of a gesture. The location allows at least one of the plurality of processing units to access the multiple sets of data in the shared memory without copying the multiple sets of data to any other memory location.

In some embodiments, the customized template includes a third attribute of a storage type corresponding to the set of data, the storage type including one of: local CPU storage, local GPU storage, remote CPU storage, or remote GPU storage. In some embodiments, the first attribute includes an address value for storing the corresponding set of data. In some embodiments, the second attribute is represented by at least one of: a millisecond, a frame number, or a Society of Motion Picture and Television Engineers (SMPTE) timecode. In some embodiments, the customized template further comprises at least one of: a width of the image frame, a height of the image frame, or a color-space format in which the image frame is stored.

In some embodiments, the method includes storing the customized templates of the plurality of sets of data to a data pool for facilitating subsequent processing of the plurality of sets of data including the image frames. In some embodiments, the data pool includes a data structure to organize the customized templates based on timestamps, each timestamp indicating when a corresponding set of data is captured.

In another example aspect, an apparatus in a sign language processing system includes a first processing unit and a second processing unit, and a memory including instructions stored thereupon. The instructions upon execution by the first processing unit cause the first processing unit to receive, by a first thread of a first processing unit, a set of data captured by a capture device, the set of data including an image frame that illustrates a gesture representing a letter, a word, or a phrase in a sign language. The instructions cause the first processing unit to eliminate, by the first thread of the first processing unit, background information in the image frame to obtain one or more areas of interest; prepare, by a second thread of the first processing unit concurrently as the set of data is preprocessed, a set of resources for a gesture recognition operation; invoke, by the second thread of the first processing unit, a first neural network to be executed on a second processing unit to carry out the gesture recognition operation on the one or more areas of interest using the set of resources; and receive, by the first thread of the first processing unit, a subsequent set of data captured by the capture device concurrently as the gesture recognition operation is performed. The instructions upon execution by the first or the second processing unit cause the first or the second process unit to determine a performance result of the gesture recognition operation, and dynamically adjust the set of resources for subsequent processing of data from the capture device to improve the performance result.

In some embodiments, the instructions upon execution by the second processing unit cause the second processing unit to dynamically adjust the set of resources using a second neural network by performing a machine learning procedure based on the performance result. In some embodiments, the performance result includes a utilization rate of the first or the second processing unit.

In some embodiments, the apparatus includes a third processing unit. The instructions upon execution by the first processing unit cause the first processing unit to receive, by a fourth thread of the first processing unit, a second set of data obtained from a second capture device. The second set of data includes a second image frame that illustrate the gesture. The instructions also cause the first processing unit to eliminate, by the fourth thread of the first processing unit, background information in the second image frame to obtain one or more areas of interest in the second image frame; prepare, by a fifth thread of the first processing unit concurrently as the second set of data is preprocessed, a second set of resources for the gesture recognition operation; invoke, by the fifth thread of the first processing unit, a third neural network to be executed on the third processing unit to carry out the gesture recognition operation on the one or more areas of interest in the second image frame using the second set of resources; and receive, by the fourth thread of the first processing unit, a subsequent set of data captured by the second capture device concurrently as the gesture recognition operation is being performed. In some embodiments, the second processing unit is same as the third processing unit.

In another example aspect, a method for improving computational efficiency of a computer system for use in a sign language translation system includes receiving, by a first thread of a first processing unit, a set of data captured by a capture device, the set of data including an image frame that illustrates a gesture representing a letter, a word, or a phrase in a sign language. The method includes eliminating, by the first thread of the first processing unit, background information from the image frame to obtain one or more areas of interest. The method includes preparing, by a second thread of the first processing unit concurrently as the set of data is preprocessed, a set of resources for a gesture recognition operation. The method includes invoking, by the second thread of the first processing unit, a first neural network to be executed on a second processing unit to carry out the gesture recognition operation on the one or more areas of interest using the set of resources. The method includes receiving, by the first thread of the first processing unit, a subsequent set of data captured by the capture device concurrently as the gesture recognition operation is being performed. The method includes determining a performance result of the gesture recognition operation. The method also includes dynamically adjusting the set of resources for subsequent processing of data from the capture device to improve the performance result.

In some embodiments, the set of resources is dynamically adjusted by a second neural network performing a machine learning procedure based on the performance result. In some embodiments, the performance result includes a utilization rate of the computer system.

In some embodiments, the method includes receiving, by a fourth thread of the first processing unit, a second set of data obtained from a second capture device, the second set of data including a second image frame that illustrate the gesture. The method includes eliminating, by the fourth thread of the first processing unit, background information in the second image frame to obtain one or more areas of interest in the second image frame. The method includes preparing, by a fifth thread of the first processing unit concurrently as the fourth thread obtains the second set of data, a second set of resources for the gesture recognition operation. The method includes invoking, by the fifth thread of the first processing unit, a third neural network to be executed on a third processing unit to carry out the gesture recognition operation on the one or more areas of interest in the second image frame using the second set of resources. The method also includes receiving, by the fourth thread of the first processing unit, a subsequent set of data captured by the second capture device concurrently as the gesture recognition operation is being performed. In some embodiments, the second processing unit is same as the third processing unit.

In yet another example aspect, an apparatus of a pattern recognition system a first processing unit and a second processing unit, a shared memory accessible to at least the second processing unit, and a non-transitory memory including instructions stored thereupon. The instructions upon execution by the first processing unit cause the first processing unit to receive, by a first thread of the first processing unit, a set of data captured by a capture device, and determine, by a second thread of the first processing unit, a plurality of attribute values defined by a customized template. The customized template uniformly defines a plurality of attributes for all sets of data captured by the one or more data acquisition devices including a first attribute that indicates a location of the shared memory for storage of the set of data and a second attribute that indicates when the corresponding gesture is captured. The instructions upon execution by the second processing unit cause the second processing unit to execute a first neural network to carry out a recognition operation using a set of resources. The instructions upon execution by the first or the second processing unit cause the first processing unit or the second processing unit to dynamically adjust the set of resources for subsequent processing of data from the capture device to improve a system unitization rate.

In some embodiments, the apparatus includes a third processing unit. The instructions upon execution by the third processing unit cause the third processing unit to access the set of data in the shared memory using the location indicated by the first attribute without copying the set of data to any other memory location.

5. Examples of Neural Network Architectures

Using neural networks for gesture and action identification is an actively growing area of research, with the recognition accuracy increasing with the recent developments in neural network architectures and training methods. Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems. One specific application of using neural networks for gesture and action identification is sign language communication and translation.

In some embodiments, the example configurations in FIGS. 1-13 can include implementations of neural networks that can capture the complexities and nuances associated with pattern recognition of object movements, including gestures in a sign language that can facilitate its communication and translation.

A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs.

CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data. The presently disclosed technology extends the typical CNN (which is two-dimensional) to three-dimensions, thereby enabling the CNN to operate on actions or motions, instead of just images.

In other words, the 3D CNN has temporal data in its $3^{rd}$ dimension as compared to a 2D CNN that only has spatial data. This means the model has sets of images that belong to a single sequence of related events instead of only having single frames that match an object with spatial only data.

Figure 46:
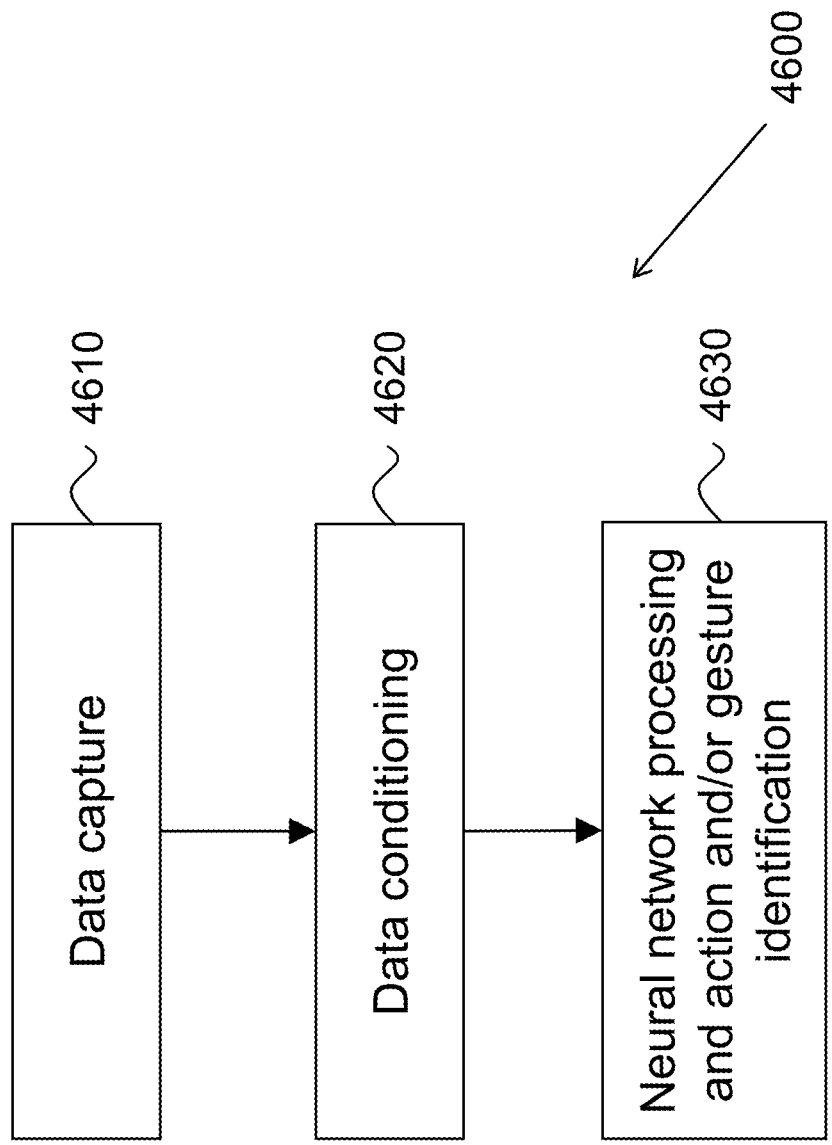
FIG. 46 is a simplified block diagram illustrating an exemplary method for neural network processing with data compression.

FIG. 46 is a block diagram that illustrates an exemplary method for neural network processing with reduced data that includes capturing data 4610, such as a sign language gesture or other movements of objects, conditioning the data 4620 and processing and action/gesture identification 4630 that is carried out using a neural network. In some embodiments, the data capture 4610 is carried out using one or more cameras and/or sensors that capture movements associated with an action or gesture performed by a user. For example, a data capture module may include multiple cameras that capture the sign language movement from different angles and/or in different portions (or bands) of the frequency spectrum (e.g., visible light, infra-red). It may further include audio or haptic sensors to capture the nuances of the sign language movements.

The data capture module communicates the captured action or gesture to the data conditioning module. While certain signal conditioning and processing can occur at the data capture module, the data conditioning module can perform operations that include eliminating information that may not be relevant to the subsequent detection of the action or gesture. This reduced set of information is then passed to the neural network framework to further process the data and identify or recognize the action and/or gesture based on data that was used to train the neural network.

As discussed earlier, a neural network operates more efficiently if it is trained on only the relevant features and is subsequently used to detect those relevant features. For example, if a neural network was used to identify pets in images, any buildings or vehicles in the image could be removed without affecting the detection accuracy. Similarly, in the case of detecting and identifying actions and gestures, the images may be preprocessed to eliminate any information that is not relevant to the particular actions or gestures being identified. This data conditioning, which may be implemented in the data conditioning module 4620, can reduce the amount of pixel information that is processed by the neural network, but without compromising detecting accuracy. Although in some sections of this document examples related to sign language capture and translation have been described to illustrate specific actions and/or gestures, the embodiments and method described herein are applicable to a variety of actions and/or gestures.

Figure 47A:
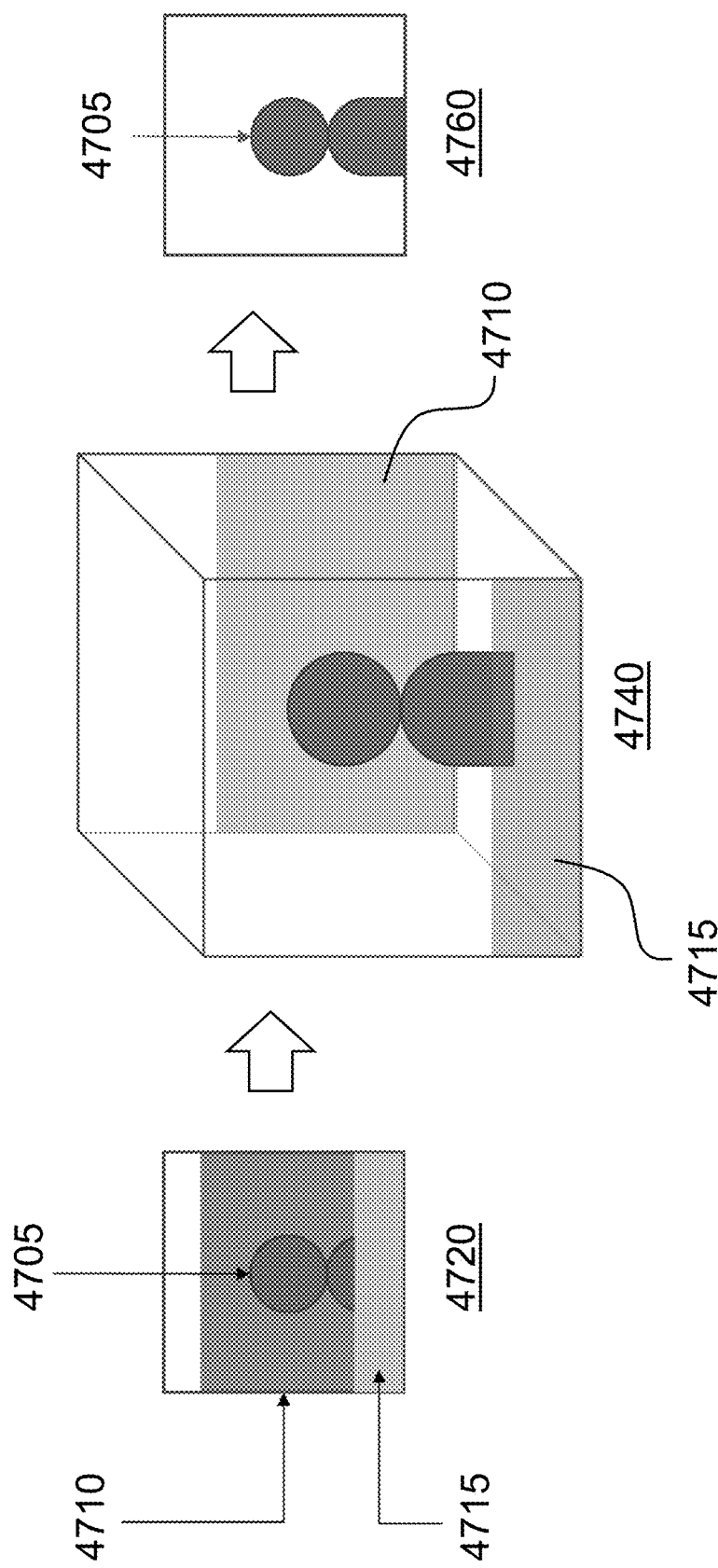
FIGS. 47A-47C illustrate different examples of filtering to reduce information prior to neural network processing.
Figure 47B:
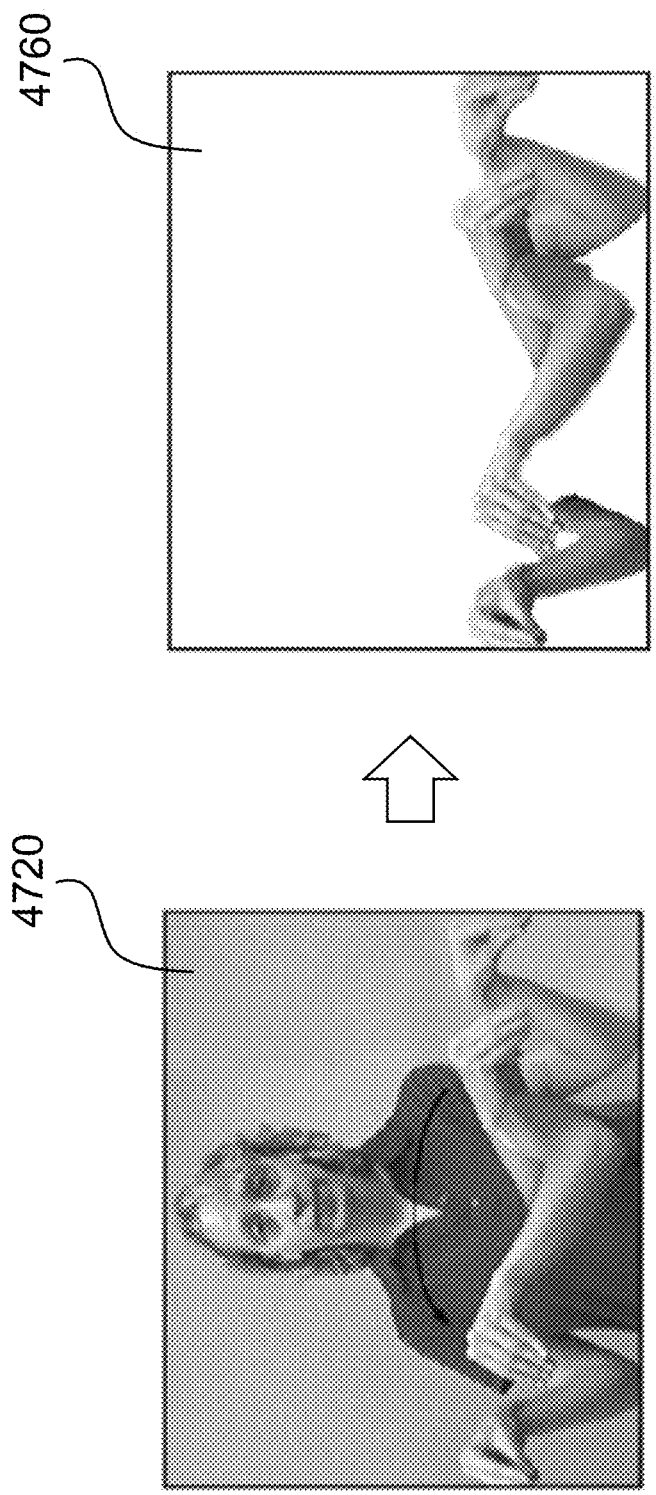
Figure 47C:
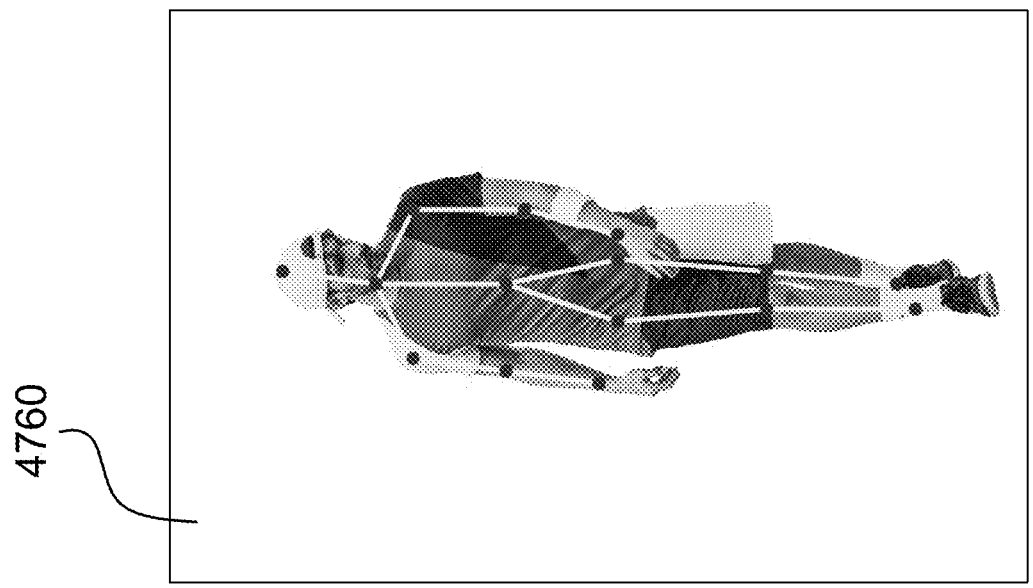
Figure 47C:
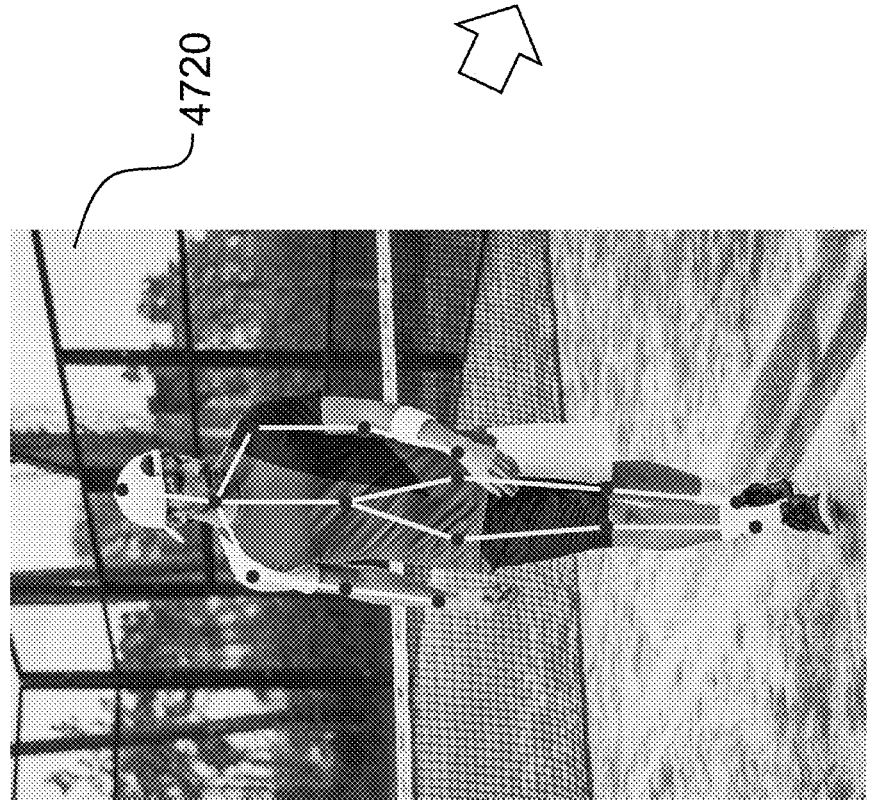

FIGS. 47A-47C illustrate different examples of filtering operations that can be carried out to reduce information prior to neural network processing. FIG. 47A illustrates an example of spatial filtering, which begins with an input frame 4720 that includes the subject 4705, a background 4710 and a foreground 4715. As illustrated in FIG. 47A, the input frame 4720 is processed to generate an intermediate frame 4740 in which the subject has been separated from the foreground 4715 and the background 4710. If the subject is signing in a studio or a benign setting (e.g., while capturing training data), the foreground and background will typically provide no (or very minimal) additional information corresponding to the sign language movement. This, in one example, results in the generation of an output frame 4760, which only contains the subject 4705.

In contrast to the example shown in FIG. 47A, the sign language movement may include external input (e.g., a person or other items that the subject is pointing to or is otherwise referencing, as well as objects, background settings, lighting conditions, sounds or other passive or active items or conditions that can be captured by the sensing devices). In this example, the input frame 4720 may be separated into the subject, foreground information, and background information. The output frame (corresponding to the output frame 4760 in FIG. 47A) may include the subject and a subset of the one or more foreground or background information, which include features that are relevant to the sign language movement. In general, the spatial processing operations are carried out on a single frame basis, but similar operations can be carried out over multiple frames to reduce or eliminate spatial data that is not needed for sign language recognition.

FIG. 47B illustrates the superposition of multiple frames as an input 4720 to the 2D temporal filtering process, which transforms the input data to output information 4760. In the example shown, the output data 4720 includes the hands of the subject, which, include the entirety of the sign language movement. In some embodiments, in which the subject's emotions were part of the information communicated by the movement, the subject's face (not shown in FIG. 47B) is also present in the output. As seen in FIG. 47B, the background and other parts of the frames have been removed, so as to reduce the data that is input to the neural network, thereby lowering the complexity and improving the efficiency of the neural network processing.

FIG. 47C shows an example of pose detection that can be carried out as part of filtering operations. As shown in FIG. 47C, an input frame 4720 includes a subject with a background and has been processed using a pose detection algorithm that superimposes a skeleton on the subject. A subsequent step uses the skeleton to eliminate the background information that is not relevant for generating the output frame 4760. In some embodiments, if the subject is referencing an external object, the pose detection algorithm can recognize that the skeleton of the subject is, for example, pointing to an object, and can include the external object in the output frame for processing by the neural network.

In some embodiments, the skeleton can be tagged with different parts of the human body (e.g., head, chest, right arm, right shoulder, etc.), and elements that are not part of the sign language movement may be removed. This is an example of spatially locked de-selection, which advantageously enables a boost in performance and accuracy of the neural network operations since less pixel information and polygons are processed, but the correct aspect and spatial characteristics are preserved by implementation of the presently disclosed technology.

Figure 48:
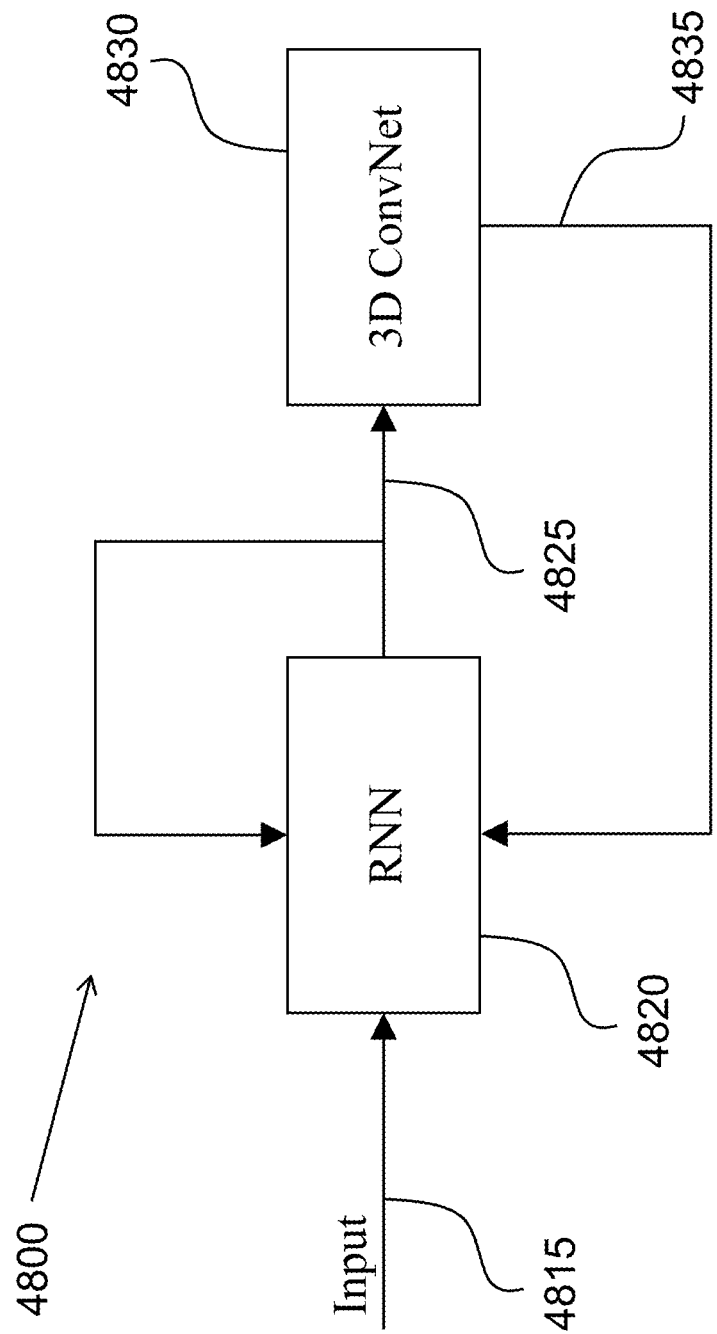
FIG. 48 is a block diagram illustrating the interaction between the neural network processing components of an example sign language translation system.

FIG. 48 shows the interaction between the neural network processing components of an example sign language translation system in accordance with some embodiments of the disclosed technology. In FIG. 48, the 3D ConvNet 4830 is able to track a sign language movement across time, and the RNN 4820 is able to persist the 3D ConvNet results across multiple frames to advantageously enable accurate identification of sign language movements. The RNN 4820 receives an input 4815 (e.g. one or more frames of a sign language movement) and processes it to generate an output 4825. This output 4825 is fed back to the RNN 4820, as well as sent to the ConvNet 4830. The ConvNet 4830 processes the RNN output 4825 and generates its own output 4835, which is transmitted back to the RNN 4820, and used with subsequent frames to recognize the sign language movement.

A hybrid combination of neural network processing, which utilizes a combination of RNN and a 2D CNN, represents less than 1% of neural networks that are currently being used across a myriad of applications, which is dominated by reinforcement learning networks (25%), standalone RNNs (25%-50%), and standalone CNNs (25%-50%). In contrast to the common neural network frameworks used in existing systems, some embodiments of the presently disclosed technology use an RNN to control a 3D-CNN to accurately detect sign language movements. That is, motion or action recognition is achieved using the described specific configuration of component neural networks to advantageously enable the identification of temporal information. Since the RNN is able to persist data across the multiple frames, it is able to identify the sign language movement, determine when the movement (or gesture) has been completed, and can reset for a new gesture given an input stream of multiple frames.

In an example of the runtime operation of the configuration illustrated in FIG. 48, multiple frames corresponding to a single sign language movement (that include both spatial and temporal information) are input to the RNN 4820. The RNN 4820 processes a first frame to generate an output 4825, and passes the first frame to the 3D ConvNet 4830, which can identify whether the frame includes a specific structure (e.g., hand configuration, pose, etc.) that is associated with the sign language movement. Based on its training, the 3D ConvNet 4830 can identify the specific structure, and further determine whether the structure belongs to a sign language movement. The output of the CNN is fed back to the RNN, which uses the 3D ConvNet output 4835, as well as its own output 4825 in a second iteration that now processes a second frame of the multiple frames.

The example configuration that is illustrated in FIG. 48, provides significant improvements over the existing systems that use 2D CNNs to conduct image recognition of a static image. In addition to the use of a 3D CNN, recognition of the hand gestures is improved through the use of a controller RNN. As noted earlier, sign language is a complex form of communication that includes the user's emotions and body language, as well as the user's hand gestures. Implementations of the presently disclosed technology are able to leverage this additional information related to emotions and body language to provide more accurate identification of the SL movements. Each additional source of information (e.g., an emotion detection module, a pose detection module, etc.) is termed a collaborator.

Figure 49A:
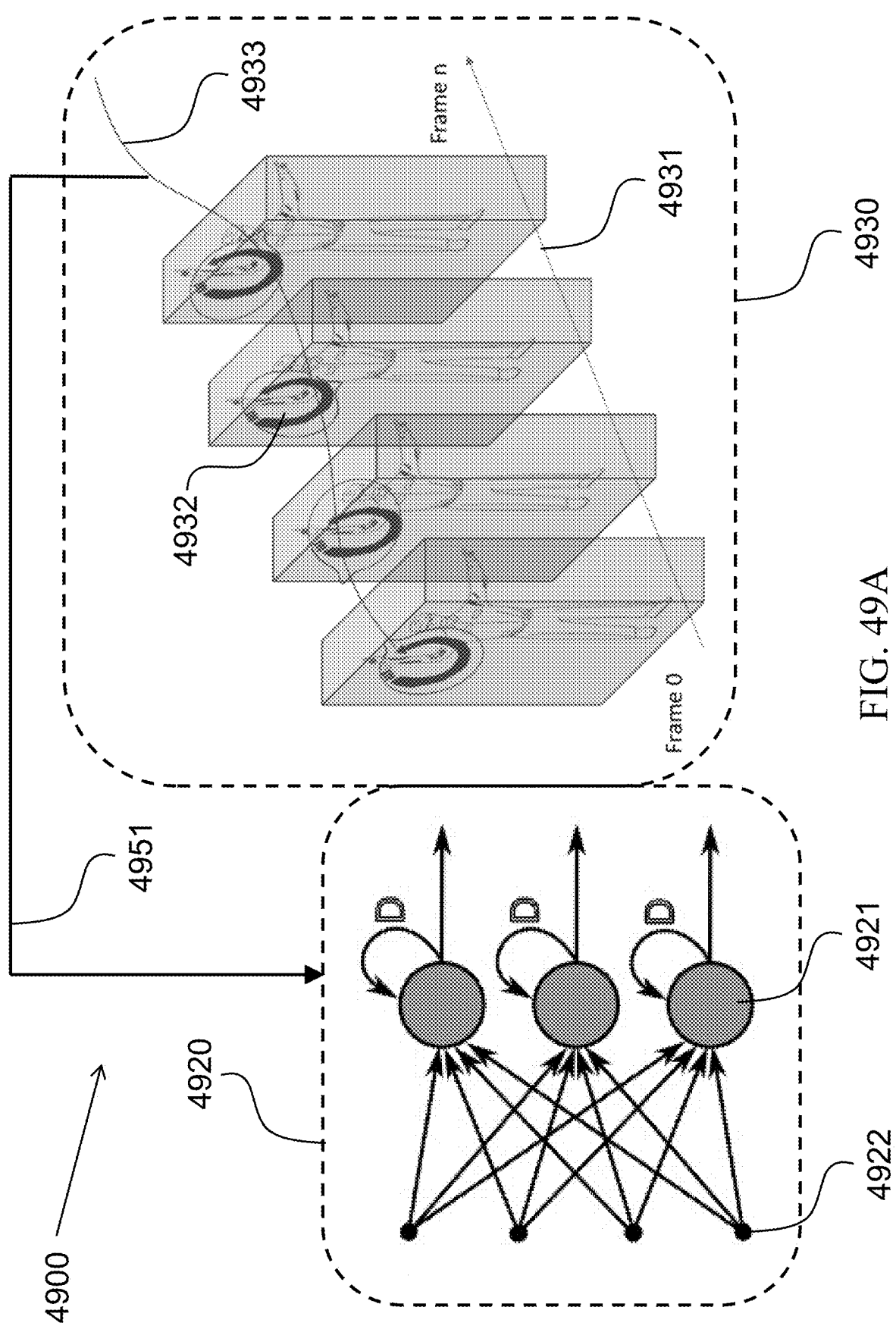
FIGS. 49A and 49B illustrate a recurrent neural network (RNN) arbitrating message routing and response processing to and from a 3D convolutional neural network (CNN).

FIG. 49A shows an example of a system 4900 with two components that may be used for sign language translation based on neural network processing. As illustrated in FIG. 49A, the sign language translation system 4900 includes a recurrent neural network (RNN) 4920 and a 3D convolutional neural network (CNN or ConvNet) 4930.

As illustrated in FIG. 49A, the CNN 4930 can process multiple sequential frames 4931 (denoted Frame 0 through Frame n), and can track an action or motion 4932 that is evolving over time 4933. In an example, each of the set of frames 4931 includes a set of (R,G,B) values for each (x,y) pixel location. Each frame additionally includes a timestamp that establishes a 3D set of information that can be used by the 3D CNN to detect the motion or action corresponding to a movement in the sign language.

In some embodiments, each of the set of frames 4931 may be a composite of multiple frames taken from different cameras and/or angles. For example, an infra-red (IR) camera can be used in conjunction with one or more regular (or depth-enabled) cameras, and frames from each of the cameras with the same timestamp can be combined prior to processing by the RNN/CNN framework. In other embodiments, each of the set of frames 4931 can include multiple subframes with the same timestamp. In this example, the 3D CNN may be augmented to incorporate the addition complexity of another dimension.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory.

For example, sequential information is preserved in the recurrent network's hidden state, which manages to span many time steps as it cascades forward to affect the processing of each new example; it finds correlations between events separated by many moments. These correlations are called "long-term dependencies" because an event downstream in time depends upon, and is a function of, one or more events that came before. As illustrated in FIG. 49A, the RNN 4920 has a plurality of output nodes (e.g., 4921); each output node produces an output "D" which is sent to the 3D-CNN, and is also sent back into the RNN (e.g., its feedback loop). The RNN additionally includes hidden nodes (e.g., 4922) that are able to process both new and feedback information in order to persist features that the RNN has been trained to recognize and/or identify.

Each of these neural networks can operate in two modes: training mode and interpretation (or execution) mode. In training mode, the neural network receives known inputs and associated meanings and other information. In interpretation mode, the neural network attempts to identify and interpret the inputs data that is collected by the disclosed interactive sign language system. The modes of operation can be selectively enabled or disabled to allow the system to be configured for one or the other mode of operation.

The output 4951 of the 3D CNN 4930 returns to the arbitrating RNN 4920 for temporal persistence. In other words, the 3rd dimension of the 3D CNN is configured to track the temporal dimension for grouping the sequence of frames of a sign language gesture. The 3D CNN typically receives an image and identifies which gesture it belongs to, but does so on a frame-by-frame basis. Thus, the output of the CNN, as well as the RNN's feedback loop, is used to persist the recognition of the sign language gesture.

In the example configuration that is shown in FIG. 49A, the RNN is responsible for the incremental progress of recognition of sequences within these groups of sequences being held in the 3D CNN. To this end, the 3D CNN uses its 3rd dimension to track sets of frames for activities that happen across time that need to be recognized, and the RNN uses its feedback loop to persist the incremental progress of the recognition of frames where the frames are tied to specific activities. The operations are further described using an example scenario that follows.

Figure 49B:
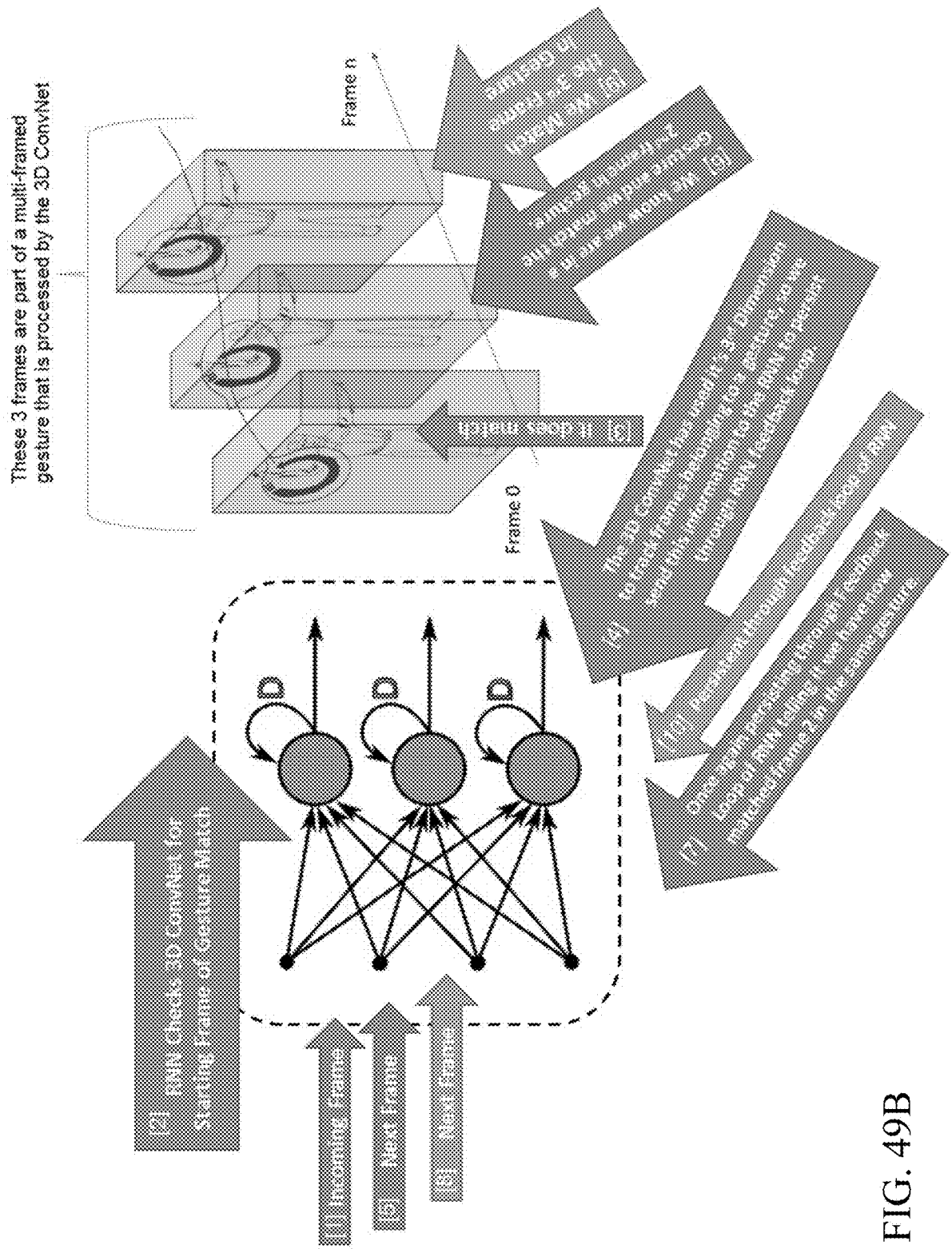

FIG. 49B shows an example method for processing three frames corresponding to a sign language gesture using the integrated RNN and 3D CNN neural network architecture of FIG. 49A. This example includes some features and/or components that are similar to those illustrated in FIGS. 48 and 49A, and described above. At least some of these features and/or components may not be separately described in this section. The process in FIG. 49B is described as a sequence of operations (numbered 1 through 9) by the way of example, and not by limitation, to facilitate the understanding of the disclosed technology.

As illustrated in FIG. 49B, three frames (denoted with large arrows [1], [5] and [8], and representing an initial frame, an intermediate frame and a final frame, respectively) are processed by the integrated RNN and 3D CNN architecture, where the 3D CNN recognizes activities based on the input frames, and the RNN persists the incremental progress of the recognition of frames. At operation [1], a first frame is received by the RNN, which passes the frame to the 3D CNN. At operation [2], the RNN checks whether the 3D CNN has recognized the initial frame as being a starting frame of a sign language gesture that the system has been trained to recognize. In some instances, and as will be described below in the context of FIGS. 51 and 52, the RNN may check for and combine results from other detection algorithms with those from the 3D CNN.

In operation [3], the 3D CNN matches the initial frame to the starting frame of a sign language gesture. As indicated in FIG. 49B, the three frames illustrated are part of a multi-framed gesture that can be processed and identified by the 3D ConvNet. In operation [4], since the 3D CNN has used its 3rd dimension to track the gesture that the initial frame belongs to, the output of the 3D CNN (including which candidate gesture, or gestures, that may have the initial frame as their starting frame) is passed back to the RNN to persist through the RNN feedback loop.

In operation [5], the RNN receives an intermediate frame, and passes it to the 3D CNN. In operation [6], the 3D CNN recognizes the intermediate frame as the second frame of the gesture that was identified in operation [3]. The indication of the recognition is fed back to the RNN in operation [7], so that the RNN may persist the knowledge of having recognized the 2nd frame in the same gesture.

Although the example illustrated in FIG. 49B includes three frames (an initial frame, an intermediate and a final frame), the method and processing described in the context of FIG. 3B may be extended to any number of intermediate frames. In an example, any number of intermediate frames may be received by the RNN, sent to the 3D CNN for recognition as a subsequent frame of the gesture identified in operation [3], where the 3DCNN's output is then sent back to the RNN for persistence.

In operation [8], a third frame is received by the RNN and forwarded to the 3D CNN, which recognizes it as a third frame in the gesture in operation [9]. As described above for subsequent frames of the sign language gesture, the RNN persists the output of the 3D CNN in operation [10]. This may continue till the final frame of the sign language gesture is received and recognized by the 3D CNN. The RNN may confirm the identification of the sign language gesture based on the 3D CNN since it has persisted the outputs through the process.

Figure 50:
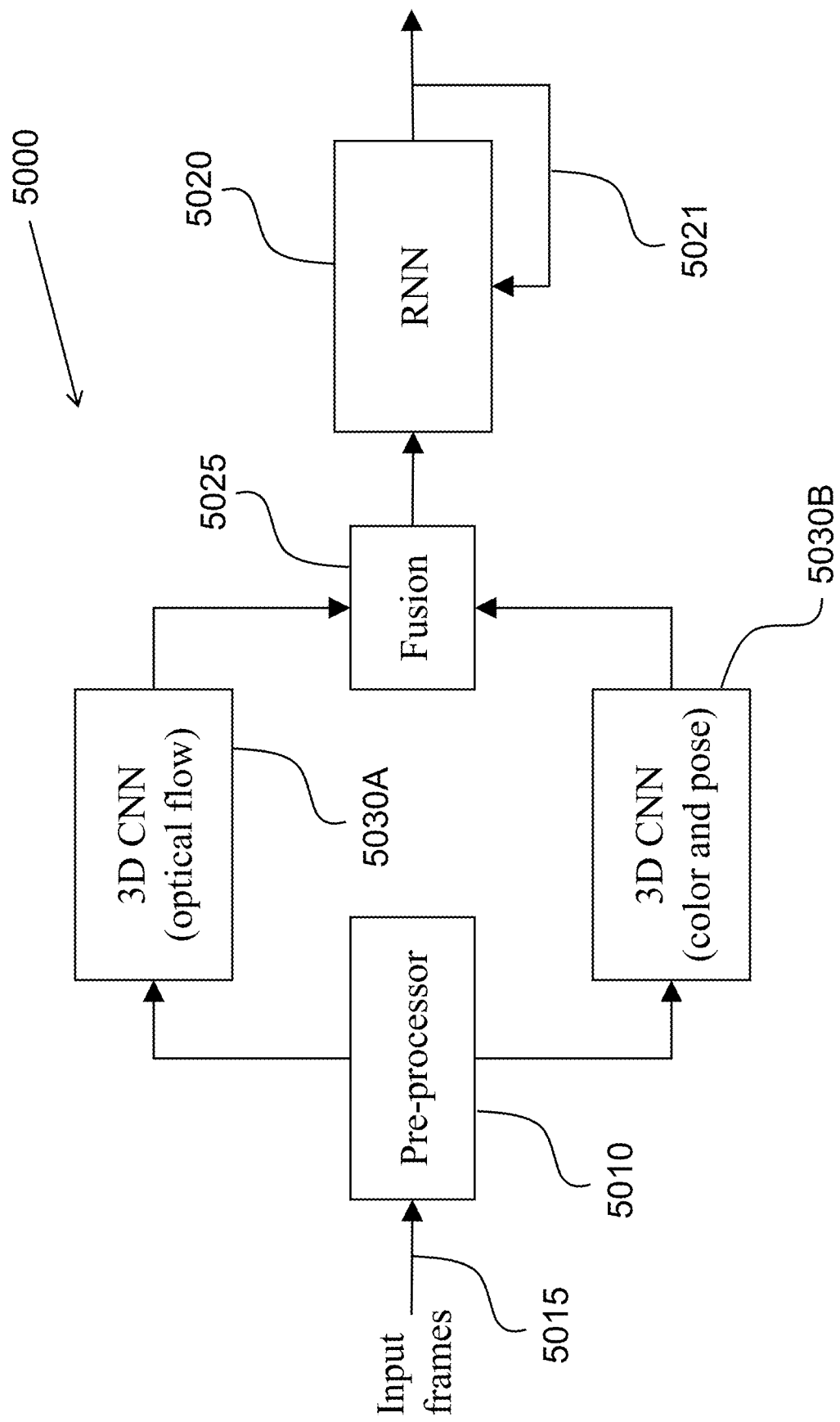
FIG. 50 is an example block diagram illustrating the interaction between the neural network processing components of another exemplary sign language translation system.

FIG. 50 shows the interaction between the neural network processing components of another example sign language translation system in accordance with some examplary embodiments. The input frames 5015 in FIG. 50 may be captured from a web-cam or another sensor (e.g., a depth-field camera or RGB camera with multiple apertures, an audio sensor, etc.) In some embodiments, more recent input frames may be captured concurrently with the processing of previously captured input frames. The input frames are first processed by a pre-processor 5010, which may be configured to implement pose estimation algorithms (e.g., using OpenPose in OpenCV or MultiPoseNet) that estimate a pose in each of the input frames, therein identifying the body, face and fingers of the subject.

Pose estimation is a general problem in computer vision wherein the position and orientation of an object are detected. Typically, this results in keypoint locations that describe the objects (referred to as the "pose") being detected, thereby resulting in a "skeleton" that was previously shown in FIG. 47C (wherein the information in a frame is reduced by generating an overlaid pose estimate). In some embodiments, the keypoint locations (and the skeleton) are detected in each of the input frames 5015. In some embodiments, differently colored pixels may be used when estimating the pose for each of the fingers to capture the nuances of sign language gestures. For example, one sign language gesture may be distinguished from another sign language gesture based on whether the index finger is above or below the middle finger, and using differently colored pixels for each finger enables exactly this type of differentiation. In some embodiments, the pose estimation may capture 3D data instead of just 2D data, thereby providing a greater number of features for the recognition process.

The pose estimation algorithms generate pixels corresponding to the pose of the subject, and the pre-processor overlays the pose estimation pixels onto the color (e.g., RGB or CMYK) pixels using a transparent layer. The original images with the pose estimation overlays are output as processed images by the pre-processor 5010.

As illustrated in FIG. 50, the images with the pose estimation overlays are concurrently processed by a first 3D CNN 5030A, which extracts the motion information in each frame (and across the frames) using precise optical flow algorithms, and a second 3D CNN 5030B, which extracts color, pose and spatial information from the processed frames.

Optical flow refers to a class of algorithms that uses sequences of ordered images to enable the estimation of motion as either instantaneous image velocities or discrete image displacements. In general, optical flow methods try to calculate the motion between two image frames which are taken at times t and t+Δt at every voxel (a "volume pixel" or a pixel in a three-dimensional space) position. These methods are called differential since they are based on local Taylor series approximations of the image signal; that is, they use partial derivatives with respect to the spatial and temporal coordinates.

Precise optical flow algorithms are refinements of standard optical flow methods, and include modifications of the image pixels using sharpening, line, edge, corner and shape enhancements. This results in a finely detailed version of optical flow, where motions of smaller objects (e.g., fingers and hands) are recognized and can be used for recognition of the sign language gesture communicated by the subject.

The fusion module 5025 combines the output layers of each of the 3D CNNs (1530A and 5030B), allowing their data (e.g., convolution, propagation and weights) to be processed jointly. This results in the recognition process implemented by the 3D CNNs to be fused across both the optical flow (for motion) and color and pose domains, and more accurate recognition of the sign language gestures communicated by the subject.

The recognition results from the fusion module 5025 are sent to the RNN 5020, which uses long short-term memory (LSTM) units to track the progress of recognition across previous, current and future input frames, i.e., temporally. The RNN with LSTM units uses its own feedback loop 5021 to track state across more than a single round of recognition.

It should be noted that the architecture illustrated in FIG. 48 represents a stateless neural network that requires all the input frames to be passed in at the same time to be processed in a batch format. In contrast, the architecture illustrated in FIG. 50 represents a stateful neural network that can operate with the input frames that are passed in sequentially, and processed in an incremental or online manner.

Although implementations of the presently disclosed technology have been described in the context of accurately recognizing a sign language movement, the RNN/CNN and CNN/RNN configurations illustrated in FIGS. 48 and 50, respectively, are applicable to recognition of actions or movements of an object or a user in other contexts and applications, such as object recognition for unmanned aerial vehicles (UAVs), autonomous vehicles, surveillance and security systems, target identification, and training and analysis in professional sports. In other words, the 3D CNN (fully or partially trained using the proper training images) is able to recognize any temporal action that can be captured using a series of frames, each with pixel information and a timestamp, and the RNN is able to control the 3D CNN to persist the information that relevant to the action or movement being recognized. More generally, the disclosed configurations of the 3D CNN(s) and the RNN may be used recognize any time-varying activity in three-dimensions.

Figure 51:
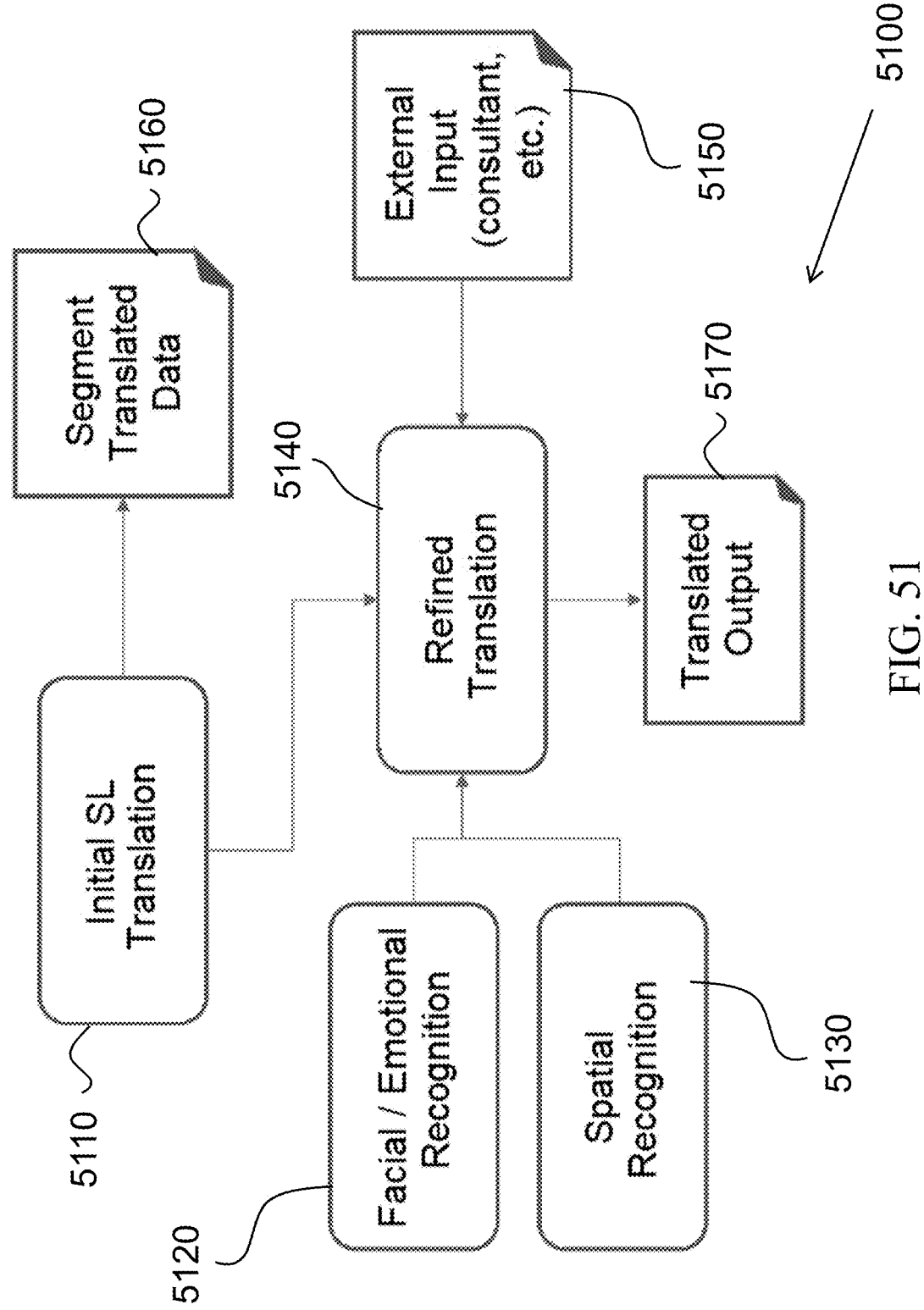
FIG. 51 is an example block diagram illustrating the integration of various collaborators in a sign language translation system.

FIG. 51 is a block diagram of an example of the integration of various collaborators in a sign language translation system. In this example, the RNN and 3D CNN may be used to generate an initial sign language translation 5110, which can be output as segment translated data 5160 and/or refined using collaborators. As illustrated in FIG. 51, the refined translation 5140 may be based on the initial sign language translation 5110, facial/emotional recognition 5120, spatial (or pose) recognition 5130 and external input 5150, and results in a translated output 5170, which is more accurate than one based on the initial sign language translation.

Facial/emotional recognition 5120, spatial (or pose) recognition 5130 and external input 5150 are examples of collaborators that can be integrated, when they exist, with the initial sign language translation 5110 to provide a refined translation 5140. In an example, the external input 5150 may include a portion of a text, an object, a person or other items that the subject is pointing to or is otherwise referencing, as well as objects, lighting conditions, background settings, sounds or other passive items or conditions that can be captured by the sensing devices.

Figure 52:
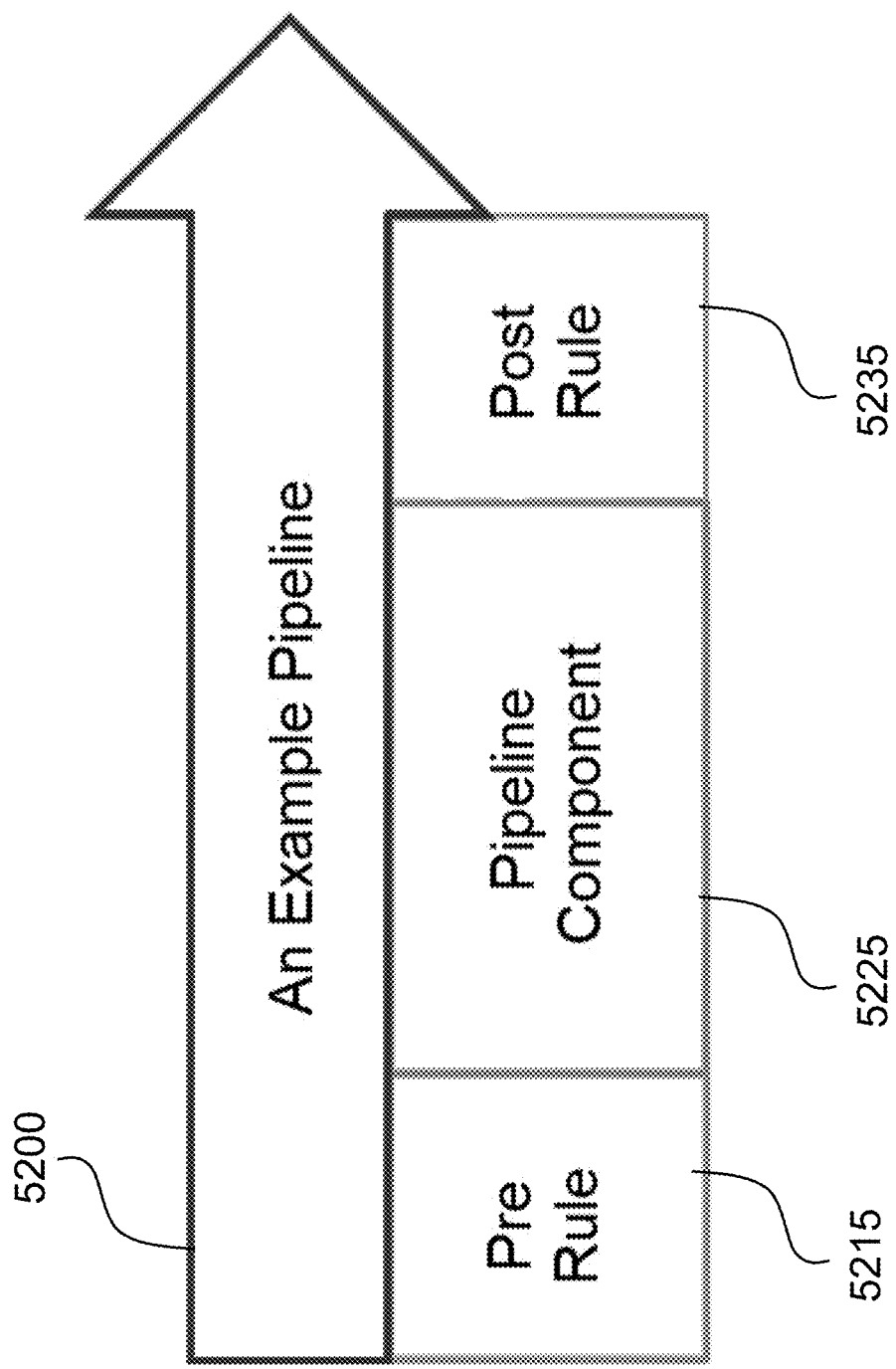
FIG. 52 is an example block diagram illustrating a pipeline that can be utilized to implement various portions of the presently disclosed technology.

The use of collaborators described in the context of FIG. 51, as well as any additional or future implementations of collaborators, necessitates the integration of the collaborator into the RNN/CNN workflow. This task, from a practical sense, can require significant changes to computer code when a collaborator is added or removed from the processing flow, making such changes expensive, time consuming, and in some cases (e.g., when the source code is not accessible) not possible. To address these issues, the disclosed embodiments further provide a pipeline structure that facilitates the integration of collaborators into the neural network processing engine. FIG. 52 illustrates an example of such a pipeline 5200, which is a configurable workflow management tool for artificial intelligence that supports the ability to easily use different combinations of artificial intelligence components at runtime with different input and output based on conditional criteria. In other words, and in the context of FIG. 51, the pipeline 5200 provides a framework to integrate a collaborator when it has additional information that can improve the accuracy of the sign language translation.

As illustrated in FIG. 52, the pipeline 5200 includes a pre-rule 5215, a pipeline component 5225 and a post-rule 5075. In the example illustrated in FIG. 52, the pre-rule 5215 and post-rule 5235 are conditional rules that can be executed before and after running the pipeline component 5225, respectively, and are constructed using AND, OR, NOT and =, !=, >, <(equal to, not equal to, greater than, smaller than) functionals. The pipeline component 5225 is the functional object which includes blocks of logic that transform an input to an output, e.g., a standalone RNN or CNN, an RNN controlling a 3D CNN, etc.

For example, the pre-rule 5215 may be configured to check whether or not an input contains pixels and the pipeline component 5225 may be a 2D CNN. If the pre-rule detects that an input frame contains pixels, then the 2D CNN implements object recognition. On the other hand, if the pre-rule detects that the input frame does not contain pixels, then the 2D CNN may be configured to implement audio recognition.

In an exemplary implementation, a new neural network (or more generally, an artificial intelligence component) can be registered using a configuration file, which may include a name and description of the component, how it is invoked and what its inputs and output are (e.g., akin to specifying an application programming interface (API) for the new component). Upon registration, the new neural network pipeline component may be integrated into an existing simulation as a collaborator.

Figure 53:
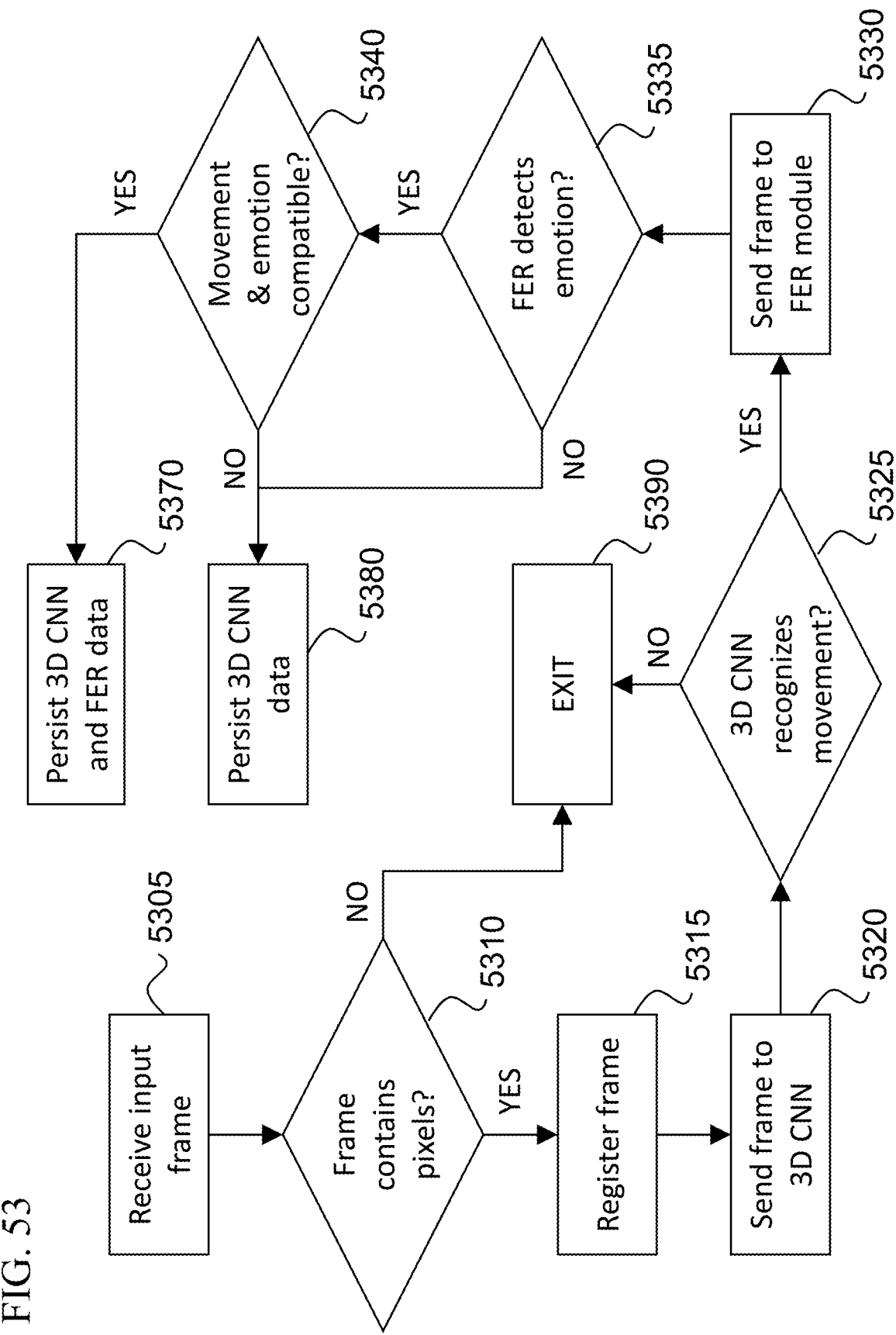
FIG. 53 is a flowchart illustrating an example method for the operation of a sign language translation system with a collaborator.

For example, a sign language translation system may include three pipeline components: (i) an RNN, (ii) a 3D ConvNet, (ii) a facial and/or emotional recognition (FER) module. The RNN may have four pre-rules and a post-rule, whereas the 3D ConvNet and the FER module each have one pre-rule and one post-rule. FIG. 53 shows a flowchart that outlines the operation of this exemplary sign language translation system in accordance with some embodiments of the disclosed technology. To facilitate the understanding the operations in FIG. 53, certain example pre- and post-rules are used to describe the below operations. It is, however, understood that other types of pre- and post-rules can be used in other implementations within the scope of the present disclosure.

The operations start by receiving a frame at the RNN 5305, whose first pre-rule checks whether the frame includes pixels 5310. Upon confirming that the frame contains pixels (YES at 5310), the RNN registers the frame 5315 as the first frame in a sign language movement it is trying to recognize.

In some embodiments, and as illustrated in the example in FIG. 53, if the frame does not contain pixels (NO at 5310), then the current process terminates 5390, which can cause the processing engine to await additional data (e.g., return to 5305), may continue the recognition process based on its own internal logic and processing, or may exit all together. In some embodiments, the RNN may activate a 2D ConvNet to perform audio recognition upon a determination that the current frame does not include image pixels.

Upon determining that the frame contain pixels (YES at 5310), the RNN sends the frame to the 3D ConvNet 5320. The operations that are carried out by the 3D ConvNet (not illustrated in FIG. 53), can include using the pre-rule to check whether the frame includes pixels. Upon confirming that the frame contains pixels, the 3D ConvNet processes the frame and checks whether the frame matches the first frame of any action or motion it has been trained to recognize. The output of the recognition process is sent to the post-rule of the 3D ConvNet, which checks whether the identification was successful.

If the 3D ConvNet the identification is not successful, the RNN receives a negative indication from the 3D ConvNet and determines that the movement cannot be recognized (NO at 5325), thus terminating the current process 5390. If the 3D ConvNet the identification is successful, the 3D ConvNet sends an indication to the RNN, where the indication includes one or more sign language movements that the frame may have matched. The RNN receives this information and prior to accepting it, executes its second pre-rule to determine whether the 3D ConvNet was successful in its detection 5325, and if it was, sends the frame to the FER module collaborator 5330.

The operations at the FER module (not illustrated in FIG. 53) can include using the pre-rule to check whether the frame is part of a sign language movement it can recognize. Upon confirming that the frame corresponds to at least one candidate sign language movement, the FER module performs facial and/or emotion detection (e.g., using 32 reference points on a subject's face) and pass the result to the RNN. In some embodiments, the FER module relies on training images that include the relevant emotions that are commonly used as part of sign languages. Additionally, pose estimation results are available on a subset of the training images, and during the execution phase of the neural network, these training images (and the relevant emotions and poses) may be used to recognize emotions in the captured video/images in real-time.

The RNN executes its third pre-rule which checks whether the FER module collaborator has detected an emotion 5335. Upon determining that an emotion has been detected (YES at 5335) and, the RNN executes its fourth pre-rule that checks whether the emotion is compatible with the sign language movement 5340. If the RNN determines that the 3D CNN recognized movement and the FER module recognized emotion are compatible (YES at 5340), the process moves to operations identified as 5370, wherein the RNN persists both the 3D CNN and FER module data. In other words, if the movement and the emotion are part of a SL movement that the RNN is able to identify (based on its training stage), they are stored by the RNN. In this mode of operation, the RNN operates like a database in that any data that is relevant to the identification of the SL movement is stored (or persisted) by the RNN.

As illustrated in FIG. 53, if the emotion detected by the FER module is not compatible with the sign language movement detected by the 3D ConvNet (NO at 5340), or if the FER module does not detect an emotion (NO at 5335), the RNN persists the frame 5380, but not the emotion. This is followed by the RNN continuing to identify the sign language movement based on subsequent frames, or exiting the current process if there are no subsequent frames or information.

In another example, a second collaborator that performs pose estimation may be incorporated at runtime. The pose estimation collaborator may be advantageously used to improve recognition accuracy even when the subject is partially obscured. As described above, the RNN may be configured to interact with multiple pipeline components and persist the relevant data from each of them in order to accurately identify a sign language movement.

In yet another example, different sensors (e.g., audio sensors, haptic sensors, non-visible light sensors, etc.) that may be used to capture the sign language movement may be integrated into the neural network processing framework using the pipeline framework, as described above. For example, subjects who primarily use sign language to communicate may try to accommodate for hearing people with poor signing skills by vocalizing the words sometimes, or to convey additional aspects of the information being signed. Implementations of the disclosed technology can capture this audio (and sometimes haptic) input, which can be integrated into the neural network processing to improve the recognition of the movements of the signed language.

In some embodiments, the disclosed technology provides a neural network system adapted for processing images associated with a gesture. This system includes one or more three-dimensional convolution neural networks (3D CNNs), each of the 3D CNNs comprising an input to receive a plurality of input images, and an output to provide recognition information produced by each of the 3D CNNs, at least one recurrent neural network (RNN) comprising an input to receive a second type of recognition information, and an output that is coupled to the input of the at least one RNN to provide a feedback connection, and one or more processors coupled to a non-transitory memory with instructions stored thereon, the instructions upon execution by the processor, causing the processor to receive a plurality of captured images at a pre-processing module, perform pose estimation on each of the plurality of captured images, and overlay pose estimation pixels onto the plurality of captured images to generate the plurality of input images for consumption by the one or more 3D CNNs, and receive the recognition information produced by each of the one or more 3D CNNs at a fusion module, and aggregate the received recognition information to generate the second type of recognition information for consumption by the at least one RNN, wherein each of the one or more 3D CNNs is operable to produce the recognition information comprising at least one characteristic associated with the gesture in each of the plurality of images, and provide the recognition information to the fusion module, the at least one characteristic comprising a pose, a color or a gesture type, and wherein the at least one RNN is operable to determine whether the recognition information produced by the one or more 3D CNNs corresponds to a singular gesture across the plurality of input images.

Figure 54:
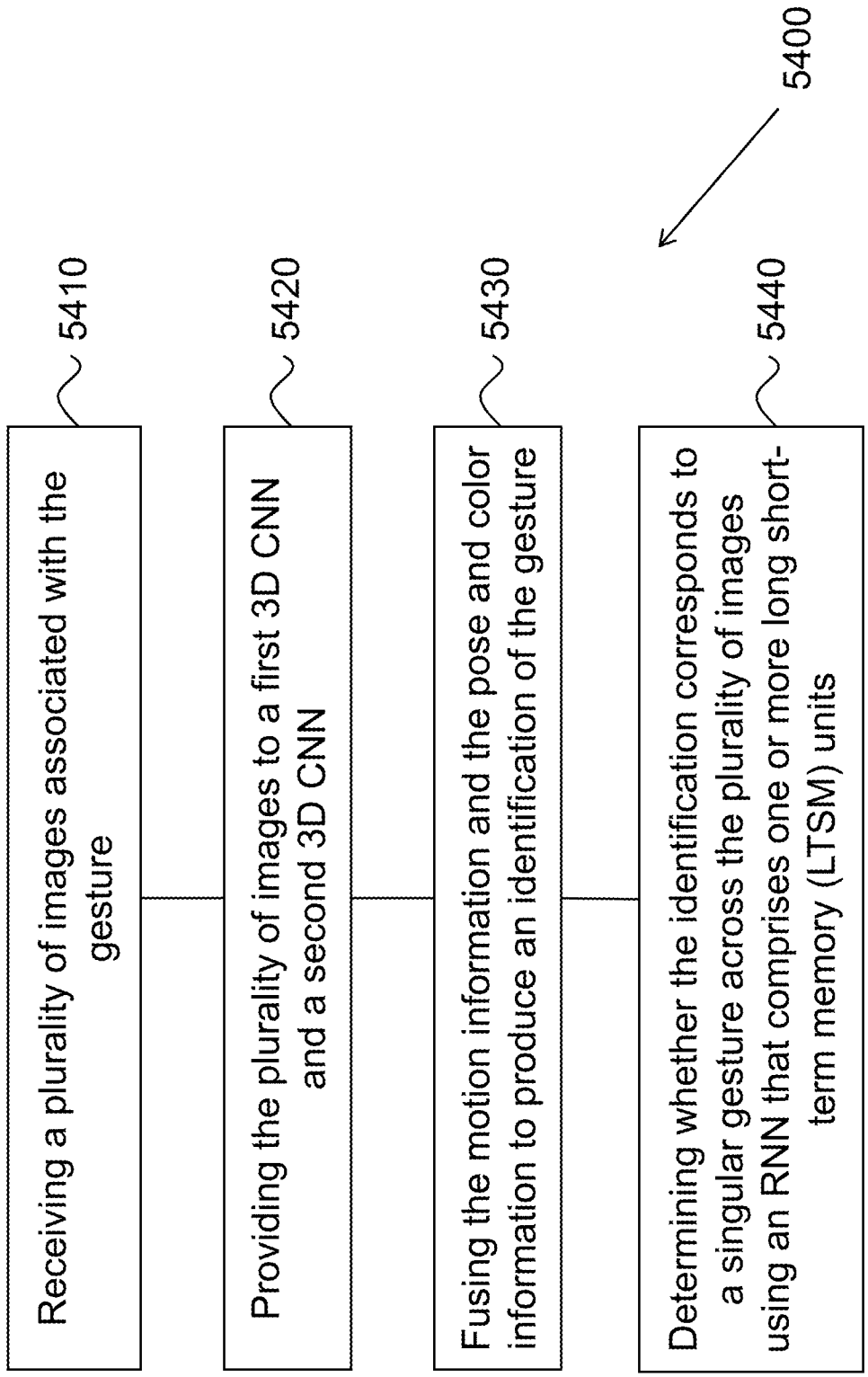
FIG. 54 is a flowchart illustrating an example method for sign language recognition using neural networks, in accordance with the presently disclosed technology.

FIG. 54 is a flowchart illustrating an example method 5400 for gesture recognition using neural networks. The method 5400 includes, at operation 5410, receiving a plurality of images associated with the gesture.

The method 5400 includes, at operation 5420, providing the plurality of images to a first 3D CNN and a second 3D CNN, wherein the first 3D CNN is operable to produce motion information, wherein the second 3D CNN is operable to produce pose and color information, wherein the first 3D CNN is operable to implement an optical flow algorithm to detect the gesture.

The method 5400 includes, at operation 5430, fusing the motion information and the pose and color information to produce an identification of the gesture.

The method 5400 includes, at operation 5440, determining whether the identification corresponds to a singular gesture across the plurality of images using an RNN that comprises one or more long short-term memory (LTSM) units.

In some embodiments, the method 5400 may further comprise the operation of pre-processing a plurality of captured images to generate the plurality of images. In an example, the pre-processing the plurality of captured images includes applying a pose estimation algorithm to pixels of each of the plurality of images to produce overlay pixels corresponding to body, fingers and face of the subject, extracting color and spatial information from each of the plurality of images, and combining the overlay pixels and the color and spatial information to produce the plurality of images. In other embodiments, the method 5400 may further comprise the operations of identifying, based on the overlay pixels corresponding to the face of the subject, lip movements of the subject, and producing, based on the lip movements of the subject, textual information. In an example, the overlay pixels comprise pixels with different colors for each finger of the subject.

Embodiments of the disclosed technology include a neural network processing system adapted for processing images associated with a sign language gesture, wherein the system includes (a) a RNN comprising an input that receives the images associated with the sign language gesture, and an output that feeds back into the input, and (b) a 3D CNN comprising an input, coupled to the output of the RNN, that receives the images associated with the sign language gesture from the RNN, and an output, coupled to the input of the RNN, wherein the 3D CNN identifies each of the images associated with the sign language gesture and transmits a result thereof to the RNN, and wherein the RNN controls the 3D CNN and tracks the sign language gesture being identified by the 3D CNN.

Figure 55:
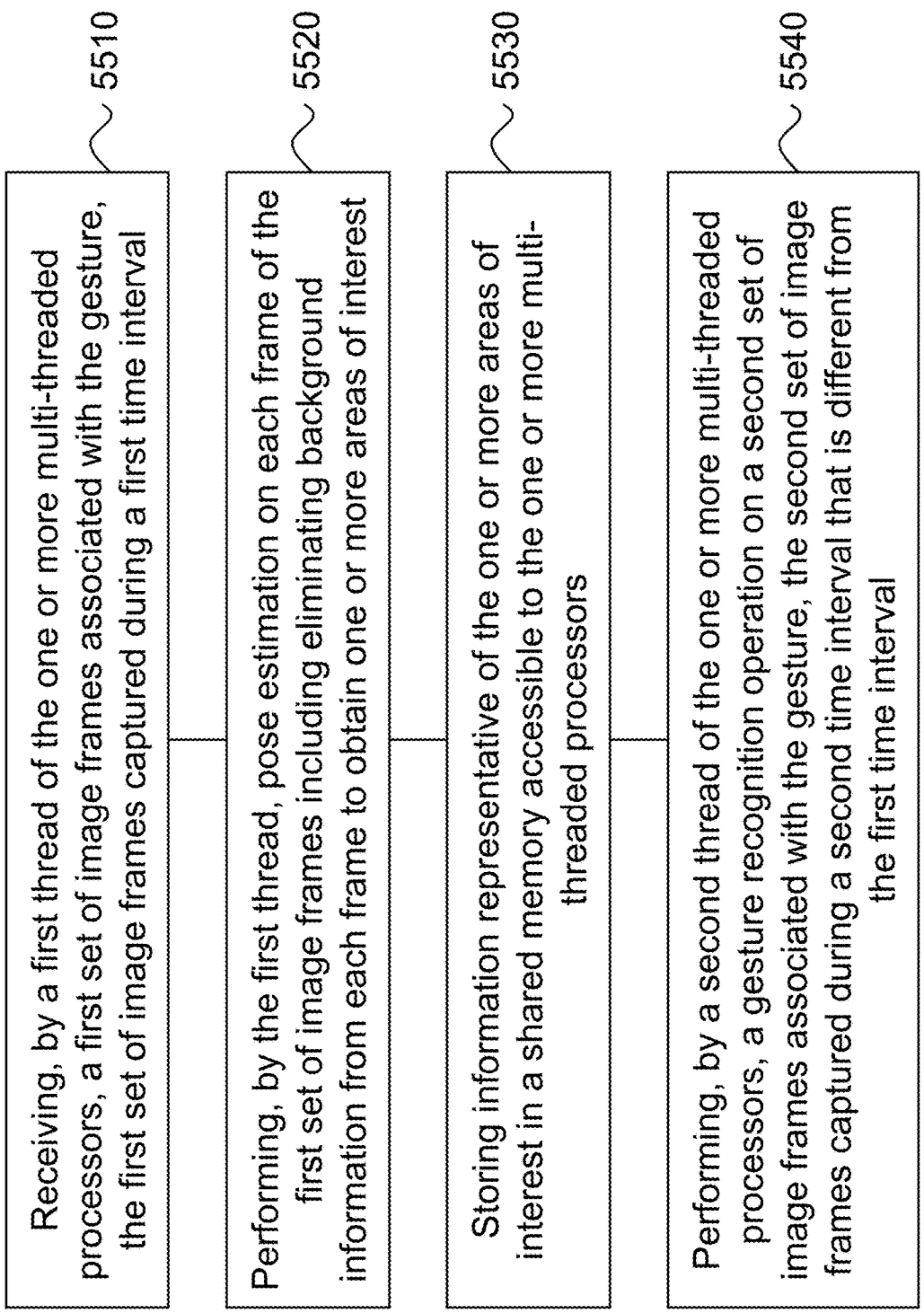
FIG. 55 is a flowchart illustrating an example method for real-time gesture recognition, in accordance with the presently disclosed technology.

FIG. 55 is a flowchart illustrating an example method 5500 for real-time gesture recognition. The method 5500 includes, at operation 5510, receiving, by a first thread of the one or more multi-threaded processors, a first set of image frames associated with the gesture, the first set of image frames captured during a first time interval. In some embodiments, the first set of images frames are captured using a set of visual sensing devices that include multiple apertures oriented with respect to the subject to receive optical signals corresponding to the gesture from multiple angles.

The method 5500 includes, at operation 5520, performing, by the first thread, pose estimation on each frame of the first set of image frames including eliminating background information from each frame to obtain one or more areas of interest.

The method 5500 includes, at operation 5530, storing information representative of the one or more areas of interest in a shared memory accessible to the one or more multi-threaded processors.

The method 5500 includes, at operation 5540, performing, by a second thread of the one or more multi-threaded processors, a gesture recognition operation on a second set of image frames associated with the gesture, the second set of image frames captured during a second time interval that is different from the first time interval.

In some embodiments, the method 5500 further includes the operation of collecting depth information corresponding to the gesture in one or more planes perpendicular to an image plane captured by the set of visual sensing devices, wherein eliminating the background information is further based on the depth information.

In some embodiments, the first 3D CNN has been trained on a limited set of training data, and the method 5500 further includes, as part of generating the limited set of training data, the operations of generating a 3D scene that includes a 3D model, using a value indicative of the total number of images in the limited set of training data to determine a plurality of variations of the 3D scene, applying each of plurality of variations to the 3D scene to produce a plurality of modified 3D scenes, and capturing an image of each of the plurality of modified 3D scenes to generate the limited set of training data.

In some embodiments, the method 5500 further includes the operation of generating, for each image of the limited set of training data, a label that corresponds to a feature of interest, wherein the label comprises one or more bounding lines that delineates a precise boundary of the feature of interest. In an example, the precise boundary of the feature of interest is generated based on a group of polygons that collectively form the feature of interest in the 3D model. In another example, determining the plurality of variations of the 3D scene is based on a set of parameters that specify at least one of: a position of the 3D model, an angle of 3D model, a position of a camera, an orientation of a camera, a lighting attribute, a texture of a subsection of the 3D model, or a background of the 3D scene.

In some embodiments, the method 5500 further includes the operations of obtaining, after generating the limited set of training data, an evaluation of the gesture recognition operation and re-generating another limited set of training data upon a determination that the gesture recognition operation fails to meet one or more predetermined criteria.

In some embodiments, the first set of image frames is received concurrently as the gesture recognition operation is performed on the second set of image frames.

In some embodiments, the optical flow operation comprises sharpening, line, edge, corner and shape enhancements.

In some embodiments, performing the pose estimation produces overlay pixels corresponding to the body, fingers and face of the subject. In an example, the overlay pixels comprise pixels with different colors for each finger of the subject.

In some embodiments, the spatial and color processing operations comprise recognizing one or more characteristics of the gesture in data corresponding to a single image frame of the second set of image frames.

In some embodiments, the information representative of the one or more areas of interest are accessed by the first 3D CNN and the second 3D CNN from the shared memory without copying data corresponding to the information representative of the one or more areas of interest to any other memory location.

In some embodiments, each of the first set of image frames and the second set of image frames comprises a frame number or an SMPTE timecode.

In some embodiments, the RNN comprises one or more LSTM units.

Figure 56:
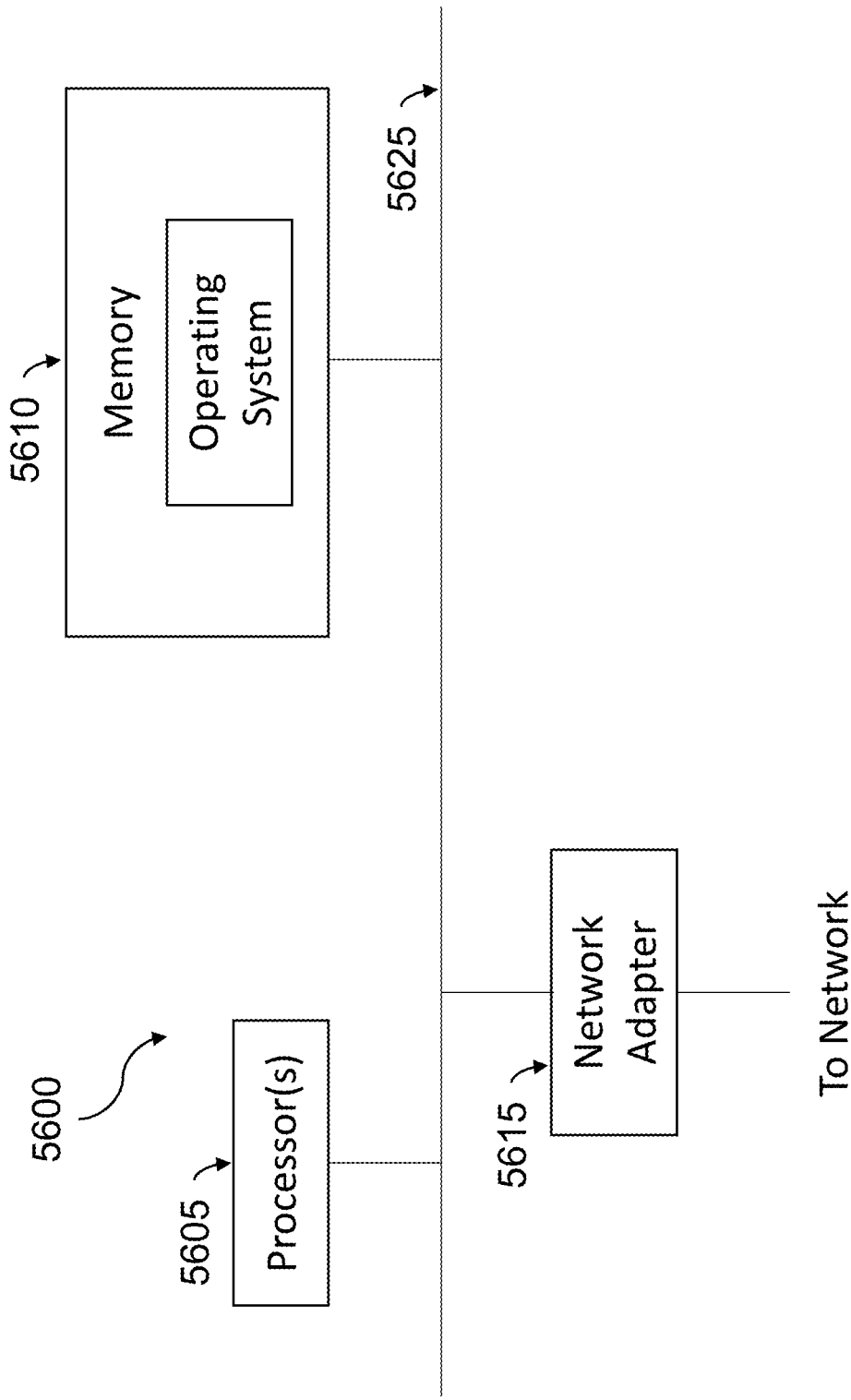
FIG. 56 is a block diagram illustrating an example of the architecture for a computer system or other control device that can be utilized to implement various portions of the presently disclosed technology.

FIG. 56 is a block diagram illustrating an example of the architecture for a computer system or other control device 5600 that can be utilized to implement various methods and portions of the presently disclosed technology. In FIG. 56, the computer system 5600 includes one or more processors 5605 and memory 5610 connected via an interconnect 5625. The interconnect 5625 may represent any one or more separate physical buses, point to point connections, or both, connected by appropriate bridges, adapters, or controllers. The interconnect 5625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 5605 may include central processing units (CPUs) to control the overall operation of, for example, the host computer. In certain embodiments, the processor(s) 5605 accomplish this by executing software or firmware stored in memory 5610. The processor(s) 5605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 5610 can be or include the main memory of the computer system. The memory 5610 represents any suitable form of random access memory (RAM), read-only memory (ROM), flash memory, or the like, or a combination of such devices. In use, the memory 5610 may contain, among other things, a set of machine instructions which, when executed by processor 5605, causes the processor 5605 to perform operations to implement embodiments of the presently disclosed technology.

Also connected to the processor(s) 5605 through the interconnect 5625 is a (optional) network adapter 5615. The network adapter 5615 provides the computer system 5600 with the ability to communicate with remote devices, such as the storage clients, and/or other storage servers, and may be, for example, an Ethernet adapter or Fiber Channel adapter.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for real-time recognition, using one or more multi-threaded processors, of a gesture communicated by a subject, the method comprising:
   receiving, by a first thread of the one or more multi-threaded processors, a first set of image frames associated with the gesture, the first set of image frames captured during a first time interval;
   receiving, by a second thread of the one or more multi-threaded processors, a first set of non-visual data associated with the gesture, the first set of non-visual data captured during the first time interval;
   storing information representative of the first set of images and information representative of the first set of non-visual data in a shared memory accessible to the one or more multi-threaded processors; and
   performing, by a third thread of the one or more multi-threaded processors, a gesture recognition operation on the first set of image frames, the first set of non-visual data, and a second set of image frames associated with the gesture, the second set of image frames captured during a second time interval that is different from the first time interval,
   wherein performing the gesture recognition operation comprises:
      using a first processor of the one or more multi-threaded processors that implements a first three-dimensional convolutional neural network (3D CNN) to perform an optical flow operation on the information representative of the first set of images that is accessed from the shared memory, wherein the optical flow operation is enabled to recognize a motion associated with the gesture,
      using a second processor of the one or more multi-threaded processors that implements a second 3D CNN to perform spatial and color processing operations on the information representative of the first set of images that is accessed from the shared memory,
      using a third processor of the one or more multi-threaded processors that implements a third 3D CNN to generate contextual data based on the information representative of the first set of non-visual data that is accessed from the shared memory,
      fusing results of the optical flow operation, results of the spatial and color processing operations, and the contextual data to produce an identification of the gesture; and
      using a recurrent neural network (RNN) to determine that the identification corresponds to a singular gesture across at least the first and second sets of image frames.

2. The method of claim 1, wherein the first set of non-visual data includes information generated by an expert related to situational and idiomatic context associated with the gesture.

3. The method of claim 1, wherein the first set of non-visual data comprises environmental factors associated with the subject and the gesture.

4. The method of claim 1, wherein the first set of images frames are captured using a set of visual sensing devices that include multiple apertures oriented with respect to the subject to receive optical signals corresponding to the gesture from multiple angles.

5. The method of claim 1, wherein the first set of image frames is received concurrently as the gesture recognition operation is performed on the second set of image frames.

6. The method of claim 1, wherein the optical flow operation comprises sharpening, line, edge, corner and shape enhancements.

7. The method of claim 1, wherein the spatial and color processing operations comprise recognizing one or more characteristics of the gesture in data corresponding to a single image frame of the second set of image frames.

8. The method of claim 1, wherein the information representative of the first set of images and the first set of non-visual data is accessed by the first 3D CNN, the second 3D CNN, and the third 3D CNN from the shared memory without copying data corresponding to the information representative of the first set of images or the information representative of the first set of non-visual data to any other memory location.

9. The method of claim 1, wherein the RNN comprises one or more long short-term memory (LSTM) units.

10. An apparatus for real-time recognition of a gesture communicated by a subject, the apparatus comprising:
  one or more multi-threaded processors; and
  a non-transitory memory with instructions stored thereon, the instructions upon execution by the one or more multi-threaded processors, causing the one or more multi-threaded processors to:
    receive, by a first thread of the one or more multi-threaded processors, a first set of image frames associated with the gesture, the first set of image frames captured during a first time interval;
    receive, by a second thread of the one or more multi-threaded processors, a first set of non-visual data associated with the gesture, the first set of non-visual data captured during the first time interval;
    store information representative of the first set of images and information representative of the first set of non-visual data in a shared memory accessible to the one or more multi-threaded processors; and
    perform, by a third thread of the one or more multi-threaded processors, a gesture recognition operation on the first set of image frames, the first set of non-visual data, and a second set of image frames associated with the gesture, the second set of image frames captured during a second time interval that is different from the first time interval,
  wherein the instructions upon execution by the one or more multi-threaded processors cause the one or more multi-threaded processors, as part of performing the gesture recognition operation, to:
    use a first processor of the one or more multi-threaded processors that implements a first three-dimensional convolutional neural network (3D CNN) to perform an optical flow operation on the information representative of the first set of images that is accessed from the shared memory, wherein the optical flow operation is enabled to recognize a motion associated with the gesture,
    use a second processor of the one or more multi-threaded processors that implements a second 3D CNN to perform spatial and color processing operations on the information representative of the first set of images that is accessed from the shared memory,
    use a third processor of the one or more multi-threaded processors that implements a third 3D CNN to generate contextual data based on the information representative of the first set of non-visual data that is accessed from the shared memory,
    fuse results of the optical flow operation, results of the spatial and color processing operations, and the contextual data to produce an identification of the gesture; and
    use a recurrent neural network (RNN) to determine that the identification corresponds to a singular gesture across at least the first and second sets of image frames.

11. The apparatus of claim 10, wherein the first set of non-visual data includes information generated by an expert related to situational and idiomatic context associated with the gesture.

12. The apparatus of claim 10, wherein the first set of non-visual data comprises environmental factors associated with the subject and the gesture.

13. The apparatus of claim 10, wherein the first set of image frames is received concurrently as the gesture recognition operation is performed on the second set of image frames.

14. The apparatus of claim 10, wherein the optical flow operation comprises sharpening, line, edge, corner and shape enhancements.

15. The apparatus of claim 10, wherein the spatial and color processing operations comprise recognizing one or more characteristics of the gesture in data corresponding to a single image frame of the second set of image frames.

16. The apparatus of claim 10, wherein the information representative of the first set of images and the first set of non-visual data is accessed by the first 3D CNN, the second 3D CNN, and the third 3D CNN from the shared memory without copying data corresponding to the information representative of the first set of images or the information representative of the first set of non-visual data to any other memory location.

17. A system for real-time recognition of a gesture communicated by a subject, the system comprising:
  a set of visual sensing devices comprising multiple apertures and a depth sensor;
  at least one non-visual sensing device;
  one or more multi-threaded processors; and
  a non-transitory memory with instructions stored thereon,
  wherein the set of visual sensing devices is configured to capture, during a first time interval, a first set of image frames associated with the gesture,
  wherein the at least one non-visual sensing device is configured to capture, during the first time interval, a first set of non-visual data associated with the gesture,
  wherein the instructions upon execution by the one or more multi-threaded processors, cause the one or more multi-threaded processors to:
    store information representative of the first set of images and information representative of the first set of non-visual data in a shared memory accessible to the one or more multi-threaded processors; and
    perform, by a first thread of the one or more multi-threaded processors, a gesture recognition operation on the first set of image frames, the first set of non-visual data, and a second set of image frames associated with the gesture, the second set of image frames captured during a second time interval that is different from the first time interval, and
  wherein the instructions upon execution by the one or more multi-threaded processors cause the one or more multi-threaded processors, as part of performing the gesture recognition operation, to:
    use a first processor of the one or more multi-threaded processors that implements a first three-dimensional convolutional neural network (3D CNN) to perform an optical flow operation on the information representative of the first set of images that is accessed from the shared memory, wherein the optical flow operation is enabled to recognize a motion associated with the gesture,
    use a second processor of the one or more multi-threaded processors that implements a second 3D CNN to perform spatial and color processing operations on the information representative of the first set of images that is accessed from the shared memory,
    use a third processor of the one or more multi-threaded processors that implements a third 3D CNN to generate contextual data based on the information representative of the first set of non-visual data that is accessed from the shared memory, fuse results of the optical flow operation, results of the spatial and color processing operations, and the contextual data to produce an identification of the gesture; and use a recurrent neural network (RNN) to determine that the identification corresponds to a singular gesture across at least the first and second sets of image frames.

18. The system of claim 17, wherein the at least one non-visual sensing device comprises a keyboard, and wherein the first set of non-visual data includes information generated by an expert related to situational and idiomatic context associated with the gesture.

19. The system of claim 17, wherein the at least one non-visual sensing device comprises a microphone, and wherein the first set of non-visual data comprises environmental factors associated with the subject and the gesture.

20. The system of claim 17, wherein the RNN comprises one or more long short-term memory (LSTM) units.

* * * * *